US010325102B2

(12) United States Patent
AthuluruTlrumala et al.

(10) Patent No.: US 10,325,102 B2
(45) Date of Patent: Jun. 18, 2019

(54) REAL-TIME CUSTOMER EXPERIENCE MANAGEMENT SYSTEMS AND METHODS

(71) Applicants: GiriSrinivasaRao AthuluruTlrumala, San Francisco, CA (US); Anand Ramesh Attuluru, Kondapur (IN)

(72) Inventors: GiriSrinivasaRao AthuluruTlrumala, San Francisco, CA (US); Anand Ramesh Attuluru, Kondapur (IN)

(73) Assignee: yTrre, Inc., San Francisco, CA (US)

( * ) Notice: Subject to any disclaimer, the term of this patent is extended or adjusted under 35 U.S.C. 154(b) by 1397 days.

(21) Appl. No.: 14/286,349

(22) Filed: May 23, 2014

(65) Prior Publication Data
US 2016/0335686 A1 Nov. 17, 2016

Related U.S. Application Data

(60) Provisional application No. 61/826,942, filed on May 23, 2013.

(51) Int. Cl.
| | |
|---|---|
| *G06F 21/60* | (2013.01) |
| *G06Q 30/06* | (2012.01) |
| *G06Q 10/06* | (2012.01) |
| *G06F 3/0482* | (2013.01) |
| *G06F 16/29* | (2019.01) |
| *G06Q 10/10* | (2012.01) |
| *H04W 8/18* | (2009.01) |
| *H04N 21/442* | (2011.01) |
| *H04W 8/00* | (2009.01) |
| *H04W 4/50* | (2018.01) |

(Continued)

(52) U.S. Cl.
CPC .......... *G06F 21/604* (2013.01); *G06F 3/0482* (2013.01); *G06F 16/29* (2019.01); *G06Q 10/06* (2013.01); *G06Q 10/06313* (2013.01); *G06Q 10/109* (2013.01); *G06Q 30/0613* (2013.01); *H04N 21/44222* (2013.01); *H04W 4/029* (2018.02); *H04W 4/50* (2018.02); *H04W 8/005* (2013.01); *H04W 8/18* (2013.01); *H04L 65/403* (2013.01); *H04N 21/4788* (2013.01); *Y04S 10/54* (2013.01); *Y10S 707/99933* (2013.01); *Y10S 707/99945* (2013.01); *Y10S 707/99948* (2013.01)

(58) Field of Classification Search
None
See application file for complete search history.

(56) References Cited

U.S. PATENT DOCUMENTS

| | | | |
|---|---|---|---|
| 2004/0117358 A1* | 6/2004 | von Kaenel et al. | G06F 17/30241 |
| 2006/0111955 A1* | 5/2006 | Winter | G06Q 10/06 705/7.19 |

(Continued)

*Primary Examiner* — Gurkanwaljit Singh
(74) *Attorney, Agent, or Firm* — Clements Bernard Walker PLLC; Lawrence A. Baratta, Jr.

(57) ABSTRACT

A real-time experience management method, system, and mobile device include checking in a person with an associated mobile device at a site comprising a wireless infrastructure, location tracking, and sensors; communicating data associated with the person to a cloud service; receiving personalization information about the person from the cloud service; monitoring and updating an experience associated with the person at the site during a duration the person is at the site; and communicating data associated with the experience to the cloud service.

18 Claims, 30 Drawing Sheets

(51) Int. Cl.
*H04W 4/029* (2018.01)
*H04N 21/4788* (2011.01)
*H04L 29/06* (2006.01)

(56) References Cited

U.S. PATENT DOCUMENTS

| | | | |
|---|---|---|---|
| 2007/0015518 A1* | 1/2007 | Winter | G08G 1/205 455/456.1 |
| 2011/0047463 A1* | 2/2011 | Shepherd | G06Q 10/10 715/723 |
| 2012/0066019 A1* | 3/2012 | Hinshaw | G06Q 10/06 705/7.23 |
| 2013/0090090 A1* | 4/2013 | Rivere | G06Q 10/06 455/411 |
| 2013/0132854 A1* | 5/2013 | Raleigh | G06F 3/0482 715/738 |
| 2014/0129942 A1* | 5/2014 | Rathod | H04N 21/44222 715/720 |

* cited by examiner

REAL-TIME CUSTOMER EXPERIENCE MANAGEMENT SYSTEMS AND METHODS

CROSS-REFERENCE TO RELATED APPLICATION(S)

The present patent/application claims priority to U.S. Provisional Patent No. 61/826,942, filed May 23, 2013, and entitled "PERSONALIZATION OF COMMERCIAL INFORMATION BASED ON COMMUNITIES AND RELATIONSHIPS ASSOCIATED WITH USERS," the contents of which are incorporated by reference herein.

FIELD OF THE DISCLOSURE

The present disclosure relates generally to computer and networking systems and methods. More particularly, the present disclosure relates to real-time customer experience management systems and methods.

BACKGROUND OF THE DISCLOSURE

Commerce is evolving with the widespread adoption of mobile computing and with the ever increasing productivity brought on by the Internet and internet of things. The goal in commerce is for businesses to provide customers a premium/personal/efficient experience. Conventionally, there are numerous techniques to evaluate customer experience after the fact, i.e., not in real-time. For example, numerous techniques exist for after the fact capturing of transaction-related information (e.g., consumer loyalty programs, email enrollment, Enterprise resource planning (ERP), etc.). Other techniques exist for after the fact capturing of user experience (e.g., social media, Customer relationship management (CRM), etc.). Real-time data collection is limited and typically confined to systems like point-of-sale (POS) or payment gateways or in-house/$3^{rd}$ party software information related to a single transaction or a single customer. Further, this information is confined to a person who pays or who is subject of the transaction and may not capture data related to others involved in the experience. The current model of experience used is missing the rich context of an experience that includes all customers, all employees of the businesses involved in that particular experience, the products/service association with each customer/employee in the experience, and other related information that directly affects the customer's end-to-end experience. The current situation is limited to disconnected systems, manual workflows, and no integration of customer experience leading to an after the fact management system with manual process correction. This is complex to manage, leads to revenue leakage, is costly, and does not alleviate poor experiences.

Conventional state of the art for improving customer experience can be categorized in two approaches—i) manual processes and ii) mining transaction and social data. Manual processes can help businesses staff to support streamlining/personalization, situation/customer handling, upselling/promotion, etc. However, these process are error prone, inconsistent due to dependency on the staffs skill, do not work on high traffic days, and do not scale from one location to location. Also, there is no real-time feedback to management to intervene in real-time if necessary. Mining transaction data and social data can be employed by business software and/or third party software vendors to help businesses get some sense of how things related to customer experience can be improved. However, the information that is acted upon, does not capture the entire experience. For example, in the case of restaurant, only the person who paid for the visit has his/her data captured. In the case of a hospital visit, the data does not include a patient's attendant's data or the data of attending nurses/junior data when they visited the patient. Also, not all customers complain on social media or give feedback to the business. Plus, the data is being analyzed post the experience so it has no value to someone who could intervene on a current experience that is going badly.

It would be advantageous for businesses and consumers to have real-time customer experience management systems and methods to ensure premium/personal/efficient experiences.

BRIEF SUMMARY OF THE DISCLOSURE

In an exemplary embodiment, a real-time experience management method, system, and mobile device include checking in a person with an associated mobile device at a site comprising a wireless infrastructure, location tracking, and sensors; communicating data associated with the person (customer, customer's community, employee, owner/manager) to a cloud service; receiving personalization information about the person from the cloud service; monitoring and updating an experience associated with the person at the site during a duration the person is at the site; and communicating data associated with the experience to the cloud service.

In another exemplary embodiment, a real-time experience management system includes a real-time awareness system operating one or more servers in a cloud; and a workflow system operating on the one or more servers in the cloud; wherein the real-time awareness system is configured to manage real-time location, position, and map updates associated with a plurality of users at a site and to trigger policy-based events to the workflow system based on real-time updates; wherein the workflow system is configured to manage a workflow at a site associated with the plurality of users such that experiences by customers of the plurality of users are optimized by staff of the plurality of users; and wherein each of the plurality of users comprises a mobile device interacting with the real-time awareness system and/or the workflow system.

In yet another exemplary embodiment, a mobile device includes a network interface; a location determination device; a wireless signature device; a processor communicatively coupled to the network interface, the location determination device, and the wireless signature device; and memory storing instructions that, when executed, cause the processor to: operate a mobile application for experience management; communicate to location tracking at a site; communicate to a cloud system; display a visualization of the site based on data from the cloud system; and continuously update the visualization based on experience updates associated with a plurality of customers at the site that identified by associated mobile devices and whose experiences are updates by mobile devices at the site.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, the real-time experience management systems and methods enable businesses to design, encode and manage different types of end to end experience flows through a cloud system. These experiences that can be designed, implemented and managed are of the following 3 category types: a) streamline and personalize each customer's experience at each touch point; b) contextually handle situations and different types of customers (e.g., new, repeat, high value, VIP, etc.); and c) automatically and non-intrusively upsell and promote new products. The real-time experience management systems and methods enable businesses to real-life model view of floors and how each experience is progressing on the floor. Managers can now feel as if they are really present in different locations and have the control to intervene in each customer experience in real-time. One the end-customer side, this system enables them to journal each and every experience with rich contextual detail. This detail can use leveraged later to clone, copy, share experience details between end-customers and their private/public communities.

Real-Time Experience Management System Deployment Structure

Figure 1:
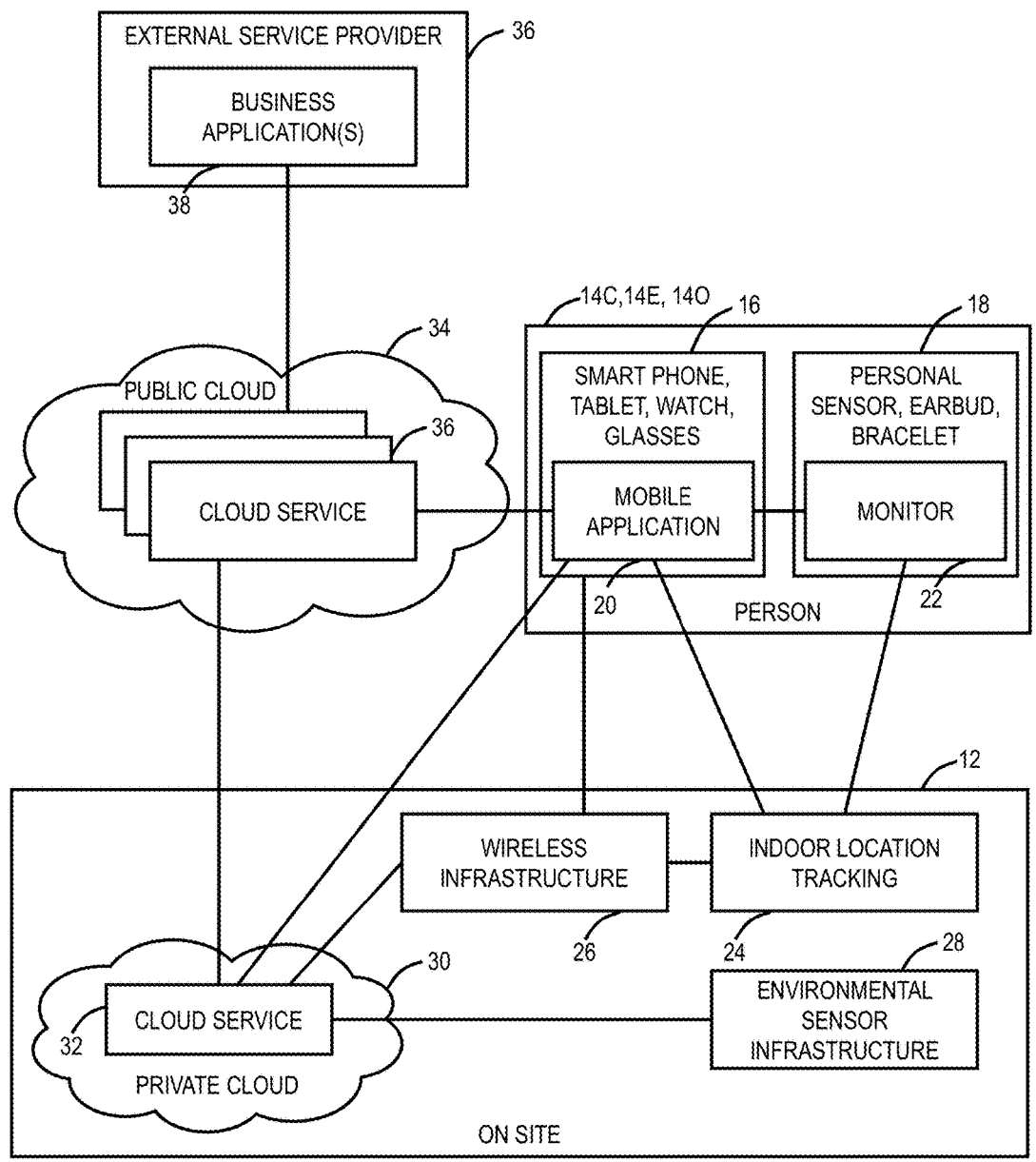
FIG. 1 is a network diagram of a real-time experience management system.

Referring to FIG. 1, in an exemplary embodiment, a network diagram illustrates a real-time experience management system 10. The real-time experience management system 10 builds community centric personalization (e.g., product/service/in-store/online/offline/merchant data) and is a community centric transaction platform. The system 10 provides a new way for merchants and community members to engage with each other and other community members for information sharing and making product purchases/bookings/content creation/etc. FIG. 1 illustrates exemplary physical infrastructure in the system 10 which can include a site 12 and a person 14. The site 12 can include, without limitation, any business, merchant, service provider, government office, etc., i.e., anywhere that may be providing an experience to a customer. The person 14 can be a customer, an employee, a manager, a business owner, etc. Each of the aforementioned roles will have different engagement in the system 10 as is described herein. For clarity, as described herein, a person 14C is a customer, a person 14E is an employee, and a person 14O is an owner/manager. Note, only a single site 12 and a single person 14 are shown in FIG. 1 merely for illustration purposes, and the system 10 contemplates any number of sites 12 and any number of persons 14 concurrently operating in the system 10. As described herein, the experience includes any activity associated with the person 14C related to the site 12 and can be prior to a physical visit, during the visit, and after the visit. An exemplary aspect of the system 10 is to provide a real-time experience management workflow for the person 14C by the persons 14E, 14O.

The person 14 can include a mobile device 16 and/or a sensor 18. The mobile device 16 can include, without limitation, a smart phone (e.g., iPhone, Android device, Windows phone, etc.), a tablet (e.g., iPad, Android device, Windows device, etc.), a smart watch, smart glasses (e.g., Google Glass), and the like. The sensor 18 can include, without limitation, a personally worn sensor, earbud, bracelet, etc. The mobile device 16 can include a mobile application 20 which is a first body of technology running close to each person. The mobile application 20 run on personal smart devices with rich, interactive human interfaces. The mobile application 20 supports complex data entry and visualization typically using graphical user interfaces (GUI). The mobile device 16 can also include various wireless techniques such as Wireless Local Area Network (WLAN) (IEEE 802.11 and variants thereof), Long Term Evolution (LTE), Bluetooth, etc. The mobile device 16 can also include Wireless Personal Area Networking (WPAN) techniques that enable the mobile device 16 to uniquely identify itself and its user in a wireless communication environment such as through an opt-in process in the system 10. An example of this can include iBeacon, Bluetooth Low Energy (BLE), etc. The mobile application 20 running on personal smart devices provides the primary user interface for the persons 14C, 14E, 14O interacting with the system 10. Again, the user interface will be different based on the classification of the person 14C, 14E, 14O.

The sensor 18 can include multiple personal area sensors providing limited, specific interaction and special purpose interfaces between the persons 14C, 14E, 14O, their environment, and the system 10. For example, an ID bracelet worn on a wrist containing a location beacon or motion sensor or personal health details (blood pressure, oxygen levels, etc.) may provide the location of the person 14C, 14E, 14O within the physical environment modeled within the system 10. An earbud headphone worn in the ear of a user might provide audio messages to the person 14C, 14E, 14O interacting with the system 10. As such, the sensor 18 can include monitor 22 hardware, software, and/or firmware to perform and communicate the limited, specific interaction and special purpose. Note, while the persons 14C, 14E, 14O are shown with the mobile device 16 and the sensor 18, there can be additional devices worn, carried, etc. by the persons 14C, 14E, 14O for interaction with the system 10. The system 10 contemplates using any device capable of providing real-time interaction in the system 10, and the mobile device 16 and the sensor 18 are merely shown as examples. That is, the system 10 contemplates any technique to model the persons 14C, 14E, 14O in real-time before, during, and after visits to the site 12.

The system 10 is configured to model the site 12 in a virtual environment. That is, the system 10 models the physical world as locations within sites. The site 12 represents physical spaces through which the persons 14C, 14E, 14O move and interact, and are typically places of business through which the location of staff and customers may be tracked. The site 12 includes indoor location tracking 24, a wireless infrastructure 26, and an environmental signal infrastructure 28. The indoor location tracking 24 provides techniques to monitor, in real-time, locations of the persons 14C, 14E, 14O at the site 12 by the system 10. For example, the sites 12 can be instrumented to track the location of the persons 14C, 14E, 14O or other physical objects either by locating personal smart devices within a wireless communications system or by locating beacons carried by humans moving within a specialized tracking system. The indoor location tracking 24 can include various, miniature BLE sensors located at resources in the site 12 (e.g., dining chairs, hospital beds, waiting room chairs, etc.). Note, in an exemplary aspect, the system 10 seeks to be non-intrusive to the person 14C and this can include using non-intrusive techniques like BLE, etc. For example, the person 14C can install the mobile application 20 and opt-in to the system 10 thereby allowing automatic tracking while the person 14C is at or near the site 12. The sites 12 can also be instrumented to the persons 14C, 14E, 14O or other physical objects by wireless signatures associated with personal smart devices or identifying beacons in personal area sensors.

The wireless infrastructure 26 provides local connectivity at the site 12 and can include, without limitation, WLAN, LTE (e.g., femtocells), Bluetooth, WPAN, etc. The environmental signal infrastructure 28 provides additional sensors measuring physical observables or providing control of observables in the site 12 environment and may also interact with the system 10. These can include, without limitation, room occupation sensors, temperature and humidity sensors, thermostats, light controls, telephone off hook sensor, music control, etc. and may provide information to or be controlled by the system 10. With the various devices on the persons 14C, 14O, 14E and at the site 12, the system 10 has a hardware infrastructure to monitor and capture real-time information and visually display and notify businesses of ongoing experiences as is described in additional detail herein.

Communication in the system 10 can be through a private cloud 30 hosting cloud services 32 locally in the site 12 and/or a public cloud 34 hosting cloud services 34 externally from the site 12. Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or mobile application, with no installed client version of an application required. Centralization gives cloud service providers complete control over the versions of the applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud."

The private cloud 30 and the public cloud 34 can provide similar functionality in the system 10. The private cloud 30 is local to the site 12 which can optionally contain compute resources, servers capable of running service software for the system 10, either for local redundancy or information security, i.e., businesses may choose to run some portion of the system 10 on site. Generally, the system 10 runs in the public cloud 34 as a SaaS with information partitioned and protected as needed. The system 10 executes a portion of its work where scalable compute, storage, and communication resources are available and where information may be easily shared. To optimize operation of the system 10, the system's 10 information space is broken up into shards running in different cloud data centers. Each shard can represent one or more sites 12 within a physical area. Shards are typically resident in data centers nearby in terms of communication latency the physical area they represent.

The system 10 can also interact with external service providers 36 operating outside of the private cloud 30 and/or public cloud 34. The external service providers 36 can include business applications 38. The system 10 can include Application Programming Interfaces (APIs) for third party applications to interact with the system 10 to implement related business functionality. These may include addressing niche market verticals not directly targeted by the system 10, additional functionality layered on top of the system 10 suitable for use by customers of the system 10, or providing information to the system 10 to enable the system 10 to provide additional functionality for their business.

Real-Time Experience Management System Functional Structure

Figure 2:
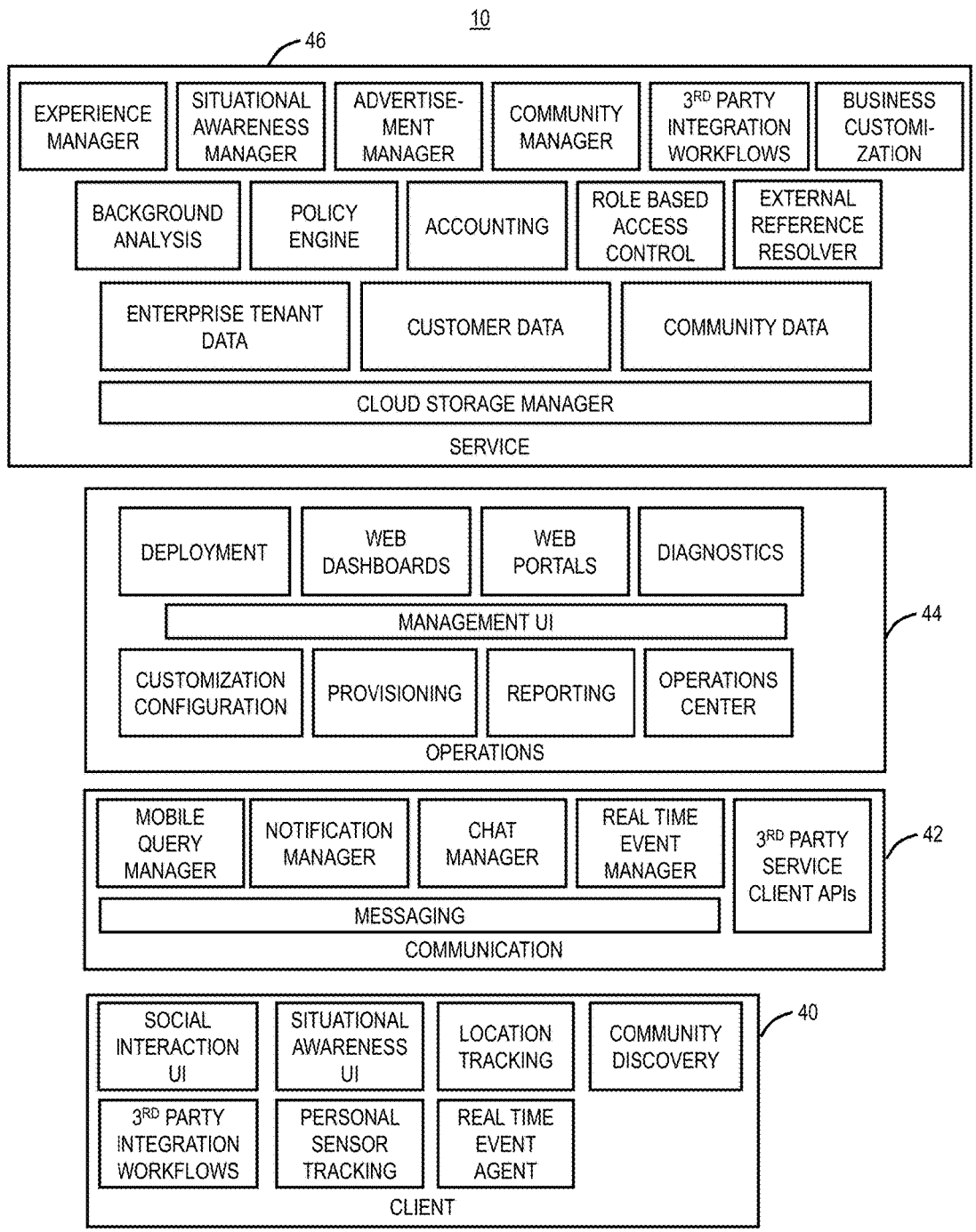
FIG. 2 is a block diagram of logical partitioning of functionality of the real-time experience management system of FIG. 1.

Referring to FIG. 2, in an exemplary embodiment, a block diagram illustrates logical partitioning of functionality of the real-time experience management system 10. This logical presentation of the functionality of the system 10 is not intended to describe the system 10 in exhaustive detail nor is it intended to describe specific artifacts as produced by the system 10 development, rather this function structure is intended to categorize the areas of behavior that are implemented by the system 10 as a whole. From a functional perspective, the system 10 can be categorized functionally with client functionality 40, communication functionality 42, operations functionality 44, and service functionality 46.

The client functionality 40 operates associated with a user of the system 10, i.e., one of the persons 14C, 14E, 14O. A Social Interaction user interface (UI) provides communication between users of the system 10. A UI for chat, calendaring, review comments, and other social networking mediums of communication are included. A Situational Awareness UI improves people's awareness of what is going on around them thereby empowering better decision making and responsiveness. The situational awareness UI presents aspects of the physical environment using maps and of abstract resources using ordered lists and related GUI idiom. For Location Tracking, through inertial tracking via sensor fusion, through triangulation from wireless base stations, or some other mechanism, the client functionality 40 performs much of the real-time processing for tracking physical location in the environment. For Community Discovery, wireless devices identify themselves uniquely within the radio environment thereby supporting automatic detection of ad hoc community relationships. The client functionality 40 assists in this identification possibly simply by offering a unique network address to a central service, possibly through near field communication detecting nearby radios, possibly directly configured by the user, possibly through a network control protocol, or through some other means.

For a Real-time Event Agent, situational awareness is driven in real-time by interaction with sensors in the environment. Though some of this information may be directly available to the client functionality 40 from the local device, much of the real-time information can be derived from interaction with the service functionality 46. This interaction occurs through real-time events transmitted over a communication medium. For Personal Sensor Tracking, additional personal sensors, such as health monitoring bracelets, Bluetooth devices, near field communication devices, etc. will require the client functionality 40 to be an intermediary between the personal area and the service functionality 46. For 3rd Party Integration Workflows, either for information security or expediency, some interactions with 3rd party systems can be performed directly by the client functionality 40. For example, if a smartphone user has an account with a restaurant reservation system (for instance OpenTable), then they should be able to use that system directly from their smartphone without needing to have the service functionality 46 somehow proxy the interaction.

The service functionality 46 operates beyond the lifespan and context of a particular user or client. Information assurance is provided by a Cloud Storage Manager. Confidentiality is provided by keying data by tenant, or by segregating sensitive information in on site storage. Information availability is provided through replication and caching. The system 10 information is partitioned into shards for locality of access, but supports references between shards. Cloud storage provides persistence to this information as well as low latency access to common queries. The storage manager establishes the database data model for the system 10, though not the schema. Some examples of database data model are: relational model, hierarchical model, entity-relationship model. For Enterprise Tenant Data, a tenant is a business enterprise wishing confidentiality of its information from other business entities. The Enterprise tenant data establishes the schema of the data for each enterprise. The schema has structure facilitating sharding and queries. The schema should be extensible as needed for customization of the system 10 for each business and for the construction of business applications using the system 10 as an underlying service.

Customer Data associated with using the system 10 that rightfully belongs to the user, such as personal preferences and history. Customer data schema limits the visibility of information with access controls set by the customer. Customer data may be made visible to one or more enterprises, to other customers, to communities, or to external applications. Community data contains the structure of user communities in the system 10 and characteristics discovered or inferred of those communities. Community data access methods enforce the information visibility controls of the customer data of community members. Background Analysis performs Big Data style processing of the system 10 data. Correlation and statistical analysis is performed to produce recommendations for customers, to target marketing to customers, and to provide decision support for businesses. For a Policy Engine, policies are declarative statements specifying intended outcomes when a set of conditions are met. Policies are specified by enterprises to automatically monitor situations and initiate actions. Accounting tracks the usage and behavior of software and services in the system 10. Statistics and logging support diagnostics and chargeback records suitable for financial audits. For Role Based Access Control (RBAC), enterprises establish roles for different users interacting with system. Information and actions permitted for each role are associated with the role. Roles and permissions are customizable by each enterprise. Limiting access to particular data instances rather than object types and operations is sometimes thought of as beyond the scope of RBAC. The service functionality 46 combines RBAC with data partitioning to solve the architectural difficulty.

For an External Reference Resolver, various entities may be shared between customers. For example, a menu item at a restaurant, an event plan for an evening, a review comment for a theater show, and an advertisement for a service may all be shared. To facilitate this sharing, references to these entities need to be communicated between the customers. The service functionality 46 integrates with various forms of social media by encoding these references as a Uniform Resource Locator (URL) that may be passed through any media supporting hyperlinks. The external reference resolver encodes and decodes these URL references. The experience manager provides the history of experiences. In other words, the relevant pieces of customer, staff, and business experiences are stored. The situational awareness manager models the physical environments of businesses using configured site models, sensor inputs, provisioned resource pools, and programmed behaviors from business customization. The advertising manager maintains the ads associated with each enterprise, offers ad and promotion personalization, and targets ads based on the experiences and current situation or query of the customer. The community manager tracks community membership, associates likes and behavior with the members of a community, and acts upon discovered community correlations. Much of the system information is stored with a community rather than with a single individual.

For 3rd Party Integration Workflows, where integration with external software systems is to be performed in the context of the service functionality 46 rather than in the context of the client functionality 40, the service functionality 46 supports coordinating workflows. These workflows either invoke 3rd party services using their APIs (or messages) or maintain state while 3rd party services invoke the service functionality 46 using APIs for the system 10. For Business Customization, where the policy manager provides customization using declarative statements, business customization provides support for imperative languages. Software code written in these languages shape the behavior of the system 10 for market verticals or specific customization for specific enterprises.

The communication functionality 42 provides mechanisms for various modes of interaction between parts of the system 10. For Messaging, most communication in the system 10 is built as messages. A common message protocol provides message versioning, addressing, scheduling, and optional reliability. For a Mobile Query Manager, queries are sequences of request, response pairs. Simple queries return a single value quickly. Compound queries return lists of items or large items. For a Notification Manager, notifications are single messages that are delivered reliably. For a Chat Manager, a chat session is a persistent, bi-directional exchange. These are typically used to implement a conversation between humans similar to Simple Message Service (SMS) texts. For a Real-time Event Manager, real-time events have expiration times and may be overridden by later events based on the semantics of the events. The real-time event manager controls the queuing, scheduling, and semantic processing of real-time events from sensors and to update situational awareness. 3rd Party Service Client APIs are used to invoke 3rd party services and $3^{rd}$ party developers who can leverage the platform for providing new applications to businesses and end customers.

The operations functionality 44 are the administrative interface into the system 10. The administrative functions must operate even in when the rest of the system 10 is unavailable, and the rest of the system 10 should continue to function even if the operations subsystem is unavailable. Customization Configuration captures the aspects of system 10 that are common across all of the sites and staff of and enterprise. Provisioning sets up the system 10 for each site and each staff member. Reporting performs queries against and formats the results of queries against the accounting data. The operations center includes all of the logic needed to support the Network Operations Center (NOC). The NOC monitors the health of the entire infrastructure of the system 10. The Management UI can include Web, command line, and API interfaces. The Management UI is the common behavior needed for all of the interfaces. Deployment provides the specialized wizards and documentation needed to deploy the system 10 at new enterprises and new sites. Web Dashboards provide the monitoring GUIs needed by enterprise owners and administrators. Web Portals provide the starting point for web based interfaces for each of the roles. Diagnostics consist of queries and workflows that help discover causes when problems are reported.

Real-Time Experience Management System Architecture

Figure 3:
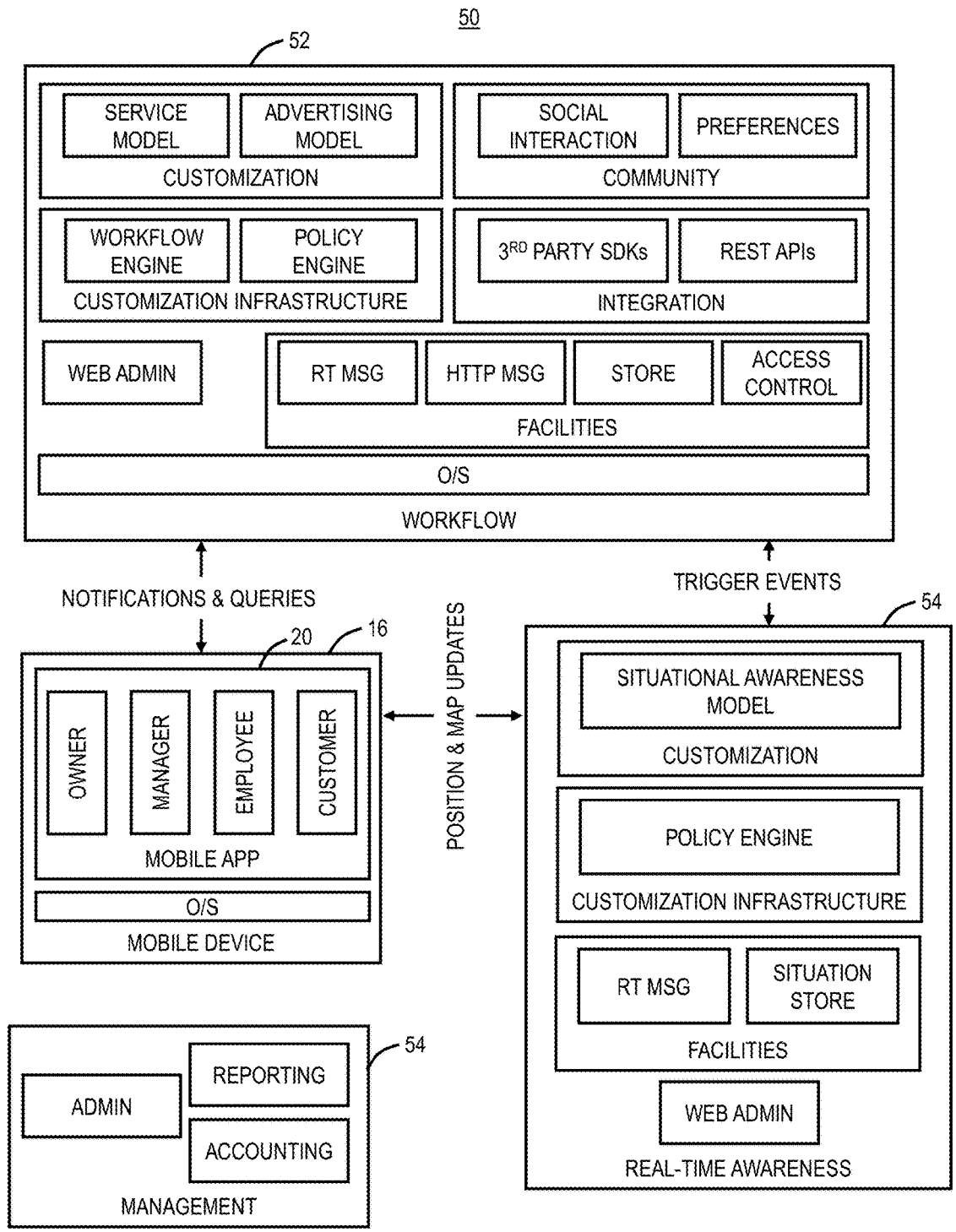
FIG. 3 is a block diagram of an exemplary architecture of the real-time experience management system of FIG. 1.

Referring to FIG. 3, in an exemplary embodiment, a block diagram illustrates an exemplary architecture 50 of the real-time experience management system 10. The architecture 50 can include a workflow component 52, a real-time awareness component 54, and the mobile device 16. The workflow component 52 and the real-time awareness component 54 contemplate operation on various servers and/or in the cloud 30, 34 whereas the mobile device 16 is carried by the person 14C, 14E, 14O, 14M (manager). The workflow component 52 is responsible for handling core functionality of the system 10 as is described herein, and the real-time awareness component 54 is responsible for handling real-time updates, location tracking, event tracking, etc. in the system 10. The mobile device 16 is configured to interface both to the workflow component 52 and the real-time awareness component 54, i.e., to the workflow component 52 for notifications and queries associated with using the system, and to the real-time awareness component 54 for position and map updates. The real-time awareness component 54 is configured to interface with the workflow component 52 for triggering events. The architecture 50 can also include a management component for administration, reporting, and accounting.

Again, the mobile device 16 includes the mobile application 20 ("app") which can be different based on classification of a user of the mobile device—owner, manager, employer, customer. The mobile device 16 includes an associated operating system (O/S) such as iOS, Android, Windows, Web browser, SMS/Email clients etc. The real-time awareness component 54 includes customization, a customization infrastructure, facilities, and a Web admin tool. The customization includes a situational awareness model providing a model of the site 12. The customization infrastructure includes a policy engine which can trigger events. The facilities include a real-time (RT) messaging function and a situation store which facilitate real-time monitoring of the persons 14 in the site 10. Generally, the real-time awareness component 54 includes a database that separately tracks all activity, location, etc. in real-time from the workflow component 52.

The workflow component 52 performs the core functionality of the real-time experience management system 10 as is described herein. In that manner, the workflow component 52 interfaces with the real-time awareness component 54 to have the latest information to act upon to ensure premium experiences. The workflow component 52 includes customization, a customization infrastructure, community, integration, facilities, and a Web admin tool. The customization includes a service model (which models, in real-time, the site 12) and an advertising model (which enables the site 12 to get customers to visit for an experience). The customization infrastructure includes a workflow engine (to model the experience) and a policy engine (to adapt to changing experiences). The community includes social interaction (to manage customers and their community) and preferences (such that the site 12 can have information on the person 14C to optimize the experience). The integration includes third party software development kits (SDKs) and Representational state transfer (REST) APIs. The facilities include RT messaging, Hyper Text Transfer Protocol (HTTP) messaging, data store, and access control. The facilities can also include HTML, JSON, SMS, email, SIP, telephony, etc.

Real-Time Experience Workflow Management

Figure 4:
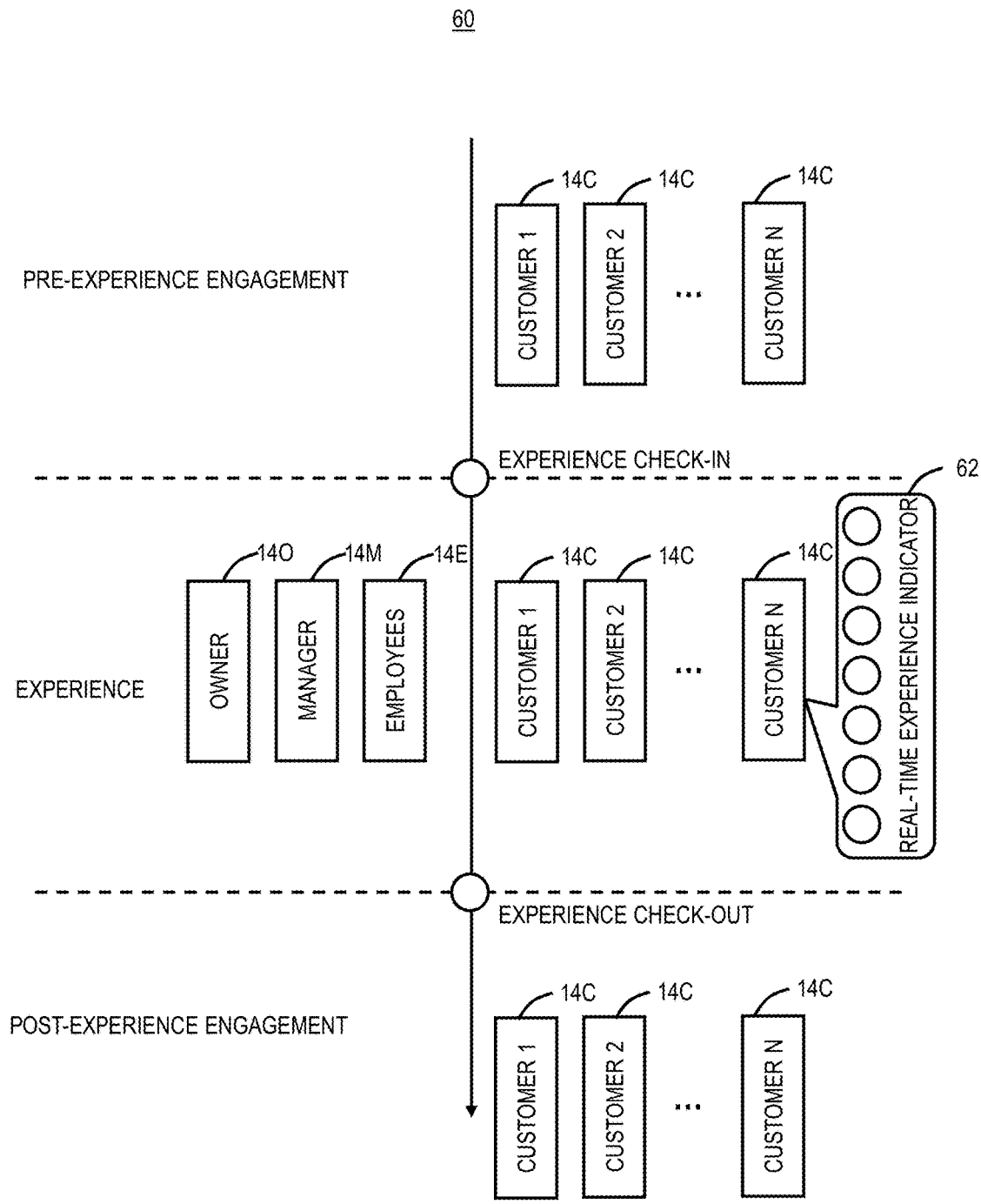
FIG. 4 is a workflow diagram illustrates a workflow using the real-time experience management system of FIG. 1.

Referring to FIG. 4, in an exemplary embodiment, a workflow diagram illustrates a workflow 60 using the real-time experience management system 10. The workflow 60 contemplates using the various components, functionality, and architecture described herein. In the workflow diagram, time is illustrated vertically, and the workflow 60 can include pre-experience engagement of the customers 14C, experience management of the customers 14C by owners 14O, managers 14M, and/or employees 14E of the site, and post-experience engagement of the customers 14C. Of note, all of these experience interactions can be in real-time, based on current conditions, etc. In this manner, the workflow 60 acknowledges experience is the ultimate data bridge with the customers 14C. The workflow 60 seeks to encode and manage experience flows by streamlining and personalizing each touch point with the customers 14C, contextual situation/guest handling of the customers 14C, and non-intrusive upselling and promotions to the customer 14C.

The pre-experience engagement can include registration by the customers 14C, preference generation, geo-fencing (customer 14C is nearby, push an offer, etc.), etc. For example, a VIP customer 14C has an appointment, but based on location detection from the mobile device 16, it is determined the VIP customer 14C is running late—so, reschedule to a later time to accommodate, etc., or a previous customer 14C is nearby and has not visited the site 12 in a while and there are new promotions that may interest the previous customer—so, push a notification, etc. Once the customer 14C arrives at the site 12, there is an experience check-in. This can be manual, i.e., the customer 14C physically checks in via the mobile device 16. However, more importantly, the check-in can be non-intrusive—the customer 14C is automatically detected based on iBeacon, Bluetooth LE, NFC technology, etc. While at the site 12, the entire experience is tracked for each of the customers 14C such as through a visual representation of the site 12 with some real-time experience indicators 62 such as color coded icons that move and change state over time to represent the current state of experience of each of the customers 14C.

The real-time experience indicators 62 can be used to enable the owners 14O and the managers 14M to ensure premium experiences. For example, if the customer 14C has a problem, these can be rectified in real-time. The employees 14E can receive instant feedback to maintain consistency in the experience, and the customers 14C can provide feedback non-intrusively. The real-time experience indicators 62 can include exemplary stats such as: check-in/check-out, pending orders/checkouts, steady state, pending personalization, problem to address, etc. The post-experience engagement can include updating preferences of the customers 14C for future visits, etc.

The system 10 and the workflow 60 are a unique real-time data model for an experience leveraging the mobile device 16, wireless technologies, sensors, the Internet of Things, etc. These leverage each customer's data (real-time location, sensor-data {like blood pressure}, profile data {past history, customizations, personalizations}, interaction-data {things that the customer did within this experience}), each employee's data (past history, location within the business and proximity to where the experience is in progress, each manager's data (past history, location within the business and proximity to where the experience is in progress), etc. The data is combined with experience workflows per interaction. For example, the owner 14O might want to know if a VIP table is running late, to come apologize personally, or a dietician might need to be notified when the attending doctor changes calorie limitation of the patient. This is combined with personalized information on products/customizations, ordered/cancelled/updated, and status change (pending/confirmed/ready/delivered), and with resource status that are used as part of the experience. For example, for resource status, in restaurant scenarios that would be tables, for hospital it would beds, oxygen cylinders, wheel chairs, etc. This is combined with sensor information available to the system 10. Sensor information could include mobile sensors like Google glass and other mobile devices or sensors within the business that can provide additional context about customers/staffs.

In the workflow 60, each experience could be further be broken down into separate experience flows. For example: An in-patient who is admitted into the hospital would have several associated flows—a) Pre-experience check-in flows: surgery reservation flow, valet flow; b) In-experience flows: doctor flow, MRI flow, food ordering flow (nurses, dietician, food and beverage manager, delivery person); c) Checkout flows: billing flow, discharge flow, room cleaning flow, valet flow Also, experiences can be grouped. A restaurant experience can be combined with hotel stay experience to create composite experience.

The system 10 and the workflow 60, for the first time ever using this model, create a unified and bridged view of an experience between a business and each of its customers 14C. On top enabling the broad benefits listed above for the business, it is enabled for customers 14C to save each experience and its memory in a rich and personalized manner. This enables the customers 14C to engage (share/discover) with the content within their communities.

In order to make the experience and its interaction extremely easy to use and extensible, a unique user interface boils the entire experience along with its unique identifier to a status color with associated status message—the real-time experience indicators 62. The benefit of this user interface is that this works with small real-estate interfaces like wearable watches, Google glass and also with audible devices. An experience status could be the status of a group of customers within the experience or it could be experience status of one customer within an experience. This experience object can be interacted with both businesses and customers. Customers 14C can now personalize the experience themselves using their mobile interface (smartphone, wearables, audible) to do any action that the staff can perform (e.g., call valet/waiter/doctor/nurse, order, add friend, share experience) as if the staff is performing the action. This user interface also allows us to track in real-time at each location how the overall experience is progressing as each customer is individual tagged with the color code and status message.

On the customer side, the data model enables the system 10 to seamlessly capture, using a combination of location (GPS/ibeacon/BLE/Geo-fencing), motion detection (sitting/walking/driving), a journal of experiences that the customer is having on a daily basis. He/she can later on review these experiences (businesses/places where they were) and add notes/geo-reminders/create-calendar-events. This experience journal is used to create an experience profile of the customer 14C which is further used for creating/recommending great experiences to him/her.

Again, in the system 10 and the workflow 60, each staff member (the persons 14E, 14M, 14O) has mobile app running on smart phone or wearable device (the mobile device 16). In some cases the request-responses can be delivered by SMS and email as well. All interactions with the applications are tracked as part of the experience flows. Each staff has one or more roles. The application features accessible and notifications received by the staff are a function of the role the staff is playing as part of the experience flow. One or more touch points with the experience flow where action is required by the staff can be automated thru software or driven manually by the customer 14C as well. The customer 14C can also have the app, but that is not necessary. Specifically, the system 10 contemplates data-driven by the staff and leveraging NFC, BLE, iBeacon, etc. to identify the customers 14C non-intrusively. The backend is running on cloud service (the cloud 30, 34) and two kinds of database. One is a big data database which is tracking and storing all real-time data (the real-time awareness component 54) and another is a relational database that stores all the information needed for managing, designing, and delivering experience flows (the workflow component 52).

Unique to this solution and for the first time ever, the system 10 enables experiences and product customizations to be cloned. An example of experience cloning: one can copy their friend's entire trip to Venice and the system 10 will help you clone all the restaurants visited, make bookings when a particular chef is available, arrange for the same tour service that the friend used. The system 10 enables a replay of entire action on the floor minute by minute on how customer experiences progressed thru out the data; rating performance of each staff based on customer experience delivered, personalization delivered; tracking sales and products sold, growth in customer base (including communities . . . neighbors, schools, corporates) against customer experiences being delivered; etc. The system 10 provides an ability to compare communities and rank their similarities based on the experiences consumed and shared; to compare businesses and rank their similarities based on the experiences consumed and shared; to compare customers and rank their similarities based on the experiences consumed and shared; to compare products and rank their similarities based on the associated experiences; etc.

Merchants can use the mobile application 20 sitting on tablets/computers/POS terminals/etc. to determine the most appropriate customization and personalization to be applied to the customer 14C. The customization and personalization is based an intelligent relevance and trust engine which takes into consideration who the user is, which is represented by a user's community ID. This ID is tracks and associates (personal data of user like age/sex/birthday/anniversary, local community data like (which company, which college, which gym, which golf club . . . etc.), public/private community data like (Facebook/LinkedIn/twitter, etc.), product usage community data (like goes to coffee 10 times a week, or has Starbucks coffee mostly etc.) and other community data (this internal community classifications that is built into the system 10)

Customization can be in several flavors: instant offers, instant complimentary, instant customized experience like a special table or a special kind of product designed just for the user. Customization can happen online/mobile . . . by showing and serving advertisements/announcements on products/services/events applicable to the user's community. The system 10 offers a new model of trust and engagement creation of products and services within a user's community using referrals/reviews/recommendations etc. Whenever a user does a transaction (buys/uses/views/sharing) a product/service, a notification can be generated to all the user's community members to create trust and engagement. A user who does the transaction, the user is requested a review, tagging and rating, which when acted upon creates a notification which is available only to his/her community members. There can also be a unique sharing model: all sharing of information takes the following forms based on the user's and system's default: a. User can set the privacy to either personal, family, specific community (work, college, gym, my favorites groups . . . ) with one or multiple of them; b. the system takes the data generated per transaction (buys/views/uses/sharing/recommendations . . . etc.) and annonimizes the data and publishes the data to all of users communities either individually or as a collection. The collection is data object created to group transactions within each community.

The system 10 can include a building community centric analytic dashboard/reports for merchants to view all the communities in any geographic area to view community specific statistics (transactions, sharing, feedback, users, frequency) and relative statistics which compare general relevance of the community to community specific relevance This model allows for the merchant to target new communities or existing communities (which have business with the merchant), with one click, without having to spam the users and also having any prior engagement or relationship with community administrators. The system 10 is building community centric dashboard and transaction/sharing feed for community members to view product and merchant data which contains only their community related data. This data is further organized to convey general relevance and trust to the user's community type and specific relevance and trust to their specific community.

Figures 5, 6:
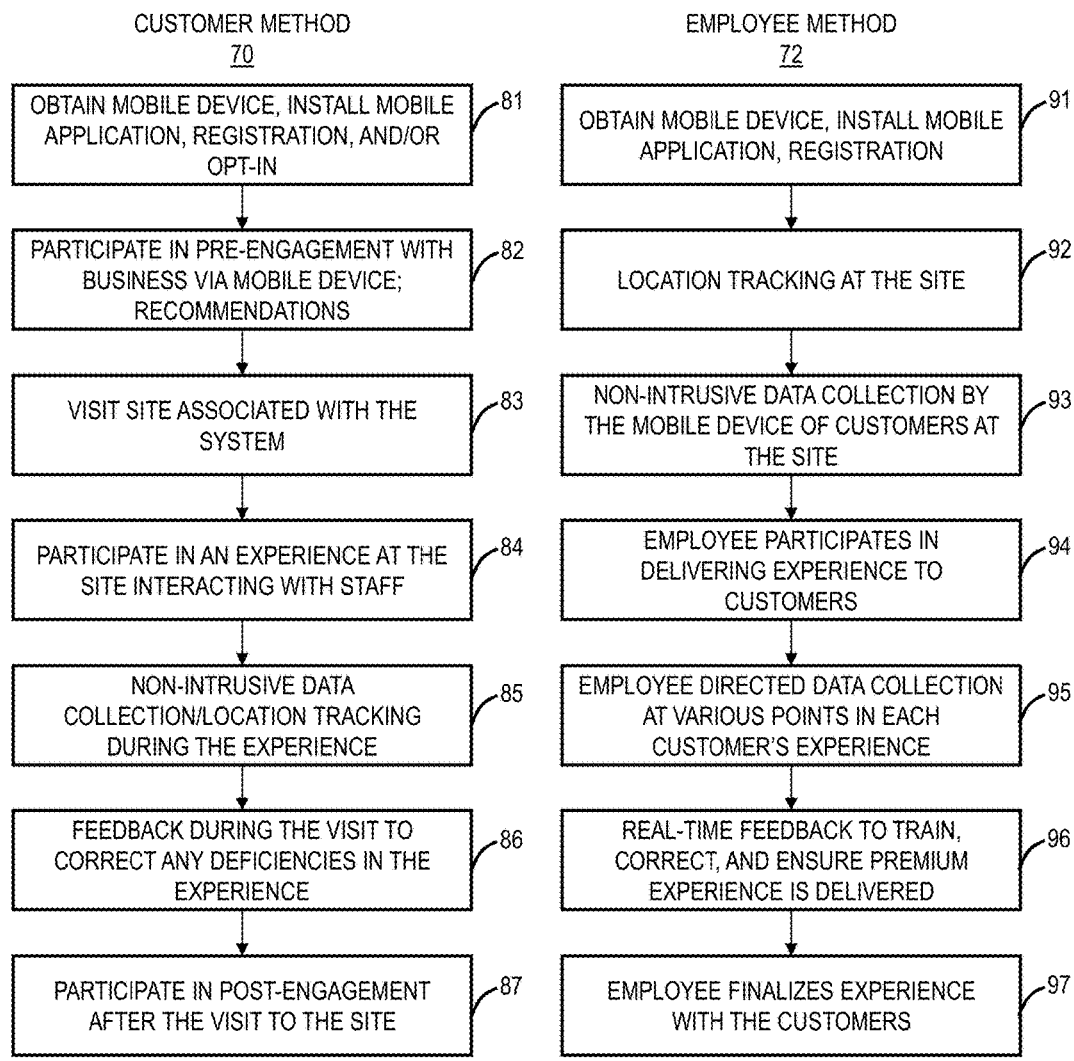
FIG. 5 is a flowchart of a customer method in the system of FIG. 1 and the workflow of FIG. 4.
FIG. 6 is a flowchart of an employee method in the system of FIG. 1 and the workflow of FIG. 4.
Figures 7, 8:
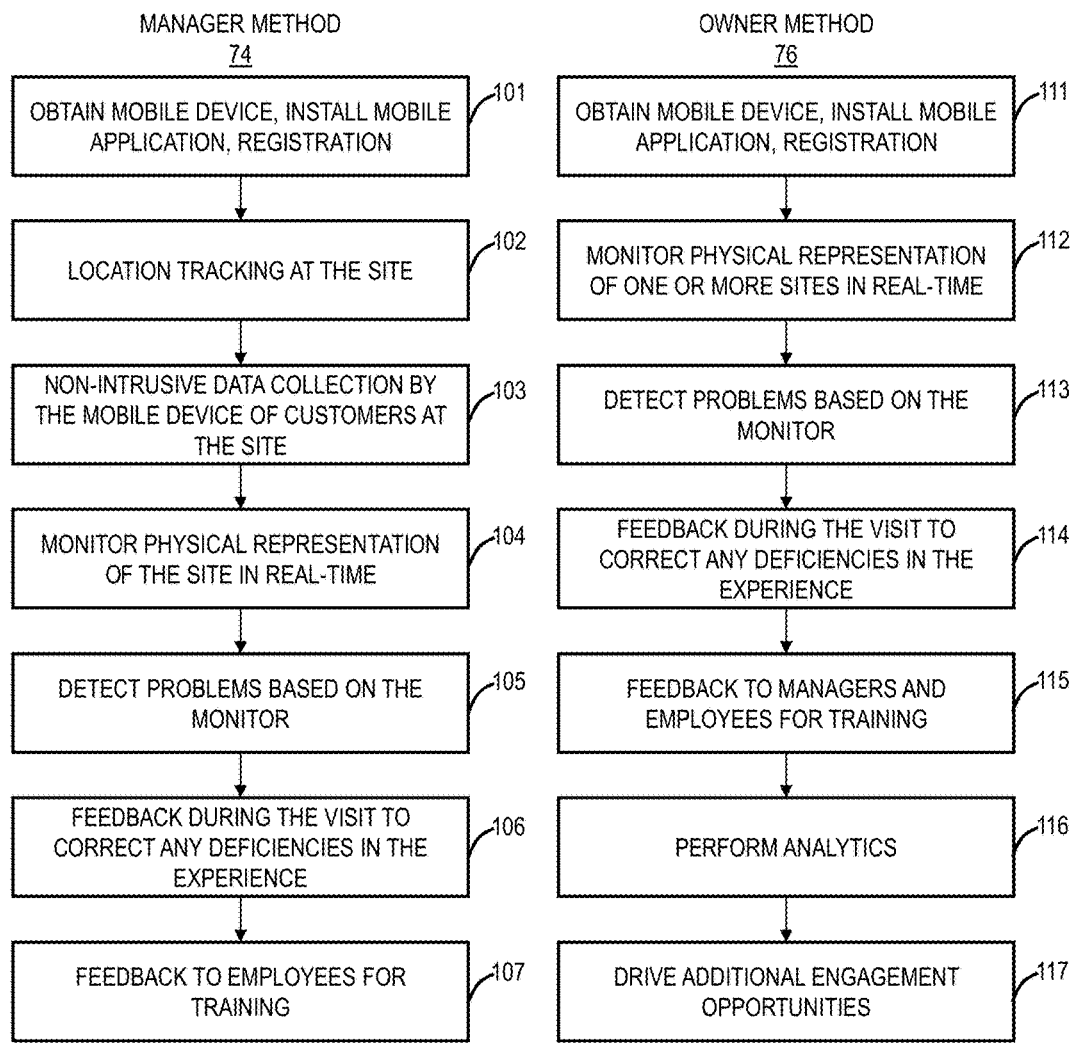
FIG. 7 is a flowchart of a manager method in the system of FIG. 1 and the workflow of FIG. 4.
FIG. 8 is a flowchart of an owner method in the system of FIG. 1 and the workflow of FIG. 4.

Referring to FIGS. 5-8, in various exemplary embodiments, flowcharts illustrate role-based methods 72, 74, 76, 78 for activity in the system 10 and the workflow 60. FIG. 5 is a flowchart of a customer method 72 in the system 10 and the workflow 60, FIG. 6 is an employee method 72 in the system 10 and the workflow 60, FIG. 7 is a manager method 74 in the system 10 and the workflow 60, and FIG. 8 is an owner method 76 in the system 10 and the workflow 60. The methods 72, 74, 76, 78 are described generally with respect to the site 12, i.e., these contemplate use in any context—restaurant, hospital, doctors office, spa/salon, department store, etc. Of course, each different type of business, service provider, etc. may have customizations and unique aspects to their workflow, and these are all contemplated herein. That is, the system 10 can apply to any site 12 where there is some experience ongoing. Further, the various steps in the methods 72, 74, 76, 78 are presented for exemplary illustration; there can be additional steps and the steps can be performed in a different order.

The customer method 70 includes obtaining a mobile device, installing mobile application, performing registration, and/or opting in (step 81). First, the system 10 relies on the fact that the vast majority of people own and carry smart devices. This is the gateway of the system 10 into the experience tracking of the customers 14C. Optionally, the customer 14C can install the mobile application 20 (e.g., from the App Store, Android Marketplace, Windows Store, etc.), register with the system 10, and opt-in to tracking. The customer 14C can participate in pre-engagement with business via mobile device; recommendations (step 82). The customer 14C can visit the site 12 associated with the system 10 (step 83), participate in an experience at the site 12 interacting with staff (step 84), have non-intrusive data collection/location tracking during the experience (step 85), provide feedback during the visit to correct any deficiencies in the experience (step 86), and participate in post-engagement after the visit to the site 12 (step 87).

The employee method 72 includes obtaining a mobile device, installing the mobile application, and registration (step 91). The employee 14E is an active user in the system 10 with location tracking at the site 12 (step 92), non-intrusive data collection by the mobile device of customers 14C at the site 12 (step 93), the employee 14E participates in delivering experience to customers 14C (step 94), and employee directed data collection at various points in each customer's experience (step 95). Specifically, the employee's mobile device can capture data at the direction of the employee 14E where the employee 14E enters data at various touch points with the customer 14C as well as non-obtrusively—the employee 14E's location is tracked making sure there is adequate coverage, the employee 14E's mobile device can interact with the mobile device of the customer 14C, etc. The employee 14E can receive real-time feedback to train, correct, and ensure premium experience is delivered (step 96), and the employee 14E finalizes experience with the customers 14C (step 97).

The manager method 74 includes obtaining a mobile device, installing the mobile application, and registration (step 101). The manager 14M is an active user in the system 10 with location tracking at the site 12 (step 102) and non-intrusive data collection by the mobile device of customers 14C at the site 12 (step 103). The manager 14M can monitor physical representation of the site 12 in real-time (step 104), detect problems based on the monitor (step 105), provide feedback during the visit to correct any deficiencies in the experience (step 106), and provide feedback to employees for training (step 107). The owner method 76 includes obtaining a mobile device, installing the mobile application, and registration (step 111). The owner 14O can monitor physical representation of one or more sites in real-time (step 112), detect problems based on the monitor (step 113), provide feedback during the visit to correct any deficiencies in the experience (step 114), provide feedback to managers and employees for training (step 115), perform analytics (step 116), and drive additional engagement opportunities (step 117).

Premium Experience Model

The system 10 models all interactions of customers 14E with enterprise systems and staff as an "experience". This model is different from current model where interactions are modeled as transactions of different types (purchases, leads, shares, etc.). An experience has following core elements: a) Time Interval: This is an interval in time which is typically non-zero in length but can be zero length timed interval as well; b) Location(s): Where locations where the interactions happened, e.g.: booking at home, going to hotel, going to spa, etc.; c) Customer(s): In each experience there are one or more customers. If there are multiple customers then they can intelligently categorized into dynamic ad-hoc groups or static groups for friends/family/colleagues/neighbors, and Customer Identification can include each customer being part of multiple communities (ad-hoc/static/defined by the system 10 (e.g., loves pizza, repeat) or defined by the enterprise (e.g.: VIP); d) Personalization: Each service used by each customer part of the experience is tagged against the customer; and e) Services: These are all the services that were interacted with during a particular experience.

The personalization is tagged through several sources: i. Self-Expression: Customers self-expressing their preferences via signup or through other APIs or sensors such as a wearable devices like fitbit; ii. Enterprise private tagging: Enterprise staff can for their own record tag customer with different identifications tags like VIP, etc., Enterprise tagging includes occasion for each experience like business lunch, routine checkup, anniversary, etc.; and/or iii. Derived through tracking various behaviors in the system 10: products used/liked, customization preferred. The services includes capturing the following: i. Services: like ordering food, or ordering a message, or corporate event, or getting car serviced or various settings in a hotel room. All of the elements of the service are captured in a manner that they can be resubmitted/re-ordered/re-configured; ii. Workflows: This includes the entire workflow where there is interface with enterprise system or staff where personalization or efficiency can be delivered. For example in a restaurant visit there are several workflows for food ordering and delivery, for guest seating and then for calling valet. iii. Staff: Various front-end staff (which was responsible for the service delivery and backed Interactive Sensors Per Experience Each experience is visually modeled as a sensor. A sensor closely follows the feeling that enterprise and the customers 14C part of the experience go through using the characteristics captured in the experience object model. This is unique. Current state of the art model interactions as several different individual elements of a transaction. The sensor has following unique characteristics:

1) It can be virtual or physical: a. A virtual sensor can be dropped on a location (fixed or relative) like a table, room, bed, airplane seat etc. or can dropped on customer(s) who can be mobile. The virtual sensors can we viewed thru mobile/web apps for staff/enterprise/customers. These virtual sensors could also be tracked thru auditory devices (Bluetooth headset connected to mobile phone or internet). They can also be overlaid on a physical view using technologies like Google Glass; b. Physical sensor can be modeled in various forms to mimic the virtual sensor. For example: It would be touch screen on the table, in a hotel room, or a wrist band. Physical sensors can communicate in visual or auditory form;

2) Sensor is a observable and inter-acted, depending on authorization and access controls, with through various applications of staff, enterprise and customers: a. Mobile devices like tablets, phones or web pages; b. Wearable watches or glasses or blue-tooth headsets; 3) Sensor captures the entire experience data in a each location of interaction; 4) Sensors reflects various states and notifications of an experience to be managed by or as a feedback to the staff, enterprise and the customers: a. States and notifications of each service workflow: For example: a table of 4 waiting for order could be tagged red with 4, or someone order is delayed; b. States and notifications of personalization per customer or per occasion: For example: customizations offered, celebrating wedding anniversary; c. States and notifications of preferred relationships: For example: VIP or from some community; 5) Sensor also give out notifications to inform the change in state for feedback purpose or to alert different parties to take action; 6) Sensors can be policy driven in state changes based on enterprise policies or customer's privacy policy; 7) Enterprise & customer sensors could interact to capture and deliver premium experience in a seamless manner.

Scaling Delivery of Premium Experiences and Seamless Self-Expression of Customers The system 10 enables handling staff churn and getting new recruits up to speed for delivering premium experiences: a. through the intuitive virtual interface available to management, management can quickly fix any errors or support the new employee; b. Automation of policies related to experiences the sensors can remove manual operations by the new employee; c. Storing and assimilating knowledge related to premium experiences, there is less knowledge lost when an employee leaves and the customer can get similar level of premium experiences; and d. Automation of customer(s) and their personalization and their preferred relationships. The system 10 enables growing a business or adding another location: a. Experience policies and workflows could be easily be cloned to a newer location; and b. Increased management bandwidth is enabled due to remote access to real-time experiences in each location. The system 10 provides intelligent suggestions for each experience as derived by the system will reduce the dependency on skilled labor. All analytics are based on experiences, which give direct feedback to the enterprise on how each type of experience is doing in real-time and historical basis. 5. For the first time ever, enterprise management has data to act upon on the following: a. Staff performance on efficiency of service, personalization of service (seamless repeat orders, customizations, recognition of customers and their occasions, etc. Prior to the system 10, this was all done manually or through human memory. The system 10 determines how each and every workflow related to efficiency is performing in real-time. Also, since the experience has community data of customers (corporates, apartments, colleges, travelers, etc.), the enterprise has data on which communities to target and also where to open new stores.

The customers 14C do not need to ask for their personalization or things that they are waiting on (efficiency) or who they are (preferred relationships). 1. Using various identification mechanisms (IDs or physical devices like bands, mobile signatures, face recognition, etc.), the sensors can alert the enterprise and staff they auditory or visual means this data. 2. Using geo0location APIs from mobile, cell, wireless and other technologies, the staff and enterprise could be alerted on various experiences in progress at a location or with one or more customers. Since the system 10's sensors capture all experiences, analytics can derive and offer customers to pick and choose self-expression which they would like to repeat with the same enterprise or at another enterprise. Since the system 10 captures various elements as time, location and ad-hoc groups, the system 10 enables recommendations closer to the desired experience by customers. Using this data a new kind of trust and relevance mapping can be done for enterprises in each neighborhood for one or more customers.

Building a Community Inside-Out

Since the sensors capture the entire experience data related to services (staff, products), communities (ad-hoc/static) and personalization, the system 10 can now enable a deep customer engagement model from two perspectives: a. Peer-to-Peer engagement and b. Private community engagement. The Peer-to-Peer engagement can be between enterprise, the staff that was part of the experience and the customers who were part of the experience. i. Feedback or complaints can be exchanged and resolved; ii. Suggestions for future visits using auto generated or personal recommendations for next visit. For Private community engagement, customers who were part of the experience can engage with each other. i. Discuss with each other the memories of the experience. ii. Make it a calendar event for tracking it through means for repeating this in the future. This act is called cloning of experience with same or another group of customers. iii. Used for finding other such experiences using auto generated recommendations for this group of customers. These experiences can shared by the one or more of the customers 14C to their other networks like Facebook, LinkedIn, twitter etc. Shared experience could be copied easily by others in different networks. This provides a new way to engage with the enterprise as new customers can repeat experiences that they saw others have.

Top Level Concepts and Ideas

The system 10 can include a vendor to community marketplace with targeting and differentiated pricing and packaging. Profit sharing and packaging with groups of communities; the concept of repeatability and structuring of incentives based on community walk-ins vs end-users; Lets Go: Intelligent app to combine groups of users within a community, friends and family to make choices based on taste, available promotion, voting and suggestions by the system 10; Push Ad network: Vendors can push as many promotions as they want to targeted communities as and when they want and the system curates and present the data to the right audience in a communities based on usage pattern, taste relevance and trust of the community. "Taste relevance and Community Trust Engine"; Virtual currency: Ability to create virtual currency for community members which can redeemed at vendors. Vendor's ability to create targeted virtual currency towards communities which provides a mechanism for targeting performance per community. Trust creation through virtual currency; Shopping Identity: a unique shopping ID which can used for all product and vendor subscriptions of emails. The emails are parsed and curated based on the trust of the user's community membership and their transaction, recommendation, viewing and sharing pattern.

Top Level Usage and Feedback Loops

The system 10 can include relationship building: Promoting a product or service to one or more communities and receiving instant and summarized feedback on community transactions, views, sharing, recommendations, repeatability, etc.; Personalization: Unique concept of providing a app with swipe, barcode/QR code reading, geo fencing, NFC capability which can identify the user and associated hidden attributes from within the system 10 and other networks like Facebook, twitter, LinkedIn to customize and personalize the experience; Automated and private referrals: Upon transaction capturing requesting the users to recommend the service or tag the service, which is sent privately to the community that user is member of; Virtual Marketing manager: business model of defining virtual marketing manager who can target, personalize and request referrals from communities; Community engagement store: Dynamic store created based on user's community and users in store and online; Shopping street maps created based on location, intent and community trust; and Virtual experience manager and concierge as a service.

Natural Tools/Analytics and Recommendations

The system 10 can include street boards by local vendors: adding targeting, community data; a calendar as planning tool for vendor's targeting and historical analysis; Fishbowl for collecting community data and followers; Community board with community related usage within and anonymized data for other communities; and Calendar for users for planning. The system 10 can include similarity algorithms for vendors and communities based on community usage and tagging; and neighborhood, city, state, nation analytics based on community usage of different types.

Commerce Platform Based on Commercial Relationships

Vendors or merchants or businesses can build "commercial relationships" with consumer communities which are local and online. Consumer communities are of the following types: Corporates of all types where employees are the consumers; Colleges and schools where employees and students and student-parents are consumers; Residential buildings, streets, neighborhoods where resident households are consumers; Clubs which are defined vendors and the system 10 based on spending limits or service packaging like Elite, Premium, Platinum; and system defined consumer communities. The system defined consumer communities can includes Faithful: loyal customers at a business who do transactions regularly; Ambassadors: customers who recommend a product or service that they have used; A vendor's employees and his/her customers (who are known to the system 10); Groups of users who share a common attribute like: "near the business", "taste based like Chinese or based on products they have tried", etc.

Relationships are built on the platform by making products and service available to one or more communities. And relationships do not need to be negotiated a priori but can be from vendor or community if needed based on parameters like pricing, etc. But the main point is that there is no restriction who can create a relationship with whom. Relationship once in place grows and is characterized by various parameters: Transactions: People actually redeeming coupons online and offline, buying products online and offline or making reservations like services; Recommendations: After the transactions customers who recommend the service using system defined tags and comments; Sharing of the products, promotions, recommendations; Views of products, promotions, recommendations, vendors, people within the system; Data is collected and recorded daily, weekly, monthly and yearly tables.

User Interface Examples—Hospitality

Figure 9:
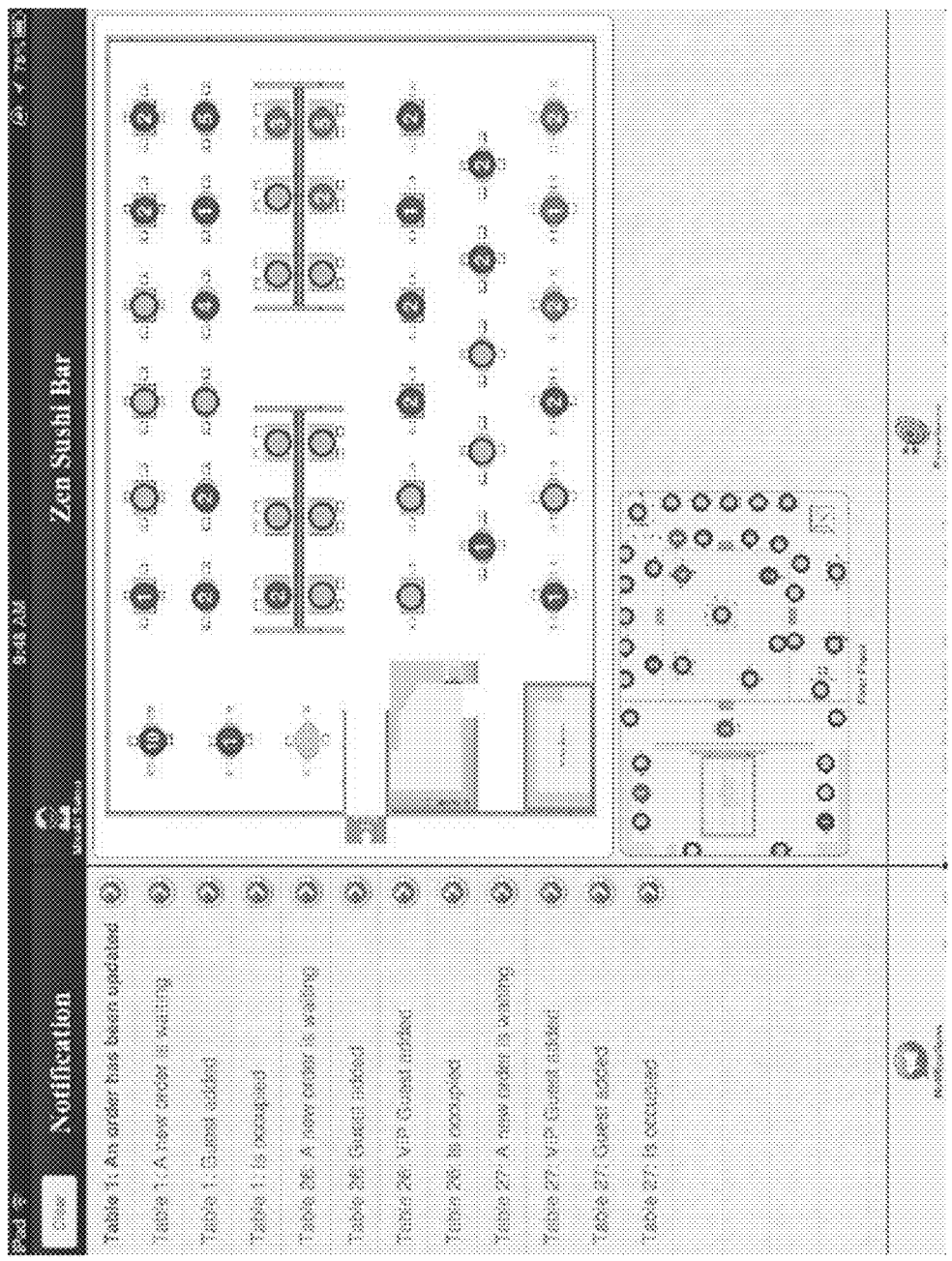
FIGS. 9-20 are graphical user interfaces of screen shots related to a hospitality example using the system of FIG. 1.

Referring to FIGS. 9-20, in various exemplary embodiments, graphical user interfaces illustrate screen shots related to a hospitality example using the system 10. For example, the hospitality example can be a restaurant with the GUI providing a virtualized representation of the site 12 with various icons for customers 14C, etc. In FIG. 9, a general screen shows the site 12, associated customers 14C and notifications on the left in an ongoing, scrolling fashion.

Figure 10:
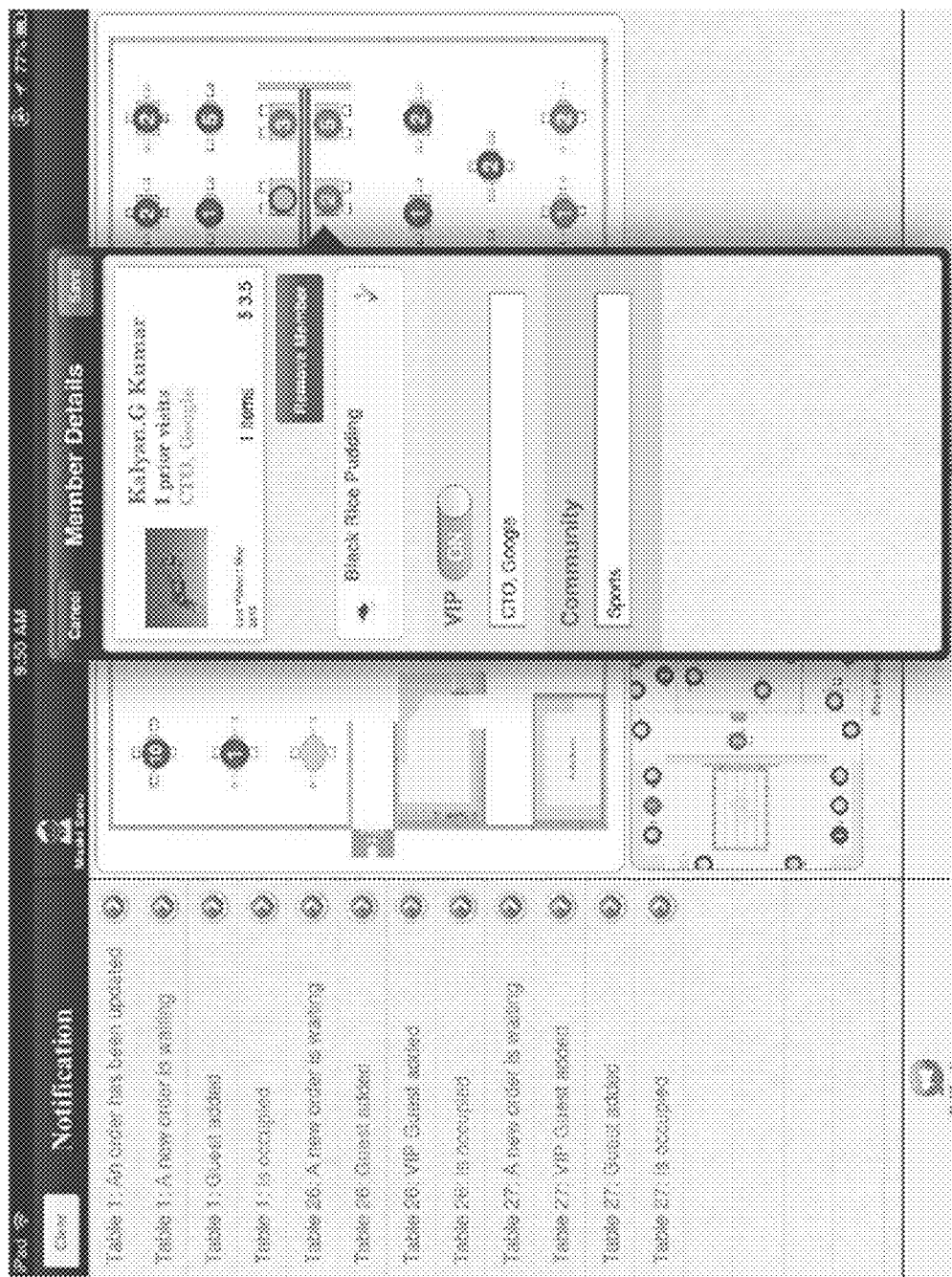
Figure 11:
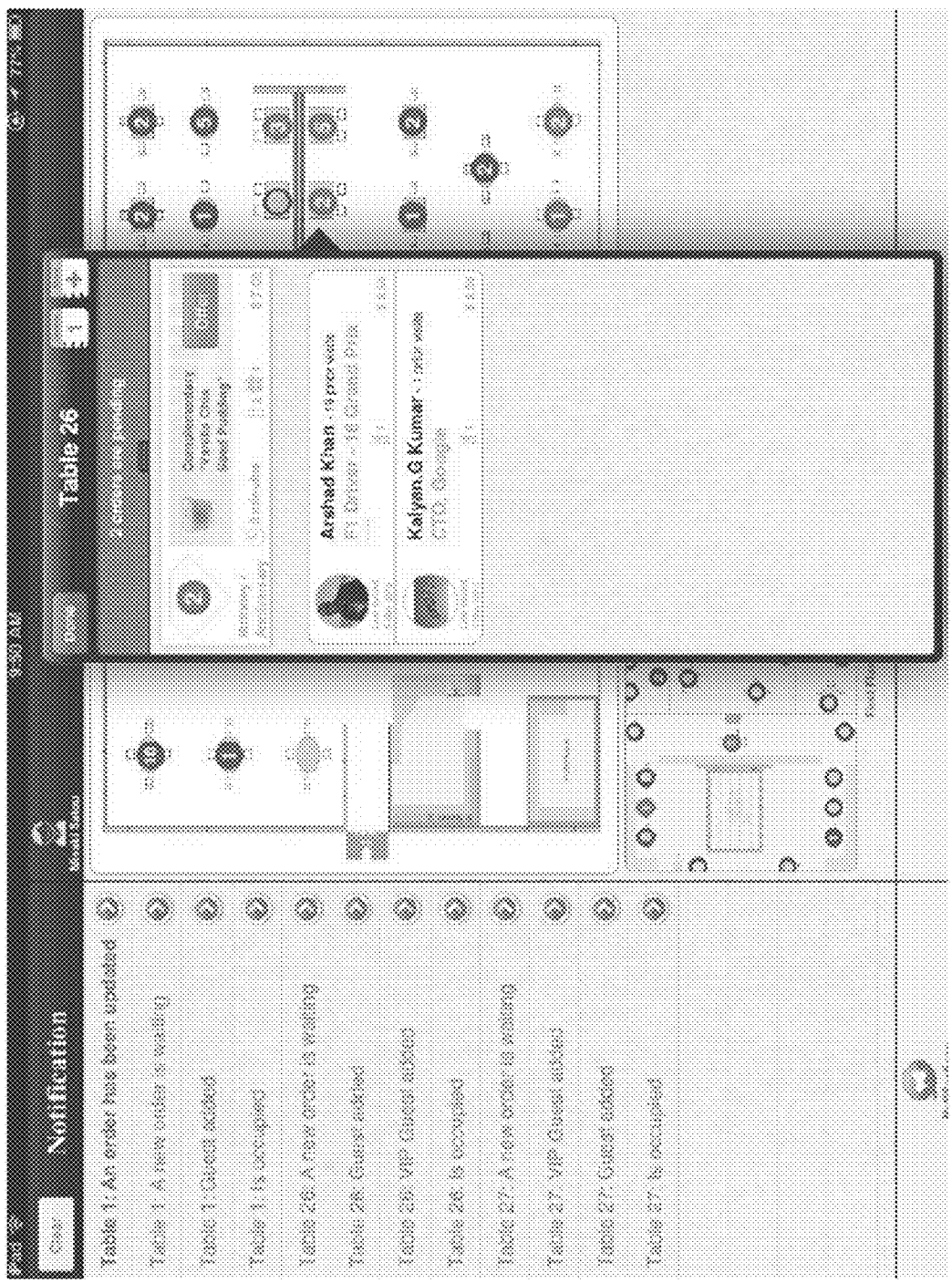
Figure 12:
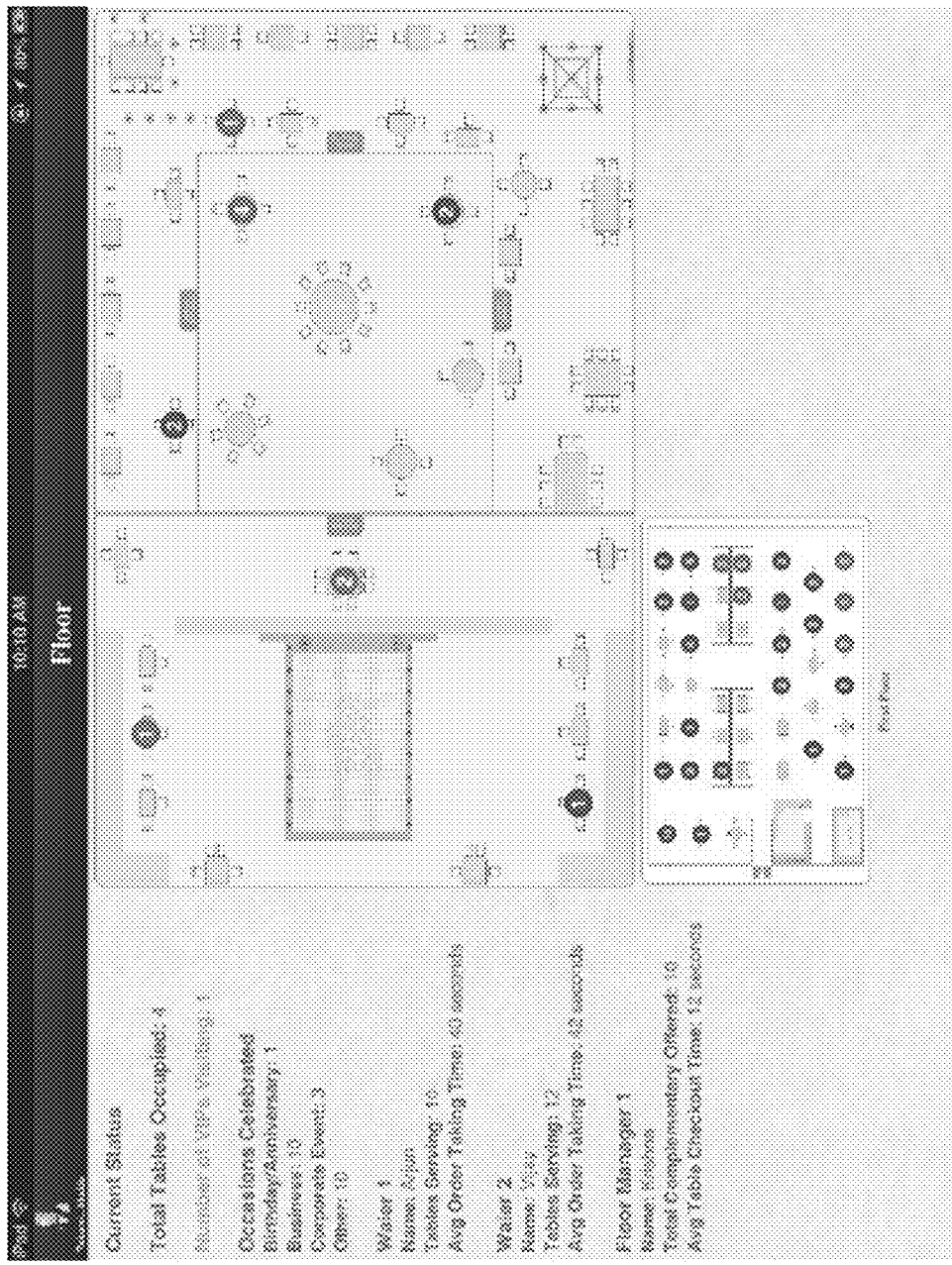
Figure 13:
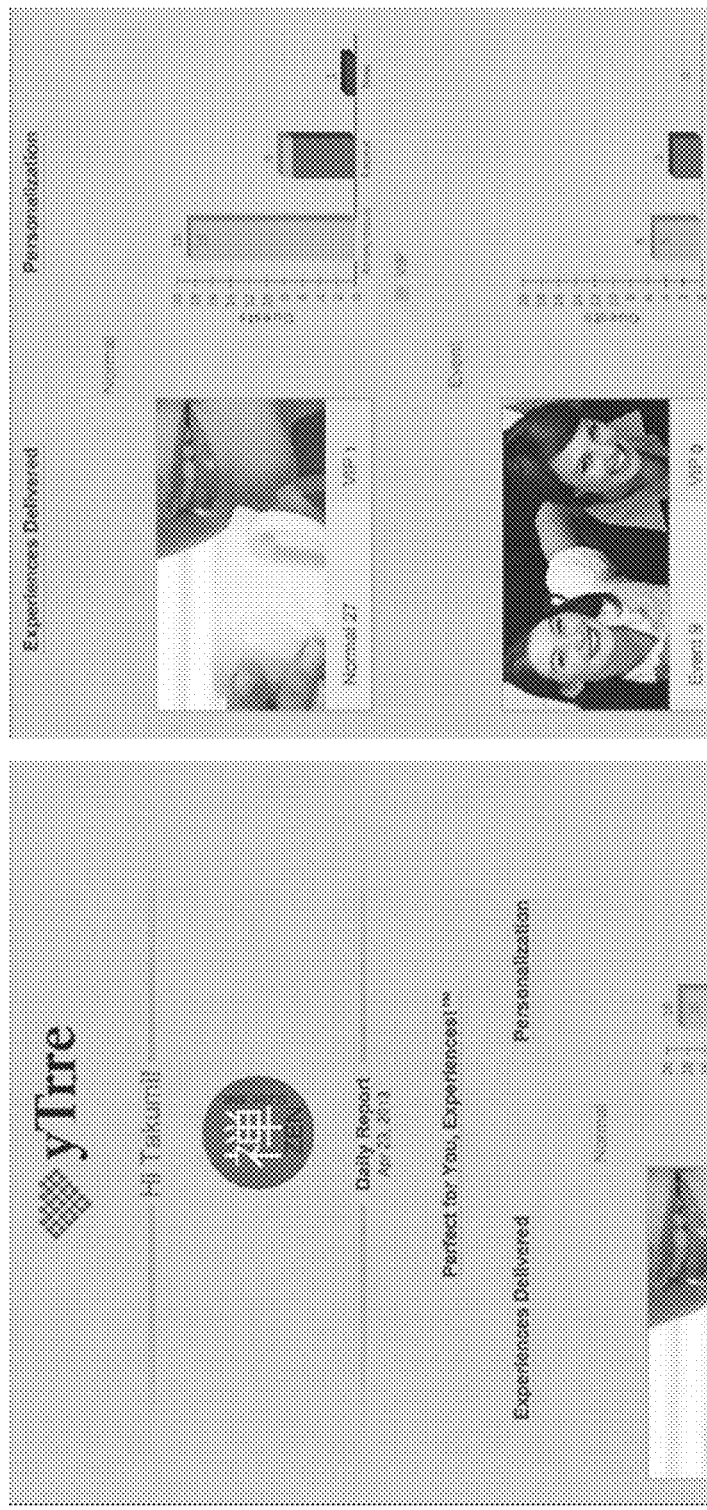
Figure 14:
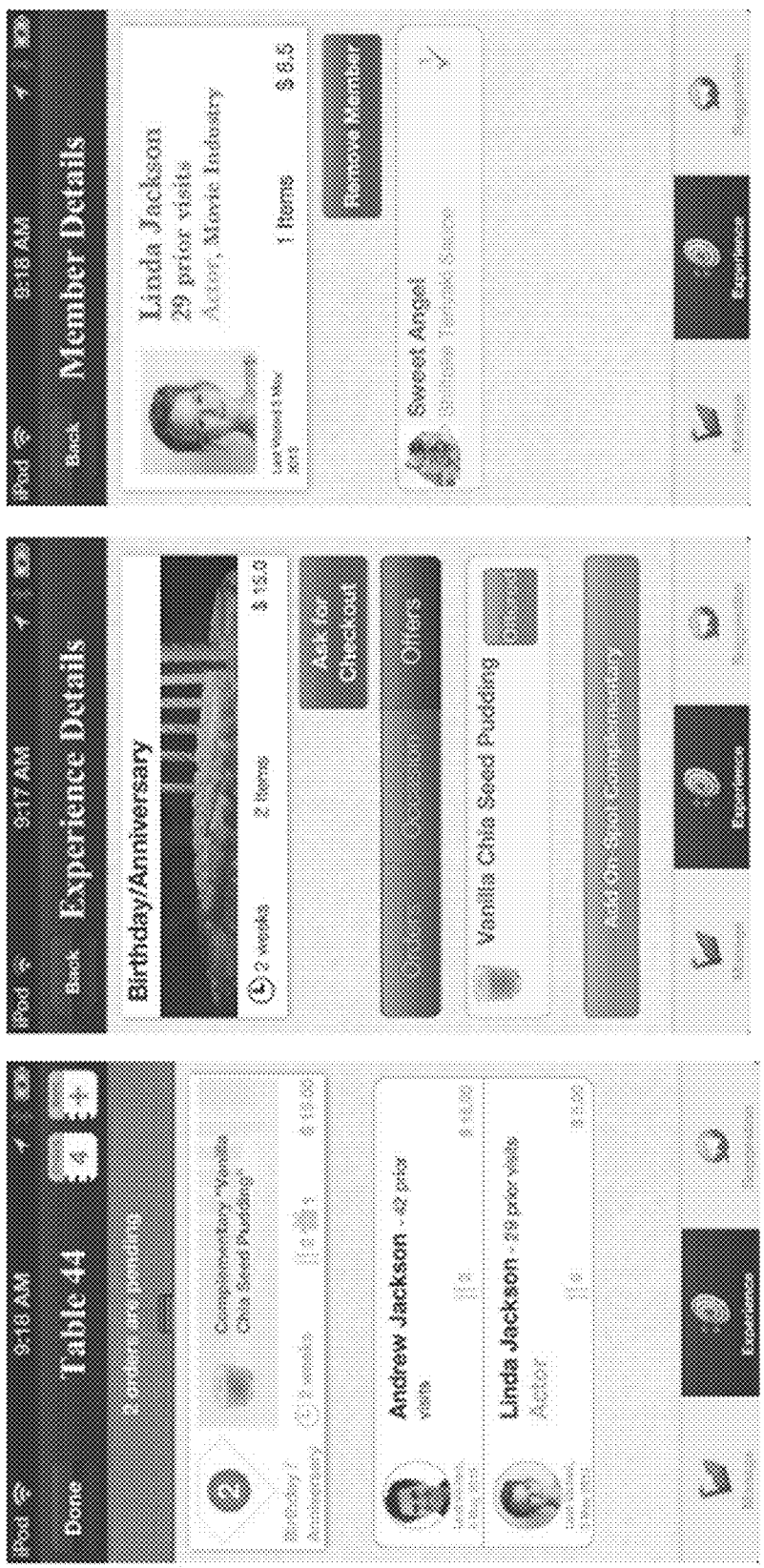
Figure 15:
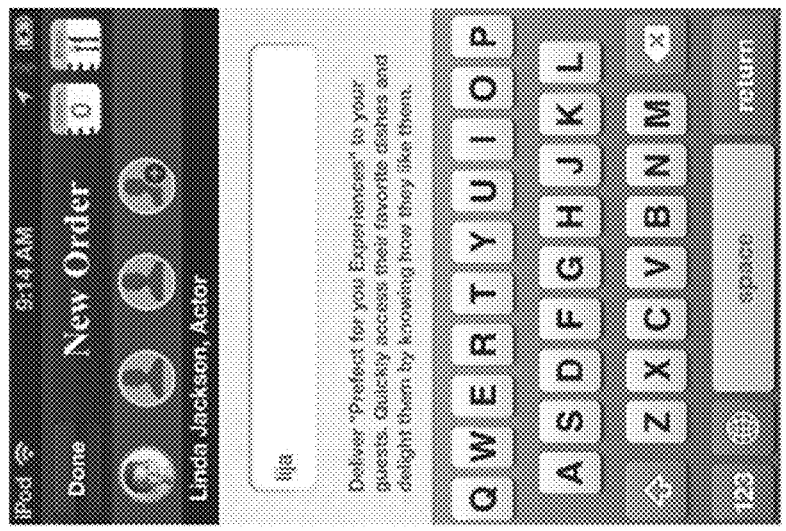
Figure 15:
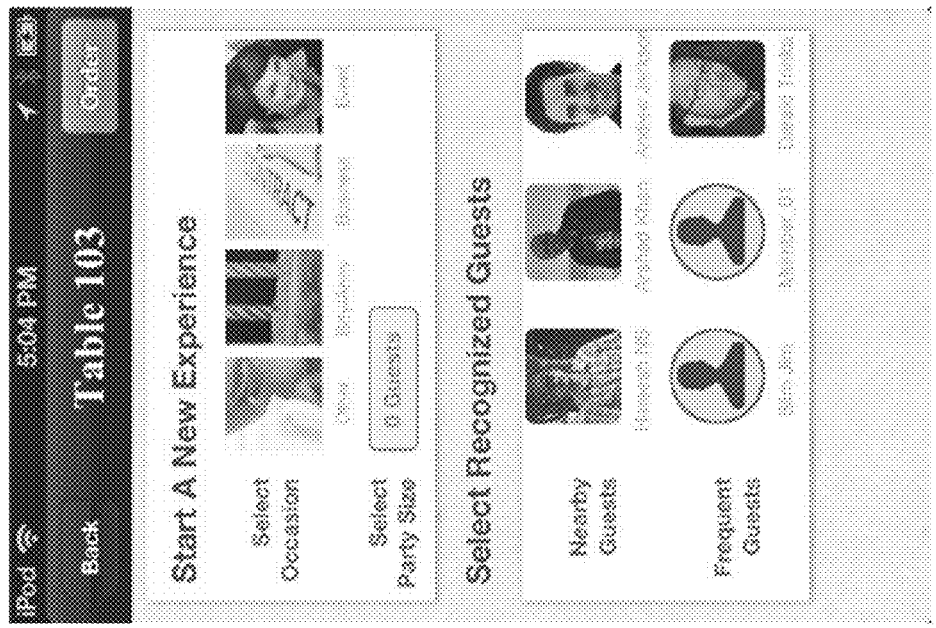
Figure 16:
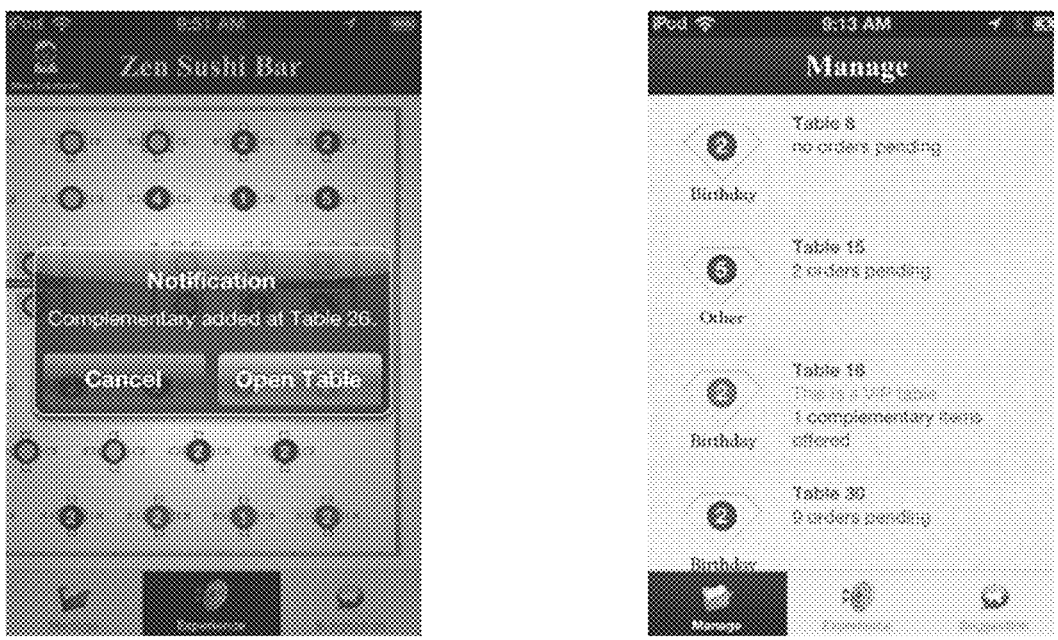
Figure 17:
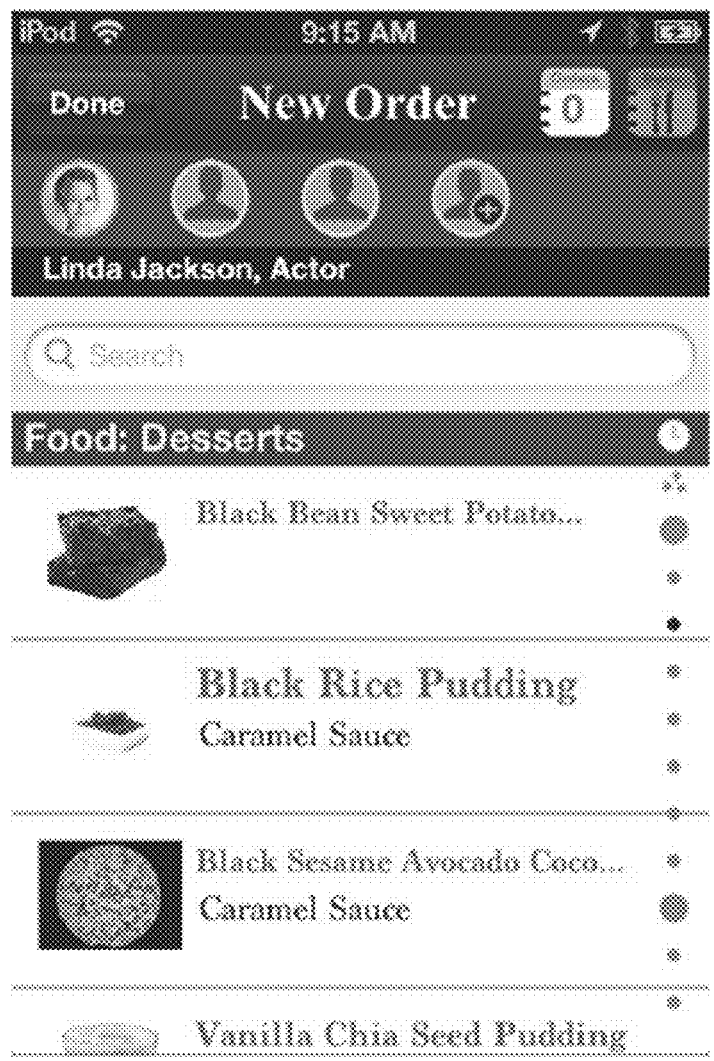
Figure 18:
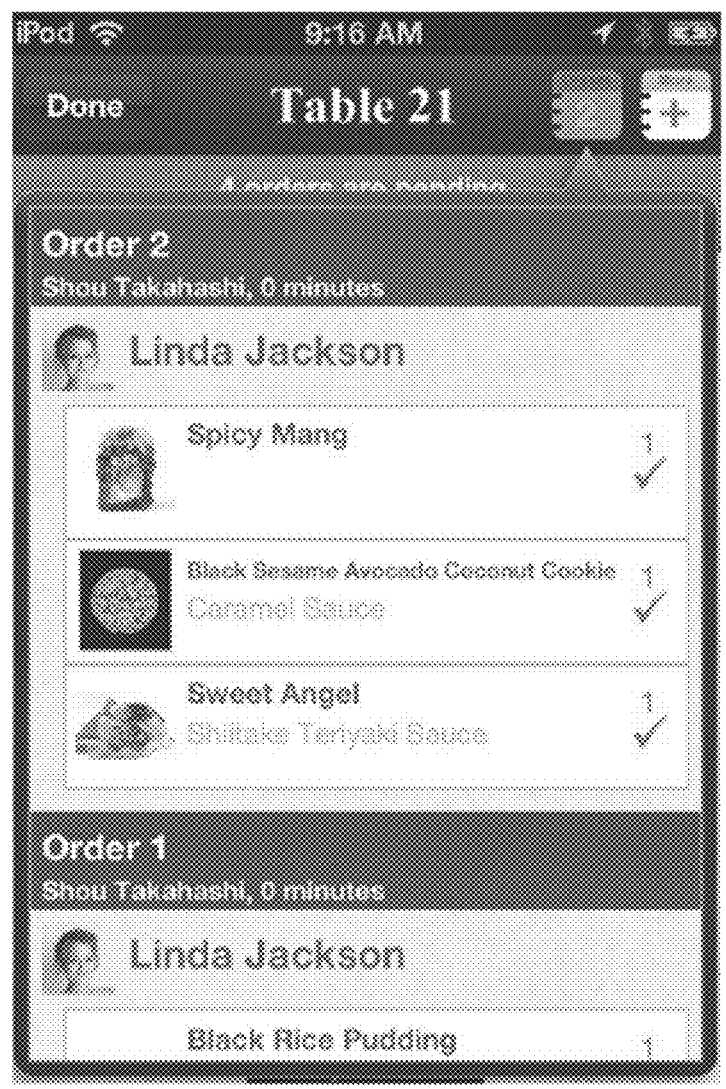
Figure 19:
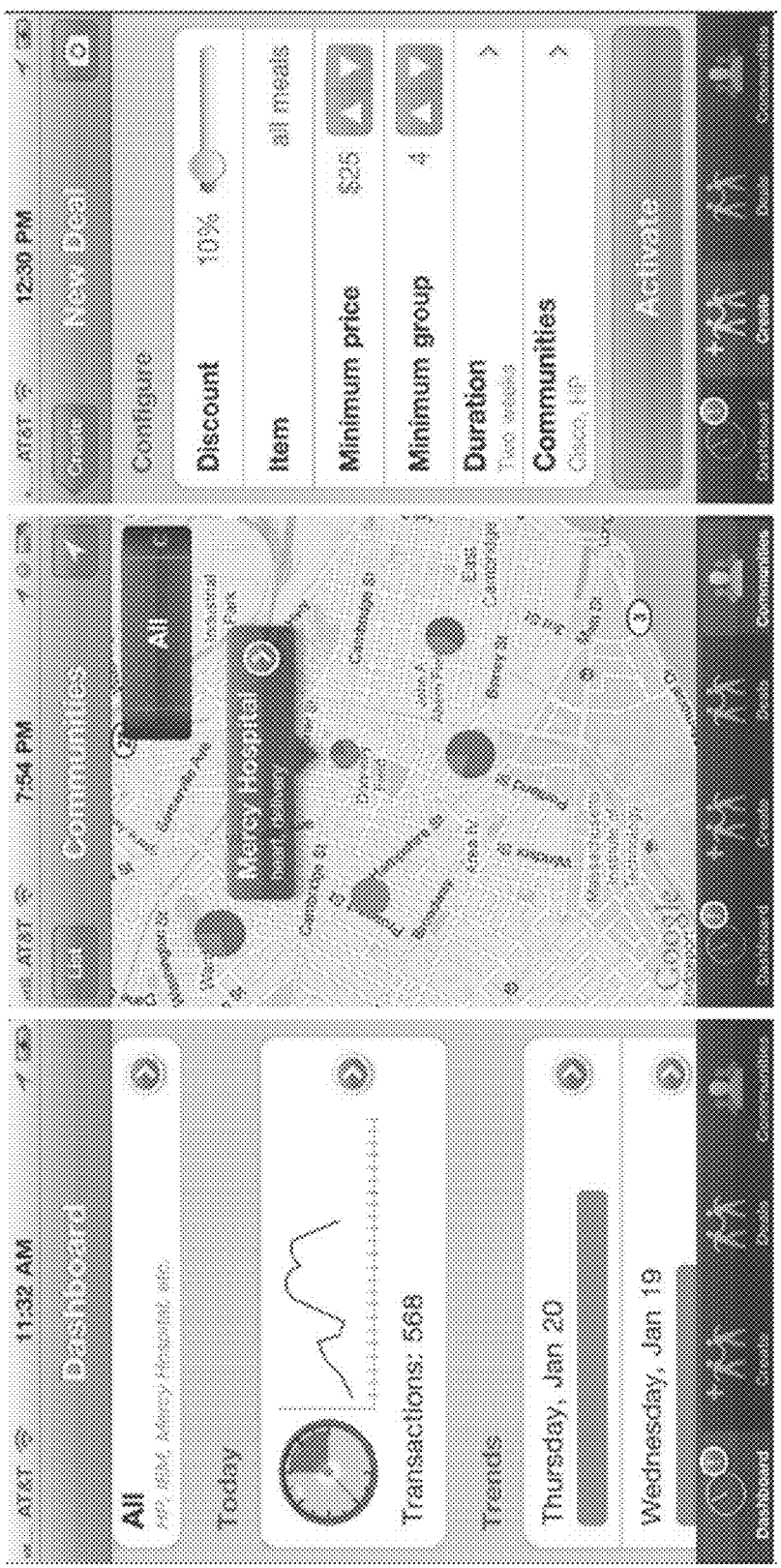
Figure 20:
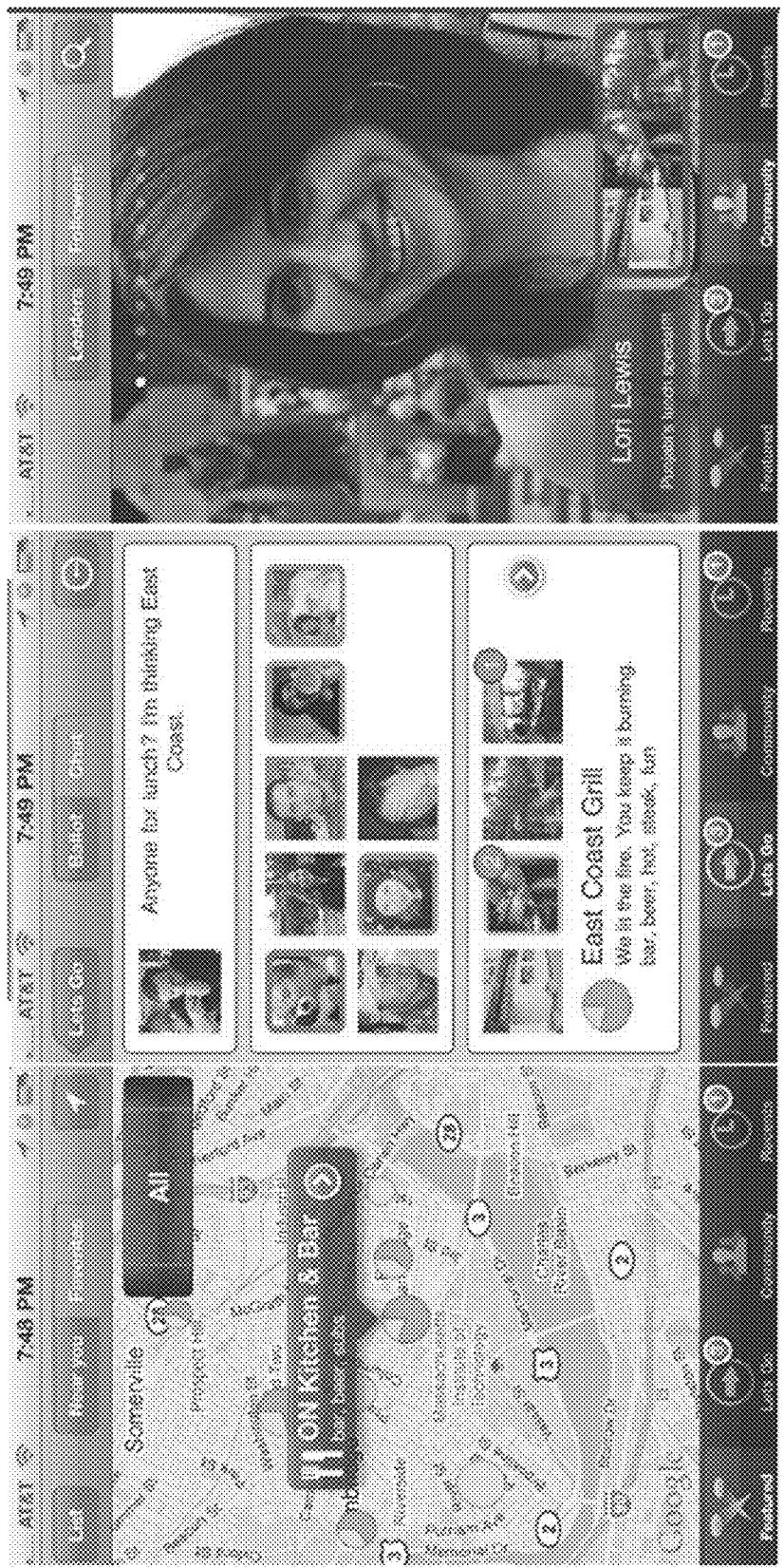

FIG. 10 illustrates a drill-down on an individual customer 14C where additional detail is presented such as the preferences, history, etc. and the employees 14E, managers 14M, etc. can make notations herein. FIG. 11 illustrates a drill-down on a table where additional detail is presented such as a special occasion being celebrated and an opportunity to make an offer based on the special occasion. FIG. 12 is a floor view providing overall current details on the site 12. FIG. 13 is an analytics view. FIGS. 14-18 are screen views for the employee 14E servicing the customers 14C. FIG. 19 is screen views of a vendor use case based on current transaction volume to attract target traffic. FIG. 20 is a screen view of a consumer use case—"I want to do something right now+around me or with my colleagues." Note, in addition, these user interfaces can also include live video from closed-circuit television cameras at the site 12.

Location Visualization in Real-Time

Figure 21:
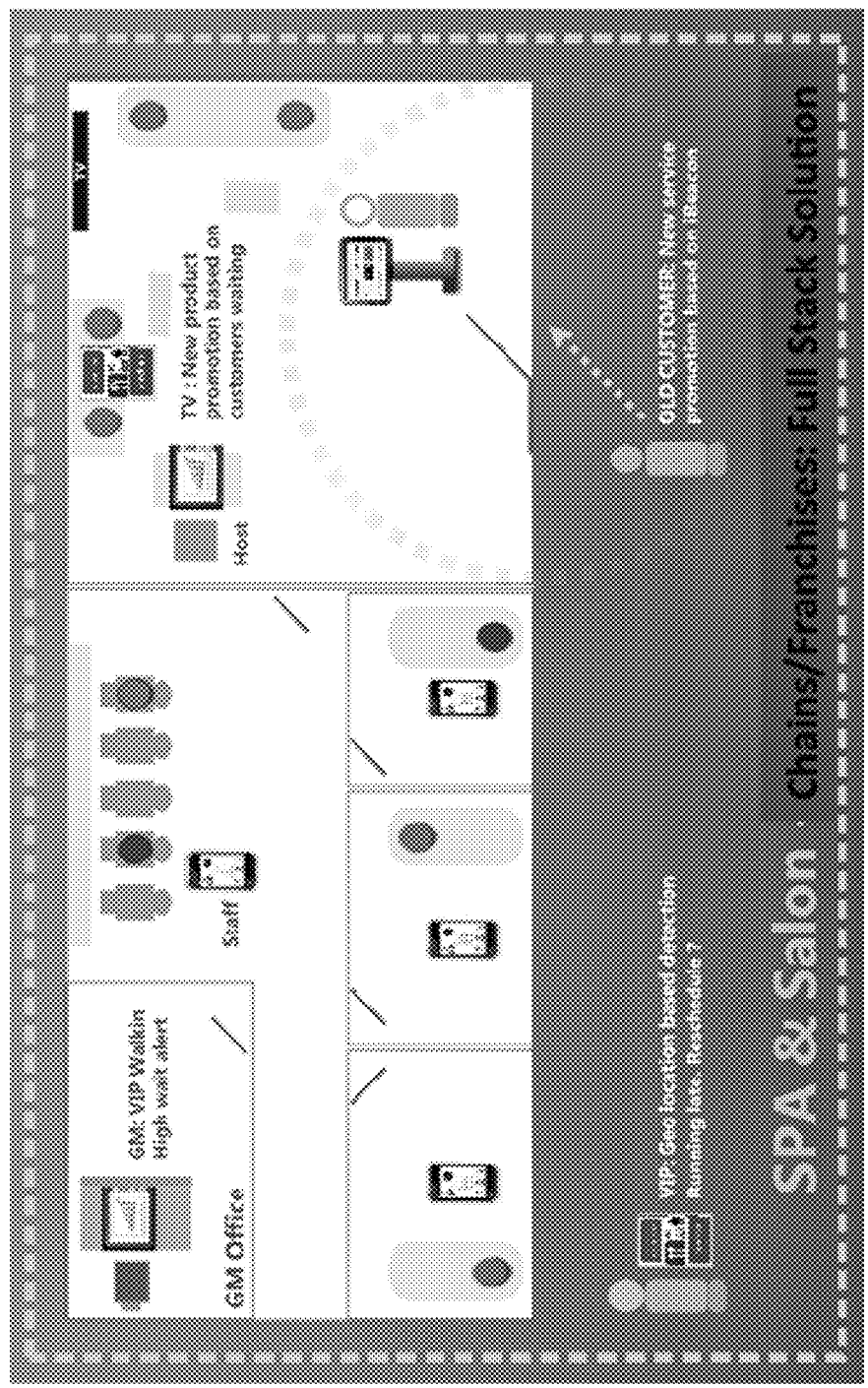
FIGS. 21-23 are floor plan diagrams illustrate a spa/salon (FIG. 21), a restaurant (FIG. 22), and a hospital/healthcare facility (FIG. 23) using the system of FIG. 1.
Figure 22:
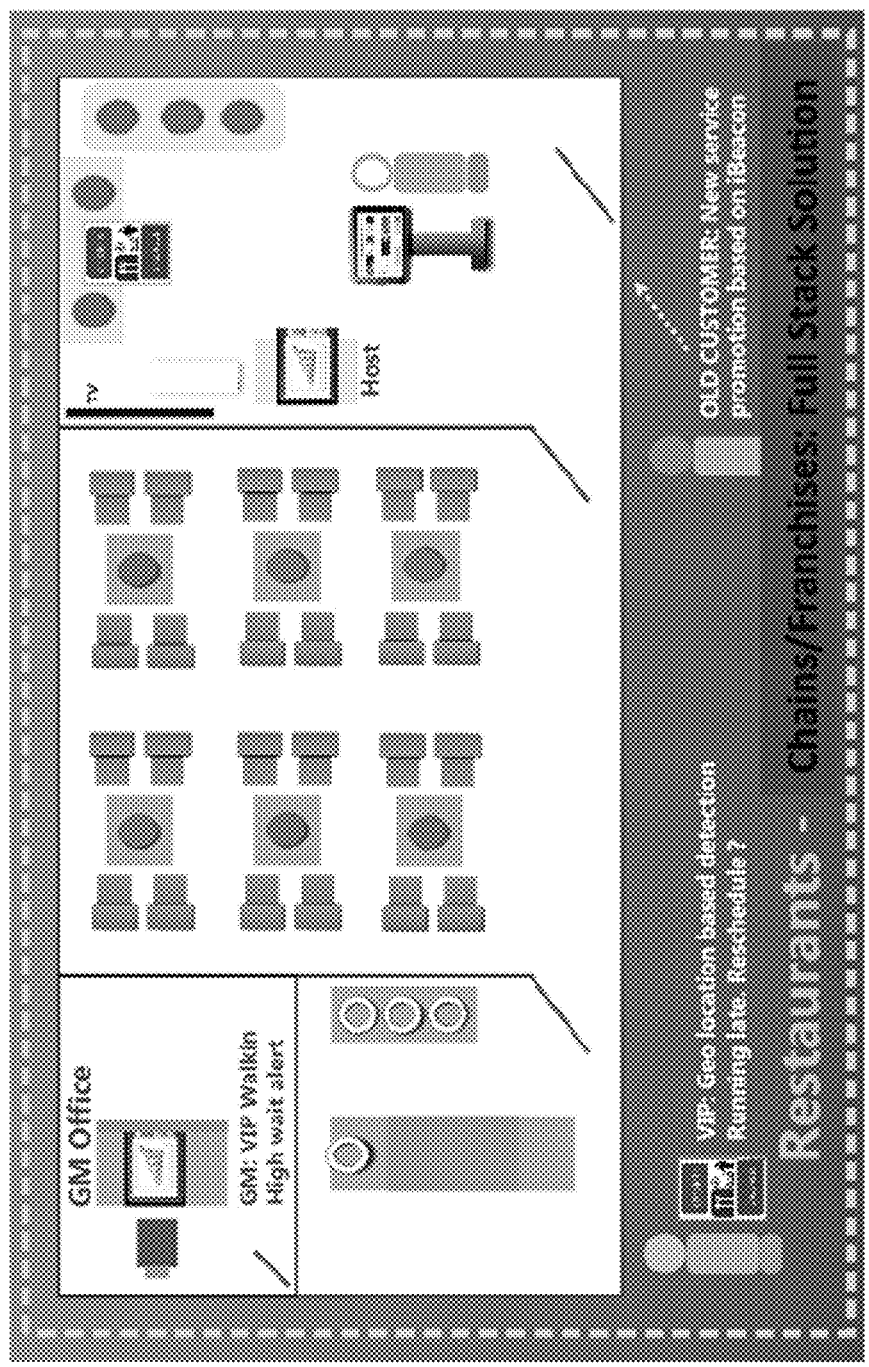
Figure 23:
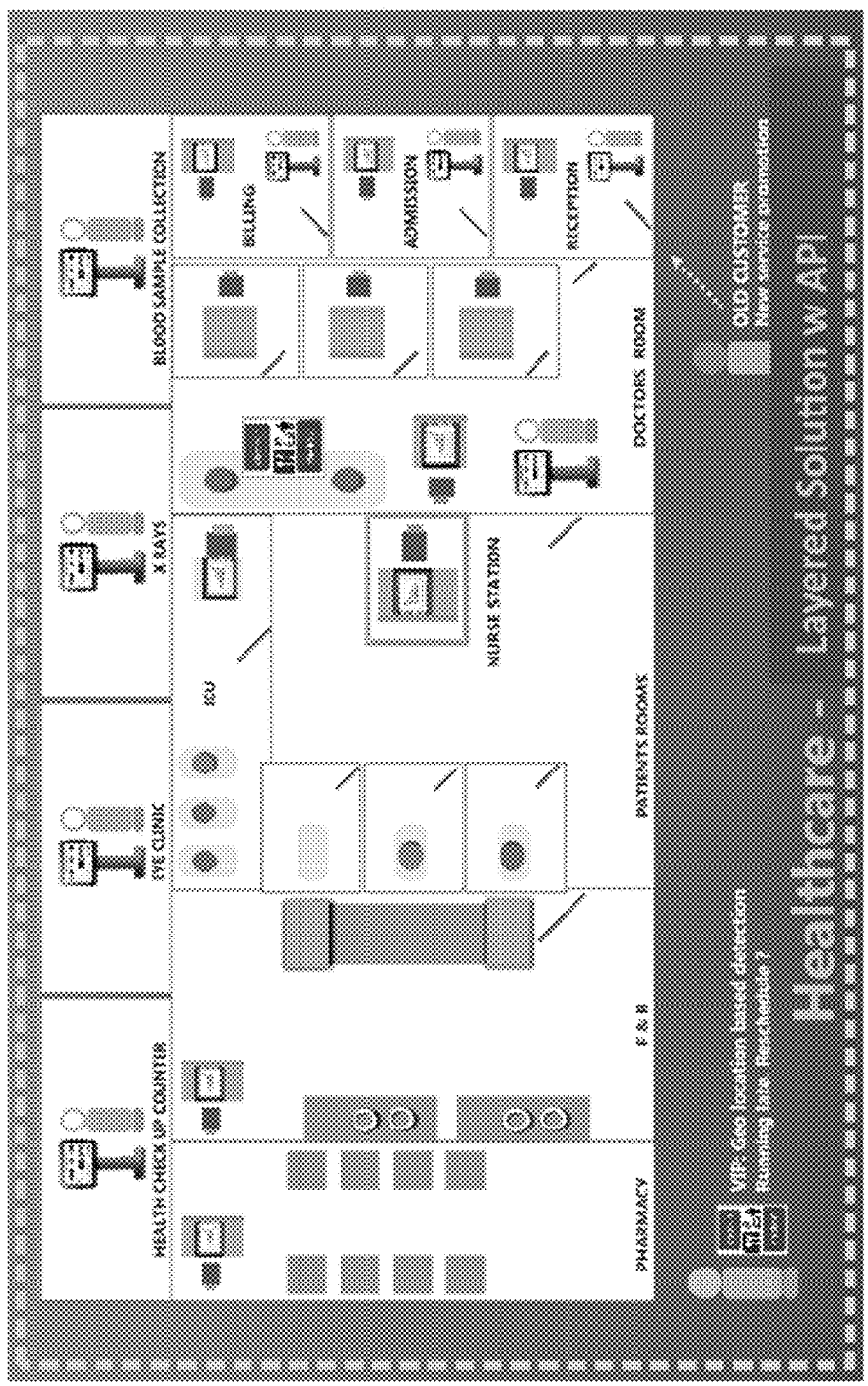

Referring to FIGS. 21-23, floor plan diagrams illustrate a spa/salon (FIG. 21), a restaurant (FIG. 22), and a hospital/healthcare facility (FIG. 23) using the system 10. The system 10 contemplates operation, in a customizable manner to a plurality of different sites offering any services, goods, etc. That is, any place where there is a customer experience, the system 10 can be customized to address. Also, the general system 10 described herein can operate in a unified fashion for different types of sites 12 with the customizations handled through metadata.

Data Usage

The system 10 can include the data—implicit and explicit. The system 10 provides Local Consumer Community Centric Data which is high quality—Group consumption behavior high due to circle of influence is strong and Demographics of similar communities are similar: Noise filtering—and relevant—Transactions capture repeatability within communities and Privacy of data enables higher participation in all categories.

| Implicit (Usage) | Explicit (Configuration and Feedback) |
| --- | --- |
| ✓ Products, Services and Deals created | ✓ Category Classification selected during account creation |
| ✓ User transactions | ✓ Community preferences |
| ✓ Transactions: Walk-in purchase, Online purchases, Group bookings, etc. | ✓ Selected community memberships |
| | ✓ Stated preferences: Favorite vendors, products and deals |
| ✓ Click Stream: Vendors and services viewed | ✓ Tags: Bookmarks and recommendations, e.g.: "try this" |
| | ✓ Sharing: Vendors, products and deals shared |
| ✓ Transactions by the community stakeholders for community events | ✓ Community Classification by community stakeholders like HR, Admin |
| | ✓ Community preferences for events |

Tagging and Collaboration

The system 10 can include the following aspects for tagging and collaboration. The local consumer and local community knows the best and everyday services are too random and dynamic hence let the users tell us whats good and is being used. Thus, the system 10 includes Tag based Collaboration—a Known and accepted model for creating user participation and Collaborative Filtering.

| Contextual Users | Contextual Items |
| --- | --- |
| ✓ Consumer | ✓ Products, Services, Deals |
| ✓ Local Consumer Community | ✓ Transaction ➔ Different types of transactions: |
| ✓ Vendors | |
| ✓ Brand Ambassadors | "walk-ins", "online purchase", |
| ✓ Community Ambassadors | "booking", "group booking" |
| ✓ Loyal consumers | |
| ✓ Community stakeholders ➔ People who make purchases for a local consumer community | |

| Vendor Classification | Community Classification | Usage Tags |
| --- | --- | --- |
| ✓ Category Tags ➔ Tags for categories and types of vendor and services, e.g.: "Thai", "ethiopian", "dimsum" | ✓ Community Profile Tags ➔ Tags for categorizing communities based on nature of business "Software/IT", "BPO", "Gov", "TechStartup" | ✓ Community Tags ➔ Tags for usage associated with community and community members, e.g.: "microsoft", "beacon apt", "apartment" |
| ✓ Ambience Tags ➔ Tags for qualifying ambience, e.g.: "Romantic", "bestforkids" | | |
| ✓ Access Tags ➔ Tags for qualifying access, e.g.: "parking", "closetotrainstop" | | ✓ Transaction Tags ➔ Tags for types of usage: "walk-ins", "online purchase", "booking", "group booking" |

Relevance Engine and Recommendation Engine

The system 10 can include a relevance engine and recommendation engine. The relevance engine can be used to find similar vendors, services, or users. This follows the N-square problem—exploitation (similar communities) and exploration (other communities). Similarity (i, j)=$\Sigma ueU(Ru, i-Ru)*(Ru, j-Ru)/\Sigma ueU(Ru, i-Ru)2*\Sigma ueU(Ru, j-Ru)2$ Where: a) Ru, j is the usage count (or tag count) by user u on item j b) Ru is the average usage count/tag count for user u. The recommendation engine can include, where V=vendor, C=community, and U=user:

| Recommendations Needed | Computations |
| --- | --- |
| ➢ Suggests alternative communities to target | Select target communities and their top n vendors being used in the neighborhood<br>➔ [C][V]<br>➔ Adjusted Cosine Similarity: $[C^{-1}C]$ |
| ➢ Suggest products and deals based on neighborhood usage | Select target communities and their top n products/deals being used in the neighborhood<br>➔ [P][C]<br>➔ Adjusted Cosine Similarity: $[P^{-1}P]$ |
| ➢ Suggests vendor products/deals based on taste relevance | Match products/deals to consumers using tags<br>➔ [P][T] & [U][T]<br>Adjusted Cosine Similarity: $[P^{-1}U]$ |
| ➢ Suggests alternatives to what has been used by consumer | Select products/deals used by others with in the community<br>➔ [P][U]<br>➔ Adjusted Cosine Similarity: $[P^{-1}P]$ |
| ➢ Suggest alternative vendors in the local neighborhood based on usage by other community: Used by Admin, HR and Team | Select communities(within a similar group) and their top n vendors<br>➔ [V][C]<br>➔ Adjusted Cosine Similarity: $[V^{-1}][V]$ |

| Recommendations Needed | Computations |
|---|---|
| leads for purchasing on behalf of the community | |

Example—Case of Local Search for Restaurant

A consumer search query on any one of the action items will result in a set of restaurants that match her preferences expressed in the query. 1) Action-item driven: Product Level Features—Gluten free food, Live Music, Accepts credit cards, Open 24 hours, Happy Hour Drinks, Outdoor seating, Discount with Reservations, Take Out, Tasting Menu, Bar Scene, Buffet, Celebrity Chef, Parking lot, Child Friendly, Business Dining, Certified Green. "Good for X" (where X can be Quick Bite, People Watching, Dining Alone, Wine list, Quiet conversation, Meeting for a Drink, Desserts, Teens, Romantic setting, Brunch); 2) Measures of social influence: Consumer Level Features—Location of the reviewer, Identity descriptive information of the reviewers (Real Name), Number of prior reviews posted, Proportion of reviews rated helpful by others, Reviewer rank, Membership duration, Age and Gender demographics, Favorite cuisine, Favorite dish, Favorite restaurant, Hobbies/Interests.; 3) Category level Features—Cuisine Type, Ambience, Customer Service, Value for Money, Food quality, Food variety.

Example—Case of Local Search for Restaurant

A consumer search query on any one of the action items will result in a set of restaurants that match her preferences expressed in the query. 1) Action-item driven: Product Level Features—Gluten free food, Live Music, Accepts credit cards, Open 24 hours, Happy Hour Drinks, Outdoor seating, Discount with Reservations, Take Out, Tasting Menu, Bar Scene, Buffet, Celebrity Chef, Parking lot, Child Friendly, Business Dining, Certified Green. "Good for X" (where X can be Quick Bite, People Watching, Dining Alone, Wine list, Quiet conversation, Meeting for a Drink, Desserts, Teens, Romantic setting, Brunch); 2) Measures of social influence: Consumer Level Features—Location of the reviewer, Identity descriptive information of the reviewers (Real Name), Number of prior reviews posted, Proportion of reviews rated helpful by others, Reviewer rank, Membership duration, Age and Gender demographics, Favorite cuisine, Favorite dish, Favorite restaurant, Hobbies/Interests.; 3) Category level Features—Cuisine Type, Ambience, Customer Service, Value for Money, Food quality, Food variety.

Example—Case of Local Search for Spas

A consumer search query on any one of the action items will result in a set of spas that match her preferences expressed in the query. 1) Action Item Driven: Product Level Features—Acupressure, Acupuncture, Bikini Wax, Body Detox, Cellulite Treatment, Day Spas, Deep Tissue Massages, Hair Removal, Health Spas, Herbal Medicine, Infrared Sauna, Keratin Treatments, Lymph Drainage Massage, Massage Therapists, Medical Spas, Nutritionists, Reflexology, Reiki, Tanning, Weight Loss, Electrolysis, Blowouts, Manicure, Pedicure, Facials. 2) Measures of social influence: Consumer Level Features—Location of the reviewer, Identity descriptive information of the reviewers (Real Name), Number of prior reviews posted, Proportion of reviews rated helpful by others, Reviewer rank, Membership duration, Age and Gender demographics, Favorite fitness activity, Hobbies/Interests. 3) Category level Features Spa Ambience, Service Quality, Service Variety, Value for Money, Fitness Facilities.

Algorithm for Natural Language Parsing

The system 10 can support speech input. Towards extracting such information, the system 10 can build on the work of Ghose et al. (2010), and use a POS (part-of-speech) tagger to identify frequently mentioned nouns and noun phrases. The system 10 can then cluster these phrases, using WordNet and then cluster further the identified nouns and noun phrases into clusters of similar nouns and noun phrases. The resulting set of clusters corresponds to the set of identified product features mentioned in the reviews. The system 10 can keep top-N most frequently mentioned features. To select the top-N features, the system 10 can first process all the reviews for each product, and extract text features (i.e., terms) that appeared frequently in the reviews for each product.

In the next step, the system 10 can extract all the evaluation phrases (adjectives and adverbs) that are being used to evaluate the individual service features. To measure the meaning of these evaluation phrases, the system 10 can use a crowd sourcing service like Amazon Mechanical Turk to exogenously assign explicit polarity semantics to each word. To compute the scores, the system 10 can use AMT to create our ontology, with the scores for each evaluation phrase. The system 10 can ask 'K' AMT workers to look at the pair of the evaluation phrase together with the product feature, and assign a grade from −5 (strongly negative) to +5 (strongly positive) to the evaluation. This will result in a set of K independently submitted evaluation scores. The system 10 can drop the highest and lowest evaluation score, and use the average of the remaining seven evaluations as the externally imposed score for the corresponding evaluation-product phrase pair. Generally, the scoring of the evaluation phrases is only necessary to be done once as the set of product features, and the corresponding semantic evaluation phrases are highly unlikely to change over time.

Local-to-Local

The system 10 is a platform for "local vendors" to service "local consumer communities." Examples of local consumer communities: Basic local consumer communities: Corporates, Residents; Functional consumer communities: Schools, Healthcare Clinics, Golf Clubs; Social consumer communities: Friends, Family; Dynamic consumer communities: Nearby (GPS based); Enable accessibility into local consumer communities; Differentiated services to capture the value of local consumer communities; Trust thru community ambassadors. The system 10 can be a match-maker for local business—"Taste Identity"—Matchmaking between local vendors and its consumer communities; Preference driven: Targeted communities, Intent driven, Personal favorites; Taste driven: Adaptive taste profile; Relevance thru capturing real transactions (Product Launch, Deals and Services); Ease to use and secure: Product Launch, Short term deals and Group deals; Quick and easy predefined targeted product launch with rich media; Product launch with time based deals and group deals—Its Tuesday lunch buffet with 75% empty tables. Send instant predefined deals with one step; Instant one-step services: Repeating favorite orders, Reservations.

Hospital/Healthcare

Figure 24:
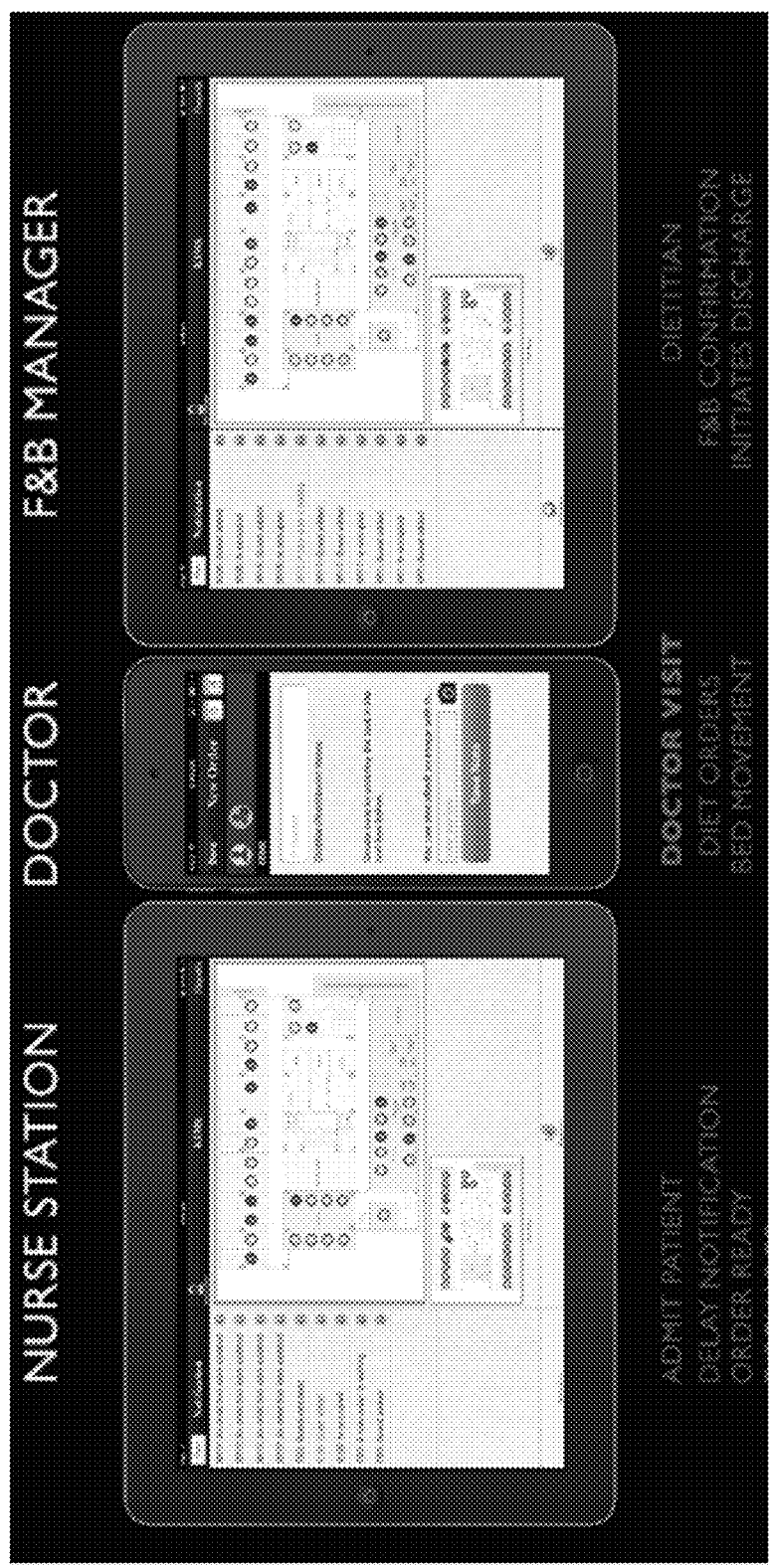
FIG. 24 is a diagram of various mobile devices for displaying information from the system of FIG. 1 in a healthcare example.
Figure 25:
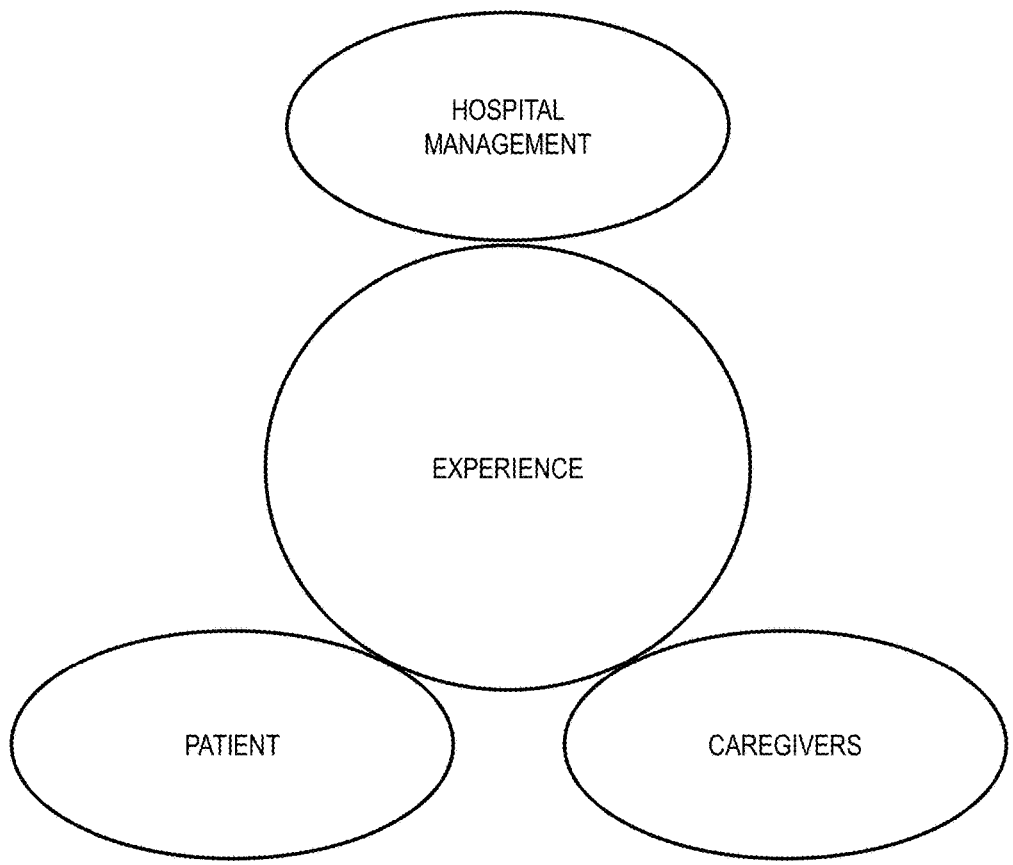
FIG. 25 is a diagram of players involved in the system of FIG. 1 in a healthcare example.
Figure 26:
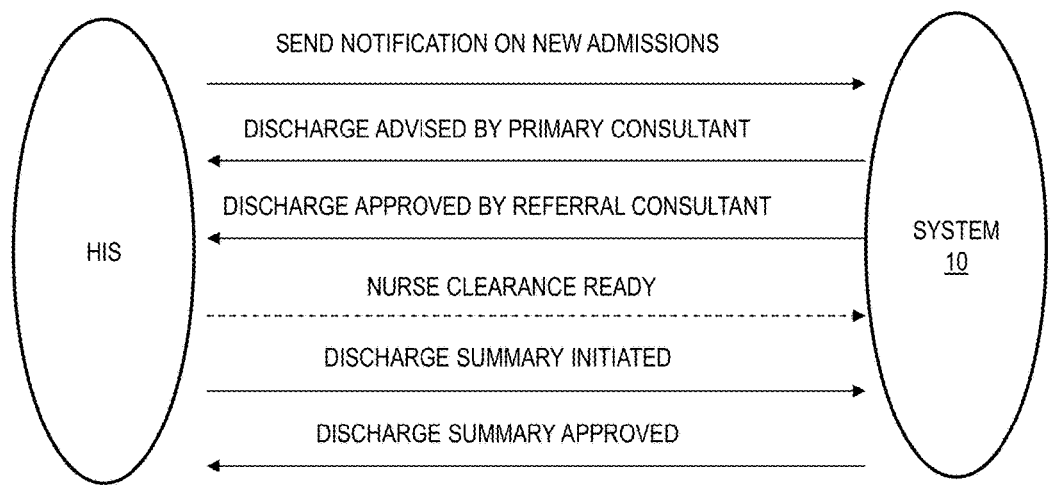
FIG. 26 is a flow diagram of the system of FIG. 1's interaction with a healthcare information system (HIS) and associated APIs.

Referring to FIG. 24, in an exemplary embodiment, a diagram illustrates various mobile devices for displaying information from the system 10 in a healthcare example. Referring to FIG. 25, in an exemplary embodiment, a diagram illustrates players involved in the system 10 in a healthcare example. Conventionally, most healthcare organizations focus experience optimization on the caregivers. However, the expectations are evolved to differentiated experiences all around. The system 10 allows defined experiences—types and associated workflow per customer type, e.g., inpatient experience for regulars, etc.; monitor and personalization of end-to-end workflows in real-time—predictive analytics and suggestion; and notification and control—automatic suggestion, customer choices, etc. The system 10 can be utilized in bed management in a hospital, food and beverage service in a hospital, nurse clearance bottlenecks, accelerating nurse clearance by facilitating doctor's approvals, discharge summary bottlenecks, accelerating discharge summary approvals, and the like. Referring to FIG. 26, in an exemplary embodiment, a flow diagram illustrates the system 10's interaction with a healthcare information system (HIS) and associated APIs.

User Experience Scenarios

The following scenarios describe the value the system 10 provides to customers and businesses in customer focused experiences.

Restaurant Casual Dining

For the purposes of illustration, restaurant use cases can be divided into casual dining, special occasion, and business meetings. Traditions guide the restaurant business. Fine restaurants have wait staff, floor managers, menus, etc. Though there are always exceptions, customers expect a certain flow to the process of a meal and this flow guides the customization of the system 10 for restaurants.

Customer Planning

Bob and Alice have gathered together with a few friends for a casual night out. Bob announces that he would like to share his favorite dinner spot with everyone. Since everyone seems amenable, Bob opens the mobile application 20 on his smartphone, finds GoodEats in his favorites list, and clicks the reservation button. The mobile application 20 invokes the OpenTable service with Bob's account information to check on table availability for a party of six in an hour. OpenTable responds with a successfully complete reservation. Bob's mobile application 20 receives a notification from GoodEats that he has a new reservation and asks if he would like his usual wine and special soufflé desert order for the table. Bob responds yes and GoodEats responds by reserving two bottles of the wine, a quantity suitable for six, and it notifies GoodEats' kitchen that Bob's special soufflé, which requires two hours of prep time, should be started.

Guido, GoodEats floor manager, receives a notice from the system 10 that Bob is arriving with a party of six in an hour, they are several miles away, and the system 10 notes for Bob indicate that he has asked GoodEats to arrange for limousine service in the past. Guido sees in the system 10 notes that Bob is a regular at GoodEats and his average receipt is quite large, so Guido calls Elegant Limousine to see if they have a car available in an hour at GoodEats discount rate. Luckily, Elegant does have a car available capable of holding six passengers, so Guido sends an offer to Bob via the system 10 application messaging on Bob's smartphone offering a complimentary limousine for six to the restaurant. Bob agrees to the offer and confirms the time and location for pickup.

1. By removing friction in the planning process, the system 10 helps informal groups of people make decisions and act in concert.
2. With a record of past behavior and preference items, the system 10 helps businesses distinguish high value customers and offer discrete, individualized services to strengthen relationships with those customers.
3. With situational awareness including location tracking and the cost and complexity of products and services, the system 10 is able to provide real-time decision support for businesses.
4. The system 10 integrates closely with external services to provide functionality outside the scope of the system 10's business focus and adapt to the current level of technology adoption in those businesses.

Customer Arrival

Bob, Alice, and their friends arrive at GoodEats, having been dropped off at the door by their limousine. Guido was notified by the system 10 when the limousine was a block away from the restaurant when Bob's smartphone passed through the geo-fence boundary, and the system 10 application sent a notification to the system 10 service. Guido has the waiter, Georgio, who will be attending the party of six, meet them at the door as they enter. Georgio introduces himself to the party and escorts the party to their table. The system 10 notices that Bob's smartphone has entered the restaurant, and that Georgio is close to the table associated with Bob's reservation. The yTrre application on Georgio's tablet receives a query from the system 10 service, "Has Bob's party been seated?"

Once everyone is seated, Georgio introduces the restaurant, announces the wine that will be served, and asks for before dinner drink orders. Georgio picks up the tablet that hangs on his apron, clicks the "yes" button to dismiss the seated query. Georgio's tablet responds with a diagram of the table and Georgio is able to quickly take drink orders for each seat at the table. Common variations on each item, such as onions or olives in a martini, are handled efficiently using a graphical presentation. For unusual requests, Georgio uses a stylus to describe the request in the short textual and symbolic notes commonly used by experienced wait staff.

Since the system 10 knows that Bob's party has been seated, the wireless signatures of each member in Bob's party are located in the vicinity of Bob's table. The system 10 is able to associate the drink orders with each guest and remember them for future use keyed by wireless signature. The system 10 recognizes Alice's wireless signature and notices that Bob and Alice have dined together at GoodEats previously on many occasions and are therefore members of a strongly bound community. Peter, one of Bob and Alice's guests, is recognized by the system 10 via his smartphone wireless signature even though this is his first visit to GoodEats. The other members of the party's wireless signatures are not recognized, so a tentative, weakly bound community is created containing all the members of the party.

1. The user experience benefits of a pen and paper are carried forward to electronic order entry by combining the benefits of a menu driven UI with electronic capture of written notes.
2. Situational awareness supports a level of service otherwise possible only with a very large number of staff.
3. The system 10 discovers social communities in an ad hoc manner to support community aware behavior analysis. Unlike social networking communities which are formed based on online behavior, the system 10 is able to discover communities based on behavior in the physical world and correlations discovered in both physical and online information.

4. The system 10 captures personalizations of common experiences, such as preferences for how coffee is prepared, and makes sharing these details with multiple businesses simple.

5. With the system 10, personalizations discovered in other contexts are shared within new contexts as appropriate. A consistent, customized experience follows a customer as they go about their daily lives providing them the feeling that each new place is comforting and a little bit familiar.

Order Processing

Since Bob and Alice are the hosts, Georgio asks for their drink orders last. Georgio asks Bob and Alice if they would like their usual drinks Bob nods, and Georgio is able to take the order with a single touch to his tablet even though Bob's order is a martini with unusual customizations, such as brands of Gin and Vermouth, and specific preparation instructions. Alice says she would like something a little different tonight. Alice remembers a drink that she had at Picardy, a restaurant across the city, but doesn't remember the name. So Alice queries the mobile application's personal history map on her smartphone for Picardy. Selecting Picardy, the system 10 shows Alice the items that she ordered. The aperitif was called a Negroni, and since the system 10 knows Alice is in Goodeats, Alice is able to click an "order" button beside the item. The system 10 service forwards the order to Georgio's tablet along with Picardy's recipe for a Negroni. Georgio is able to confirm that all of the ingredients are stocked at GoodEats and accepts the order with a single click.

GoodEats uses an RMS (Restaurant Management System) from Excelsior that includes POS (Point Of Sale), inventory, kitchen management, and other functions. The system 10 has a bidirectional integration with Excelsior's RMS. With the drink orders entered, Georgio is able to walk over to the RMS order entry terminal, create a new transaction for table 12 (Bob's party's table), and wirelessly forward the order into Excelsior. Since the integration isn't perfect, Georgio reviews the orders as they appear in Excelsior, adds a note that this order is for VIPs, and commits the orders to the RMS transaction. The RMS system forwards the drink orders to GoodEats' bartender. Once the drinks are complete, the bartender consults the system 10 to identify a server. The system 10 examines the current location of every server and whether they are currently known to be busy. The system 10 identifies three servers as available along with how long they have been idle and their level of expertise. Since the order indicates VIP treatment and only Dana is listed as expert, the bartender requests Dana. The system 10 sends an audio notification to Dana's earbud. The text-to-speech message indicates that the bartender has a drink tray for table 12. Dana picks up the tray at the bar and carries the tray over to Bob's table. The system 10 notices that Dana is in the vicinity of Bob's table. Since Bob's table has a drink order pending, the system 10 on Dana's tablet pops up a picture of Bob's table that indicates which order is associated with each seat at the table. Without interrupting the party's conversation and without having to consult directly with Georgio, Dana is able to discretely deliver the drinks.

The system 10 notes when the guests were seated, when the drink order was placed, when the drinks were delivered, and who performed each task. Since the timeliness of service and level of expertise required for a VIP party all fell within the policy guidelines established by GoodEats' owners, the status of table 12 on Guido's (the floor manager) dashboard and the owner's dashboard is drawn with the color green.

1. Tracking the strength of social relationships allows yTrre to suggest staff behavior suited to a social situation without awkward questions or expert knowledge of the social group.

2. Through the system 10, as a goodwill gesture, businesses are able to share information about their service to customers, such as their recipes for common items, while retaining as proprietary market differentiating information such as an entrée recipe.

3. The system 10 distinguishes between information rightfully owned by an individual from information private to a business to achieve a balance between improved service for customers and market differentiation for businesses.

Service Repair

Sometime later, table 12 on Guido's dashboard turns yellow. The system 10 includes a notification that it is time to take Bob's party's dinner order. The time for order decisions allowed in GoodEats' policy has not yet expired, but it is time to make sure someone attends to their needs. Guido's dashboard shows that Georgio is currently in the vicinity of table 3, also a VIP table, and has been there longer than normal. Since the number of VIP tables per waiter is kept small to enable timely service, something must be wrong. Guido heads over to table 3 to see what is going wrong. Georgio is chatting with one of the guests at the table, and Guido notices that other guests have fallen silent and are a looking a little bored. Though Guido knows that friendliness with customers is important, sometimes it can be hard to extract yourself from a conversation. As he approaches table 3, Guido glances at his tablet and the system 10 indicates that the party is waiting for their dessert course and three of the people at table 3 had the fish entrée. Interrupting the conversation, Guido introduces himself and asks whether they liked the fish. Georgio takes the hint and moves away from the table to attend to his other duties.

Since Georgio has fallen behind, the system 10 has multiple notifications on his tablet. The system 10 sorts notifications, not in arrival order or severity, but rather guided by business policy and in the order in which they should be addressed. In this case, Georgio's first notification is to take table 12's order. As Georgio is walking over to table 12, he hears a soft thud and notices a customer looking down at the floor at table 10. Georgio is not the server for table 10 and is already busy, so Georgio taps table 10 on his tablet and clicks the urgent attention button. The system 10 notices that Dana has just finished delivering drinks to table 8 and notifies Dana through her earbud that table 10 urgently needs attention for unknown reason. Dana heads over to table 10 and asks the customer looking at the floor if they need assistance. They dropped their knife, and Dana says she will get them another knife and asks whether there is anything else they desire. The customer at the head of table 10 requests another bottle of wine. Since she is next to table 10, Dana's tablet is showing a diagram of table 10 and what they have ordered. Since they would like another bottle of the same wine, she is able to see their previous order and with one click order another bottle. Since she is not table 10's waiter, the system 10 forwards the order for another bottle to the waiter who is able to forward the order into the RMS.

1. By evaluating situations against policy in real-time, the system 10 enables businesses to scale beyond the ability of a single individual to track things manually. With the system 10's proactive monitoring, Management is able to address problems before they cause unrecoverable customer experiences.

2. By scheduling service based on urgency, location, and availability, the system 10 achieves timely response to unforeseen situations while avoiding employees becoming interrupt driven.

3. This dynamic scheduling is only effective when each employee has the information they need to address each situation. The system 10's UI focuses on presenting the relevant information for each situation to improve response time.

Recommendations

Georgio arrives at Bob's table and asks if everyone is ready to order. Glancing at his tablet, Georgio sees a display of table 12 and a short list of appetizer and entrée recommendations. The fish special has received a few recommendations from customers who reviewed it using their smartphone app. The kitchen is still recommending the fish, but indicates that only two servings are left. Since Bob's party is a party of six and it is common for a recommendation to be ordered by multiple customers in a party, the special has moved down the list of recommendations. The pasta special has sold well today, but has received a few negative reviews on the system 10 so it is left off of the recommendation list. GoodEats has a somewhat unusual lasagna recipe, and it is an item on the standard menu. Since the system 10 has noticed that customers tend to order the lasagna again on return visits once they have tried it, the lasagna appears at the top of the entree recommendations. Georgio announces to the table that the lasagna is particularly good tonight and will go well with the dinner wine Bob arranged for earlier. Bob orders last and has really enjoyed the lasagna in the past, but it is being served with asparagus this evening. Since Bob is not fond of asparagus, he asks Georgio if GoodEats has any of the olives they had as a special appetizer the previous week. Though the olives are no longer on the menu, Georgio says that he will check with the Chef and uses his stylus to write a note to that effect on his tablet. Bob orders the lasagna with the olive appetizer as a side dish instead of the asparagus. Having taken all of the orders, Georgio returns to the RMS station and types a note to the kitchen asking about the olives. The Sous-Chef sees the message on the RMS system, looks up the recipe for the olive appetizer, and checks inventory for the ingredients. Luckily they are all in stock, so he sends a message to Georgio approving the order. Since everything is approved, Georgio forwards table 12's order information to their RMS transaction including typing a note about the olives into the RMS console. The RMS system then schedules the order production for the kitchen.

As Bob's party is finishing their appetizer course, Dana is notified to service the table 12. After she arrives at the table, she is able to discretely remove empty plates and serving dishes. She notices that the calamari appetizer is only half consumed and that there are uneaten pieces of calamari on several of the bread plates. Dana glances at the mobile application 20 on her tablet to find out that Bob is the lead customer for this table and where he is sitting. Dana walks over to Bob and quietly asks if she may clear the calamari from the table. Bob nods assent without disrupting the conversation. Dana clears the appetizer dishes and the bread plates containing uneaten calamari. She will replace those plates with clean ones as she is replacing dirty silverware. As she is finishing clearing the dishes, using the system 10 display of Bob's table on her tablet she taps the calamari item in their order and clicks on the problem button. On the cause submenu, she clicks uneaten1. In the kitchen, the chefs tablet beeps an audible notification. The notification message lets him know that something might be wrong with the calamari appetizer. Since GoodEats policy specifies that food quality is more important than timely service, the chef is notified with high priority to investigate the issue. The chef walks over to the line cook responsible for the deep fryer and asks for a sample of the calamari. Tasting the calamari, the chef discovers that it does have an odd, off flavor and in addition is way too salty. The line cook has been trying to cover over the flavor problem with salt. Since he doesn't have time to solve the training issue, the chef asks one of the experienced salad cooks to take over the fryer and asks the previous fryer cook to assist the dish washer. The chef then goes over to his RMS terminal, marks the calamari as out of stock, and notes that there are two calamari orders pending. He uses his application to signal both orders as needing to change, and this results in the assigned waiters being notified. Guido's tablet contains a notification that Bob's party did not like their calamari appetizer. Without making an issue of it, Guido is able to bring up Bob's order and mark the calamari as no-charge. Guido marks the item for his later attention so he can find out from the chef what happened and report to GoodEats owner why the satisfaction score for the restaurant fell. Though the owner's dashboard indicates a small degradation in status at GoodEats, the situation does not get worse and does not merit immediate action.

1. By focusing automation on tasks with high human cost, such as deciding what to recommend and feedback across the organization, the system 10 reduces the burden on management and staff. A higher quality of service is possible without the traditional cost in training or time in staff meetings.

2. By combining situational awareness with real-time customer feedback, problems such as a poor entree or lack of supply can be addressed right away thereby avoiding additional customer disappointment.

3. The system 10 provides fallback mechanisms, such as written notes, to address unusual requests not easily captured in an icon based GUI. 1 It is traditional for a chef to check the plates being bussed from tables to see what isn't being eaten, but that often falls by the wayside when the kitchen is particularly busy.

4. By analyzing behavior across small communities, the system 10 is able to draw stronger conclusions faster than is possible if analysis only examines statistical or correlated behavior across large communities.

Staff Motivation

After their guests have left, Bob and Alice are relaxing in their living room when their applications on their smartphones notify them. A personalized message has arrived for each of them from Guido, the floor manager at GoodEats. The message thanks them and asks if they would like to comment on how their evening went. The 3-way, SMS style interaction allows them to converse with Guido without feeling like they are filling out a survey. With the system history of their meal in front of him, Guido is able to ask for feedback directly about Georgio and the food and drinks that they ordered. With such a personal touch Bob and Alice are more willing to converse and the SMS exchange continues for several minutes. Guido enters the feedback into system 10 and moves on to getting comments from the next VIP party that occurred that evening. The system 10 examines the data gathered from GoodEats that evening to identify correlations between staff behavior, customer behavior, and customer satisfaction. The timeliness of service, what was ordered, the customization of orders, the personalization based on past behavior or preferences, the communities discovered across the entire data set, and many other aspects of the restaurant experience are included. Applying the policy GoodEats owners have established, scores for each employee, each department, and each restaurant are calculated. These scores are published to the staff and owners as appropriate.

1. Unlike traditional POS systems that may at most track the timing of data entry transactions, the system 10 is an interactive system able to track much of the behavior of staff as they perform their jobs. Staff can be rewarded based on their attentiveness in using the system combined with what they achieve in terms of customer satisfaction.

2. Not just a reporting tool for management, the scores of each staff member are a daily reminder that the quality of their work matters. In some enterprises, it might make sense for these scores to be published daily among the staff to use competition as a motivator for improvement.

3. Having objective measures of performance removes the ambiguity in measuring expertise. By establishing levels of expertise as a distinguishing factor in pay scales and reducing the importance of seniority or a manager's subjective judgment, the system 10 improves staff perception of the fairness in the workplace and sets achievable goal posts for improvement.

Community Data Mining

Pete, one of Bob and Alice's guests, has not been using the system 10 for very long. When Bob and Alice go out to eat together or in larger groups, they usually end up at one of several southern European restaurants in the area—Greek, Italian, French, or Spanish cuisine. Pete lives in the same neighborhood as Bob and Alice. Pete usually has steak at the corner grill when he dines out alone. Pete is planning his week and consults the mobile application 20 on his tablet to see if it has any interesting suggestions. The system 10 has a list of offers, including Thursday evening specials from several steak restaurants in the area. Those look interesting, but Pete really wants to plan something for Friday, and he wants something interesting for a date. Since the system 10 has recognized Pete as a member of a community to which Bob and Alice belong, among the advertisements is an offer from a new restaurant a little outside of his usual area. The Catalan restaurant is offering a five course, prix fixe menu for four. Though Pete frequents a steak restaurant, his association with Bob and Alice leads the system 10 to include restaurants that Bob and Alice might like. Pete has never tried Catalan, but he sees that the reviews from the restaurant's grand opening are effusive. Since it is for four, Pete decides to include Bob and Alice since they have a lot in common with his date. Pete clicks on the prix fixe ad and answers a few questions, a time for the reservation and how many would be attending. After getting confirmation that a table is available, Pete invites his date and uses the system 10 to ask Bob and Alice if they would like to come.

1. Online, virtual social networks use correlation analysis of similar likes across large populations to predict individual preferences. The system 10 is different. With communities derived from real life social occasions, the system 10 is able to make inferences suited to the actual participants in real life events.

2. The system 10 is able to build recommendations and target advertisements based both on behavior of the individual and behavior of communities to which the individual belongs.

3. The system 10 identifies community characteristics that a business might use to craft promotional deals directly suited to an event's participants.

Restaurant Special Occasions
Guided Planning

Bob and Alice's 10 year wedding anniversary is on Thursday, and Bob would like to surprise Alice with something special. Selecting the event planning section of the application 20 on his tablet, Bob is asked a few questions about the event. The first question asks for the type of event from a long list including holidays (Thanksgiving, Xmas), Valentine's Day, anniversary, birthday, children's birthday, etc. He selects anniversary, enters Thursday evening as the desired time, selects two people attending, himself and Alice, and clicks explore possibilities. The system 10 presents advertisements from several restaurants that specialize in anniversaries, some of them romantic, others focus on family, and one even has a dinner theater. Bob and Alice really like the theater, but coordinating a meal, theater tickets, and transportation is really complicated, so Bob selects an advertisement for an event planning service, LoveAlive.

LoveAlive is a registered system 10 vendor supporting full integration with the system 10's planning facilities. When Bob selects LoveAlive, a notification containing Bob's event criteria is issued to LoveAlive's system scheduler. LoveAlive's business policy is to schedule the first planner available in round robin fashion. Jody receives Bob's notice on her terminal and clicks on the chat button to find out directly from Bob if he would like something special. Bob receives the chat invitation from LoveAlive and accepts. Once Bob accepts the chat, the system 10 shares public preferences for both Bob and Alice with Jody. They both like dramatic theater, so the system 10 includes a list of plays with Thursday evening shows.

As they chat, Bob says that he would like something special, perhaps dinner at a new restaurant and a play. Jody has the system 10's list of restaurants that specialize in anniversaries, so Jody describes a couple possibilities and suggests a play that has been receiving great reviews. Since they all sound good, Bob asks Jody to make the final arrangements. Jody explains LoveAlive's fees and promises to have an itinerary ready for final approval in an hour. LoveAlive has special arrangements with the theaters and restaurants to keep a few great seats available for LoveAlive's use until two days prior to each event. LoveAlive pays a regular fee for the service. Judy puts together an itinerary for dinner, the theater, a nightcap at a romantic bar with a view, and limousine transportation for the evening. Judy sends the itinerary to Bob via system notification. Bob clicks approved and each step in the itinerary is added to Bob's smartphone calendar including references to the theater eTickets. After receiving the itinerary's approval through the system 10, Judy confirms all of the tickets and reservations.

1. By tracking correlations in the system 10's ad hoc communities, such as choices in entertainment and likes or dislikes in reviews, the system 10 is able to personalize recommendations resulting in simpler planning and improved customer experiences.

2. Including curated advertisements for external services combined with the system 10's customer reviews of those services helps people explore new experiences while decreasing the risk of disappointment.

3. These external services include event planning businesses that offer customization of experiences when the event becomes complex or something unique is desired.

4. The system 10 provides a platform upon which businesses may innovate. Similar to how home insurance companies provide a platform for a wide range of construction trade businesses specializing in repair work, the system 10 brings consumers and suppliers together.

For suppliers, the system 10 brings the customers, communication system, and scheduling system. For customers, the system 10 provides service quality monitoring, ease of use, and a personalized experience.

Sharing the Experience

As Alice is having lunch with a friend the day after her anniversary celebration, Alice is describing the wonderful evening and her friend, Sandra, who is also a system 10 user, asks for a copy of the event. Alice selects the event from her system 10 calendar and emails a reference to Sandra. Later, when Sandra is reading through her email, she is able to click on the URL link reference and open a copy of the event proposal in her app as a template. The template asks when she would like the event and how many will be in the party and displays LoveAlive as the event planner. Clicking send request, Sandra begins the process of having LoveAlive plan a similar evening.

1. The system 10 enables customers to share experiences they have liked, and enables service providers to capitalize on repeat business by offering a successful experience to multiple customers.

2. Using external references in the form of URLs, the system 10 supports sharing using a wide variety of social and print media.

Restaurant Business Meetings

Business meetings are often conducted during a meal. To keep the focus on business and avoid disappointing business associates, consistency and a professional experience are of primary importance for restaurants specializing in this market.

Template Planning

Alice is in Boston for a business meeting. Though she lives in and her office is in San Francisco, she is presenting to a prospective client firm in Boston. Since Alice does not have a Boston office, while she is planning her trip she uses the system 10 to make arrangements for the meeting. Opening the system 10 application on her tablet, Alice selects the event planning section. She selects her personalized business meeting event template and enters the number of participants, twelve, the date and time desired, selects the address of her client's office in Boston as the planning locus, and selects that locus for community food preferences. Alice's meeting template includes her preference for a private meeting room with a buffet style lunch and a large video monitor for her multimedia presentation. After Alice clicks recommend on the completed template, the system 10 responds with a list of restaurants near her client's office specializing in business meetings with facilities matching her specification. Alice selects the top three items in the list and forwards her template to all three attaching a note requesting a bid and a photo of the meeting room. Half an hour later, all three have responded. The first is the highest bid. The picture of the room shows a view of the harbor and the buffet includes a grill with cook to order fish, a truly Boston cuisine. The second has a pretty typical meeting room with no windows and offers a buffet with a salad bar, Boston baked beans, and a chicken breast entrée. The third declines to bid with the explanation that they are fully booked on that day. Though the first is far more expensive, Alice decides to choose it since the meeting is with C-suite executives and she needs to express the importance of this deal to her firm. Alice clicks decline on the second bid and approve on the first bid. As she clicks approve, the reservation information is entered into her smartphone calendar.

1. The system 10 simplifies the planning process for business meetings by providing standard and personalized templates for common types of events. The standard templates developed by yTrre provide a guide to service providers for the services they should target and to consumers for the types of services that are readily available.

2. With an ad hoc notion of community based on geography or social group, the system 10 is able to customize requests to the audience without the requestor having foreknowledge of those preferences.

3. By starting with deeper knowledge of a customer's and a community's desires, the system 10 is able to offer service providers a targeted audience. In addition, by gathering statistics across the aggregate of events in a locale and within discovered communities, the system 10 is able to provide advice to businesses on the market value of different services and specializations.

Hospital Situational Awareness

Over the years, Hospitals have evolved processes to drive down business costs while maintaining a high standard of care. The system 10 technology continues this evolution by exposing the business value offered by sensors and situational awareness in the hospital environment and in provider, patient relations.

Wellness Support

Jane is a young urban professional, and her employer offers a premium health insurance plan as a perk to attract and retain highly skilled workers. Jane has been leading a health conscious, healthy lifestyle for years. As pedometers have evolved into physical activity, diet, and sleep monitors, Jane is an early adopter. The FeelGood wellness monitor consists of a wrist band containing sensors and a sensor monitoring system, a smartphone application that tracks the sensor readings and provides a UI to the health monitor service, and FeelGood's cloud based health monitor service. FeelGood and the system 10 are solution partners with the system 10 supporting the use of FeelGood monitoring data in health care. Jane's premium plan HMO, Sensorem, has a preventative care program using the system 10 life monitor, and her dental insurer, Dentim, supports use of the system 10 life monitor to encourage good dental care habits.

1. Electronic medical records are gaining adoption in market verticals. By providing a patient focused user experience, the system 10 will enable those verticals to coordinate information and offer a premium quality of service to the patient.

2. By encouraging measurement of daily activity through improvements in a patient's health care experience, the system 10 will increase the effectiveness of wellness care and thereby improve health care providers' bottom line.

3. Personal sensors and monitoring systems provide an objective view of a patient's habits. By facilitating the sharing of this objective data with health care providers, the system 10 improves the ability of providers to personalize their wellness care recommendations for each patient.

Appointment Planning

Jane's dentist, Dr. Detwiler, has a Dental Practice Management System (DPMS) to maintain the office appointment calendar. The system 10 receives notifications from the DPMS when patients using the system 10 are due for a checkup. Since it has been almost six months since her last teeth cleaning, Jane receives a notice from her app asking her to schedule a dentist appointment. When she receives the request from her app, Jane clicks on the schedule button. Several time slots are displayed on a calendar, and slots that do not overlap with any of the scheduled items on Jane's smartphone calendar are highlighted. Jane clicks on a time slot for the next afternoon and clicks the request appointment button. Since Jane has a premium insurance plan with Dentim, she gets scheduling priority for routine appointments. Without this priority, she would have to schedule appointments at least a month in advance and often longer. For standard insurance, dental practices typically schedule routine appointments six months in advance to minimize the number of staff required for low margin care, such as teeth cleaning. For premium insurance plans, Dentim compensates dentists per patient under care in addition to the standard per procedure charges. This shift in business model enables dentists to increase staff to compensate for the lack of schedule predictability and to offer additional services such as wellness care monitoring.

1. By removing friction in the appointment planning process, the system 10 eases a patient's difficulty fitting health care into a busy lifestyle.

2. In addition, the system 10's service scheduling facility helps a health provider adapt to a patient's lifestyle. With the system 10, payments to the provider increase for the premium level of service to cover the higher costs.

3. By providing situational awareness, the system 10 enables a provider to customize the social aspects of care for each patient. A premium patient experience will be seen as essential for urban professionals and will be one of the perks offered by employers. Note, these differentiated services are improvements to the human experience and not changes to the effectiveness of care provided.

Office Visit

Arriving at her dentist, Dr. Detwiler, the system 10 notices that Jane's smartphone has crossed the geo-fence surrounding the dentist's office. The system 10 notifies the receptionist that Jane is about to arrive, and the receptionist welcomes Jane by name as she steps in the door. Jane's smartphone wireless signature is forwarded by the office identify system to the system 10, and when she is near the reception desk Jane's entry appears on the receptionist's terminal. The system 10 notifies the receptionist that the phone has been verified as one authentication factor, and the receptionist compares Jane to the photo she has on file in the dentist office records as a second factor. The receptionist asks if she may update Jane's medical history in her file and Jane says, "Sure." The receptionist clicks the medical history update button, and the system 10 sends Jane's smartphone a notification asking for permission to transfer dentist relevant medical information to Dr. Detwiler's office. Jane hears her smartphone beep and sees the system 10 notification. She opens the system 10 application and clicks the permission granted button on the query. Since Jane has been using yTrre with both Sensorem and FeelGood, The system 10 builds secure authorization records for Sensorem and FeelGood giving each of them permission to transfer the dentist relevant information from their records directly to Dr. Detwiler's system. The system 10 sends the receptionist a notification of the record's arrival, and the receptionist thanks Jane.

With premium appointments, Dr. Detwiler's office policy ensures no patient waiting by reserving the exam room and dental hygienist ten minutes early. When Jane arrived, the system 10 notified the hygienist who now steps out into the reception area, greets Jane, and escorts her to the exam room.

1. The system 10 maintains patient confidentiality by supporting direct, 3rd party transfers of medical information between health care providers. The system 10 is not a repository or conduit for this sensitive information and thereby avoids many of the trust issues inherent in electronic medical records.

2. By streamlining medical office processes, the system 10 avoids time consuming tedium for patients, such as filling out health status forms and waiting for an appointment.

Personalized Recommendations

As Jane settles down in the dental exam chair, the hygienist's terminal display's Jane's system activity record. The hygienist notes that Jane has been brushing twice a day but has flossed only a few times in the last month. While cleaning Jane's teeth, the hygienist notes a few tender spots and tells Jane that she will setup a reminder schedule to help Jane manage her dental care. The hygienist clicks on the reminder schedule button on Jane's page in the system 10. Since the few times that Jane did floss occurred in the evening, the hygienist clicks on the evening preference for flossing with a frequency of three times a week and clicks to remove the tooth brushing reminders. Three times a week is minimal, but Jane does not like flossing and it is unlikely that Jane would tolerate anything more.

1. The additional information made available to health care providers via the system 10 avoids awkward questions and simplifies customization of recommendations for each patient.

2. Through its role in a patient's daily life, the system 10 is able to encourage good behavior as well as provide a monitor of compliance.

Office Operations

As the hygienist is finishing the cleaning, Dr. Detwiler is notified by the system 10 that Jane will be ready for her exam in a few minutes. Dr. Detwiler is in the middle of an emergency repair of a cracked tooth and will not be available for at least fifteen minutes, so he says "system unavailable" and the application 20 on his smartphone converts speech to text. The keyword "unavailable" tells the system 10 to that schedule changes are required. The system 10 notifies Dr. Detwiler's office manager, Stephanie that a scheduling change is needed and Jane's status page is display on Stephanie's the system 10 terminal. Alongside the status page, available staff and their qualifications are listed. Since the request is for a dentist, only dentists are listed and Dr. Petersen is currently in the break room so his name is at the top of the list. Stephanie selects Dr. Petersen's entry and clicks assign.

Dr. Petersen's smartphone beeps and when she glances down she sees Jane's record along with a notification that Dr. Detwiler is unavailable. The system 10 is requesting that Dr. Petersen perform the exam. Dr. Petersen clicks approved, looks through Jane's records including the newly created flossing reminder, and walks toward Jane's exam room at the appointed time. Jane's hygienist receives a notification that Dr. Petersen will be handling the exam, and is able to tell Jane that Dr. Detwiler is unavailable due to an emergency and that Dr. Petersen will be performing her exam. She reassures Jane that Dr. Petersen is very good and puts Jane at ease by telling her that Dr. Petersen likes to crack jokes. Dr. Petersen arrives just as Jane finishes rinsing and settles back into the exam chair. Dr. Petersen introduces herself, apologizes for Dr. Detwiler, and puts Jane at ease by chatting for a couple minutes. Beginning the exam, Dr. Petersen says, "I see that we are going to be reminding you to floss a bit more. Flossing will help with those tender spots and prevent problems with your gums in the future."

1. The system 10's situational awareness and staff scheduling helps medical offices adapt to unforeseen circumstances and helps maintain the timeliness of services.

2. Armed with the appropriate information for each situation, medical staff are able to personalize their interaction with the patient even if they have not treated that patient previously. Though it fills a similar need to a medical chart, the information presented by the system 10 is current up to the minute and contains details about current services that make it onto the medical chart much later, if ever.

Care Coordination

As Dr. Petersen is performing an oral cancer screening exam she notices an unusual thickening in Jane's cheek. "Jane, I'm performing a cancer screening, and I'm feeling something in your cheek that I think we need to check out. It is most likely just some bruised tissue, but I would like to refer you to an oncologist to be certain . . . . Yes, they should look at this today if possible." When a patient first hears about the possibility of cancer, they often experience an emotional shock so it is office policy to help the patient arrange referral appointments. Dr. Petersen informs Stephanie that Jane needs an appointment with an oncologist. Looking at Jane's system 10 record, she sees that Jane uses the Sensorem HMO and that the system 10 is able to coordinate appointments for Sensorem. So Stephanie sends a request for an oncologist referral appointment to Sensorem referencing Jane's cancer screening results in the DPMS.

One of Sensorem's scheduling admins receives the system 10 oncologist referral and queries for availability of time this afternoon for the nearest oncologist to Dr. Detwiler's office. Luckily, Dr. Carthage, one of Sensorem's premium qualified providers, is available in an hour. With premium health plans, Sensorem arranges transport for patients via Elegant Limousine. Sensorem's admin calls Elegant Limousine and they have a car able to make the trip from Dr. Detwiler's office to Dr. Carthage's office. The admin enters the limousine reservation info into the system 10. Jane's smartphone beeps, and the application 20 displays a notification containing the appointment and limousine reservation. Jane clicks the approve button and the application 20 asks Jane if she would like to notify anyone of her schedule change. She selects work and the system 10 issues an email to Jane's administrative assistant at work to clear Jane's calendar for the afternoon.

1. The system 10 applies business policy to each situation thereby enforcing enterprise standards across organizational boundaries.
2. Through integration with appointment calendars, the system 10 provides real-time coordination of resources across organizations.
3. With customizable workflows, businesses are able to choose an appropriate balance between automation and staff expertise.

Hospital Operations

When Jane arrives at Dr. Carthage's office, the limousine drops her off at the premium plan entrance. As she walks up to the reception counter, the receptionist greets Jane by name, checks her picture in her Sensorem medical records, and hands Jane a personalized id band to clip around her wrist. Jane looks at the band and sees her name on the display. Alerted by the system 10 when Jane's smartphone crossed the geo-fence around the office, one of Dr. Carthage's med techs is waiting to escort Jane to the exam room and take her blood pressure, heart rate, temperature, and so on. When Jane's id band is detected in the exam room, Dr. Carthage's application 20 on his smartphone receives a notification that Jane has arrived. She is twenty minutes early. Working through the system 10 schedule notifications in the order presented, Dr. Carthage eventually makes it in to see Jane ten minutes before her scheduled appointment.

1. In difficult environments, such as hospitals or resort swimming pools, where temporary issue special sensors or electronic keys are needed, the system 10's sensor based situational awareness can be adapted to operate suitably.
2. The system 10's resource scheduling adapts to specialized constraints such as a doctor for whom there is no substitute.

Hospital Supervision

Hospitals operate under a conundrum. They are cost sensitive, particularly non-profits, and yet the services they offer are lives at risk, mission critical. To be successful a hospital must operate efficiently while maintaining high standards of quality. Dr. Carthage's office is in the private practice wing of Bene Vivant Medical, a full service hospital. Bene Vivant has floor managers operating as independent operations specialists monitoring quality and efficiency in real-time. The system 10 provides the situational awareness the floor managers use to assist in scheduling and solve problems. Given the sensitive electronic equipment in a hospital and other reasons, smartphone signatures are not suitable for location tracking Bene Vivant has a sensor system that generates events when id bracelets or equipment inventory tags are nearby. The system 10 uses these events to track when patients receive attention, from whom, and the availability of staff by proximity, role, and capability.

When Jane enters the exam room the event generated produces both the notification to Dr. Carthage as described earlier and the beginning of a time measurement by the system 10. Bene Vivant's service policy has the system 10 monitor Jane's wait time in an exam room. When Jane has been waiting alone for 5 minutes, the floor manager sees a yellow color on Dr. Carthage's office along with a notification that Jane, a premium patient, needs to be updated on her schedule status. Bene Vivant's policy requires that a premium patient be updated on scheduling timeline within the first 5 minutes of waiting and every 20 minutes thereafter. The floor manager selects the notification and clicks on assign patient comms. The system 10 presents a list of staff available and able to communicate directly with patients. The floor manager chooses the first item and forwards the notification to update Jane on Dr. Carthage's estimated time of arrival.

Since Dr. Carthage has office hours this afternoon, he is not on-call but he is listed as backup oncologist by Bene Vivant for emergencies. While Dr. Carthage is examining Jane, a surgeon discovers what looks like cancer in a patient undergoing a routine cyst removal and an assistant notifies the floor manager of an urgent need for a oncologist consult in surgery. Bene Vivant's on duty oncologist is already deeply involved in a radiation treatment and not immediately available. The floor manager issues a search for an oncologist and receives a list of the hospital oncologists in an order determined by Bene Vivant policy. Since Dr. Carthage is the only other oncologist on site and is listed as occupied with less time sensitive office exams, Dr. Carthage's smartphone beeps and shows the needed in surgery notification at the top of the to-do list with an urgent priority.

1. The system 10 assists human decision making by providing situational awareness to decision makers and trouble shooters.
2. The system 10 evaluates business policy in real-time thereby reducing friction in tracking and scheduling. Timeliness of service can be monitored and improved without large increases in staff.

3. By improving patient awareness of when services will occur and reasons for delays, patients will feel like their time is valued and their tolerance of the vagaries of hospital operations will increase.

Administrative Scenarios

These scenarios describe the value the system 10 provides to business administrators involved in administrative activities.

Restaurant Owner

GoodEats' owner is opening a new restaurant, GoodEats by the Bay (nickname The Bay). The Bay is going to operate pretty much the same as other GoodEats' restaurants. Opening the GoodEats owner web interface, the owner clicks on the new site button. The system 10 offers a list of default restaurant templates and a list of existing GoodEats restaurants to clone. The owner selects a nearby GoodEats to clone and the system 10 asks a number of questions including street address, number of employees, when the site will be open for the first time, etc. Clicking on the system 10's site mapping tool, the owner lays out a map of the restaurant and associates the map with The Bay.

Since the owner would like to seed staff at The Bay with experienced employees from nearby GoodEats restaurants, the owner runs queries of the employee information in the system 10 looking for each of the needed specialties sorted by levels of expertise and distance of the new restaurant from their home address. Making the appropriate selections, the owner associates the employees with the new restaurant site, and determines when they will first be needed at the new site. Since in their previous assignments the employees held positions requiring knowledge of GoodEats, the owner will need to backfill by promoting or reassigning other employees. New employees will need to be hired both to staff The Bay and to restore staffing levels at the older GoodEats sites. The owner opens the appropriate requisitions in his human resources software and notifies the management at each GoodEats site involved of the changes.

1. The system 10 simplifies business administration by supporting cloning of administrative entities and querying of existing entities. With this simplification, the system 10 makes self-service for common administrative tasks practical and allows the system 10 to avoid being involved in the day to day administration of businesses.
2. Whatever the type of business, the system 10 will scale by providing self-service administrative UI for provisioning and other administrative configuration.
3. The system 10 propagates historic information valuable to business operation from older sites to newer sites. The details of finely tuned operational policy, the successes and failures of products and services, and the customer preferences and communities are all available to provide consistency across sites and improve the success of new ventures.

Exemplary Server/Cloud Device

Figure 27:
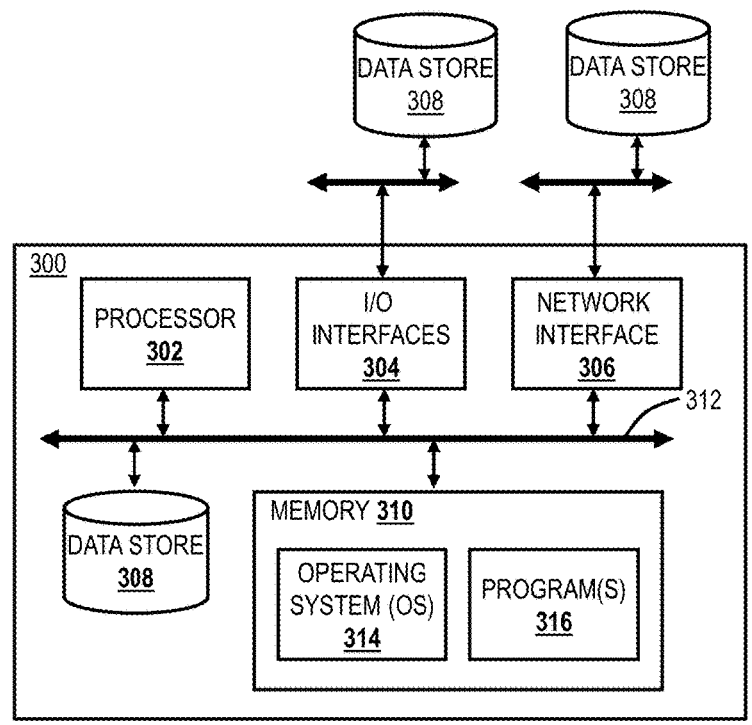
FIG. 27 is a block diagram of a server which may be used in the system of FIG. 1 or standalone.

Referring to FIG. 27, in an exemplary embodiment, a block diagram illustrates a server 300 which may be used in the system 10 (e.g., in the clouds 30, 34), in other systems, or standalone. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 27 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate on a network, such as the Internet, a wide area network (WAN), a local area network (LAN), and the like, etc. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 308 may be located internal to the server 300 such as, for example, an internal hard drive connected to the local interface 312 in the server 300. Additionally in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

Exemplary Mobile Device

Figure 28:
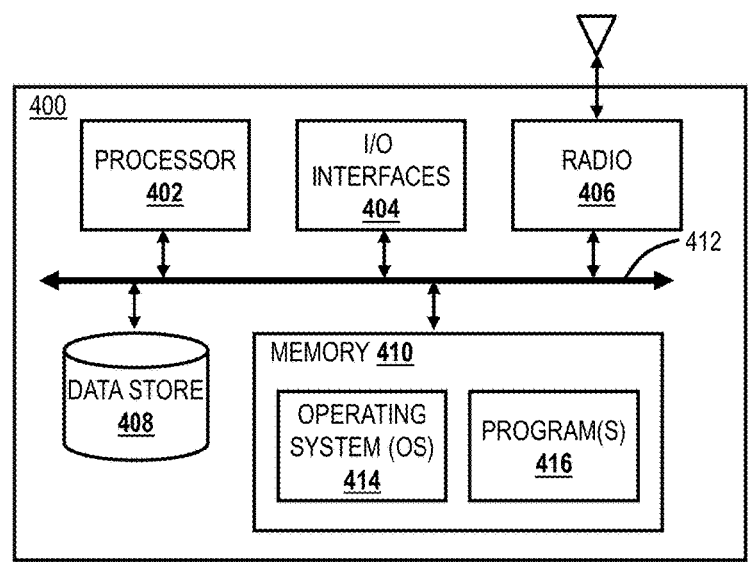
FIG. 28 is a block diagram of a mobile device which may be used in the system of FIG. 1.
Figure 29:
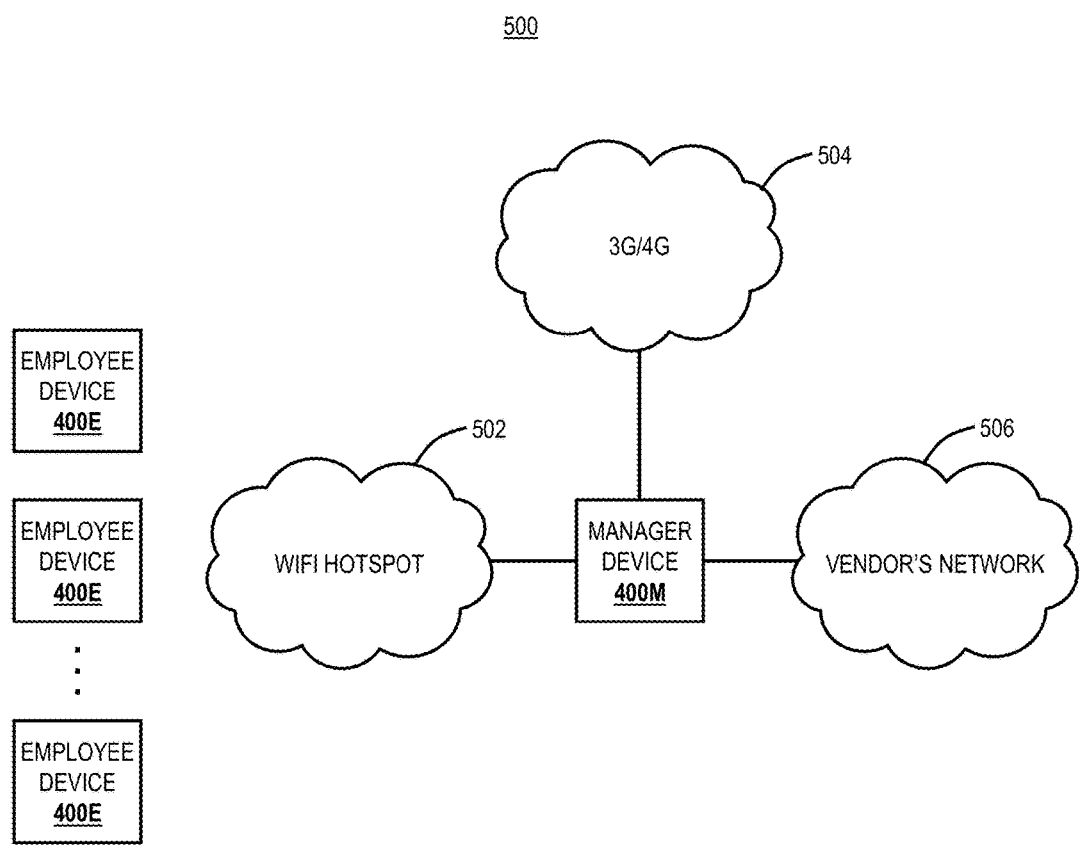
FIG. 29 is a network diagram of an exemplary site network at the site in the system of FIG. 1.

Referring to FIG. 28, in an exemplary embodiment, a block diagram illustrates a mobile device 400, which may be used in the system 10 (as the mobile device 16) or the like. The mobile device 400 can be a digital device that, in terms of hardware architecture, generally includes a processor 402, input/output (I/O) interfaces 404, a radio 406, a data store 408, and memory 410. It should be appreciated by those of ordinary skill in the art that FIG. 28 depicts the memory 410 in an oversimplified manner, and a practical embodiment may include additional components and suitably configured processing logic to support known or conventional operating features that are not described in detail herein. The components (402, 404, 406, 408, and 402) are communicatively coupled via a local interface 412. The local interface 412 can be, for example but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the memory 410, a semiconductor-based microprocessor (in the form of a microchip or chip set), or generally any device for executing software instructions. When the mobile device 400 is in operation, the processor 402 is configured to execute software stored within the memory 410, to communicate data to and from the memory 410, and to generally control operations of the mobile device 400 pursuant to the software instructions. In an exemplary embodiment, the processor 402 may include a mobile optimized processor such as optimized for power consumption and mobile applications. The I/O interfaces 404 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 404 can also include, for example, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the memory 410. Additionally, the I/O interfaces 404 may further include an imaging device, i.e. camera, video camera, etc.

The radio 406 enables wireless communication to an external access device or network. Any number of suitable wireless data communication protocols, techniques, or methodologies can be supported by the radio 406, including, without limitation: RF; IrDA (infrared); Bluetooth; BLE; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); Land Mobile Radio (LMR); Digital Mobile Radio (DMR); Terrestrial Trunked Radio (TETRA); Project 25 (P25); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 408 may be used to store data. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs, each of which includes an ordered listing of executable instructions for implementing logical functions. In the example of FIG. 28, the software in the memory 410 includes a suitable operating system (O/S) 414 and programs 416. The operating system 414 essentially controls the execution of other computer programs, and provides scheduling, input-output control, file and data management, memory management, and communication control and related services. The programs 416 may include various applications, add-ons, etc. configured to provide end user functionality with the mobile device 400. For example, exemplary programs 416 may include, but not limited to, a web browser, social networking applications, streaming media applications, games, mapping and location applications, electronic mail applications, financial applications, and the like. In a typical example, the end user typically uses one or more of the programs 416 along with a network.

Exemplary Site Network and Communication

Referring to FIGS. 29-35, in various exemplary embodiments, a network diagram (FIG. 29) and communication flow diagrams (FIGS. 30-35) illustrate an exemplary site network 500 at the site 12. The site network 500 can include various employee devices 400E, a manager device 400M, a WIFI hotspot 502, a cellular network 504, and a vendor network 506. For example, the employee devices 400E can be used by waiters, and the manager device 400M can be used by a floor manager in a restaurant. The manager device 400M may be a tablet whereas the employee devices 400E may be hand-held smart devices. In an exemplary embodiment, the system 10 can optimize communication at the site 12, i.e., not necessary for all devices 400E, 400M to communicate directly to the cloud 30, 34; rather it may be more efficient to use a proxy communication system. For example, a local network such as the WIFI hotspot 502 can be used for communication amongst the devices 400E, 400M. The vendor network 506 can be a high speed broadband connection such as cable modem, Digital Subscriber Loop (DSL), Ethernet, fiber to the premises, WiMAX, etc. The cellular network 504 can be 4G LTE, etc. The vendor network 506 can be the primary connection to the cloud 43 through the Internet, and the cellular network 504 can be a backup connection which does not require additional hardware (assuming the manager device 400M has a connection built-in to the cellular network 504).

In an exemplary embodiment, the manager device 400M can be a master device and can include a secure hotspot connection forming the WIFI hotspot 502 for the employee devices 400E. Also, the WIFI hotspot 502 can be a local WLAN network with Access Points (APs) at the site 12. The manager device 400M connects to the Internet to the cloud 34 through the vendor network 506 as primary and the cellular network 504 as backup. It may not be necessary for the employee devices 400E to connect to the Internet. That is, the mobile applications 20 on the employee devices 400E and the manager device 400M can connect locally instead of through the Internet and the cloud 34. This has the advantages of removing the dependency of Internet connection for normal operations such as taking orders and for communication between the manager and the employees; there is less information being sent over the Internet; and Internet bandwidth utilization is minimized.

The mobile applications 20 on the manager device 400M and the employee devices 400E can communicate using a proprietary protocol over Transmission Control Protocol (TCP). Also, if the site 12 is a restaurant, an existing RMI system can be used. The manager device 400M can maintain a cache of recent entries and current experiences from itself and the other employee devices 400E. If required information is not available in the cache, the manager device 400M could request a server on the cloud 30, 34 (using HTTP) for the info. New experiences created will be synced to the server on the cloud 30, 34 by the mobile application 20 on the manager device 400M.

For example, assuming the devices 400E, 400M are iOS devices (iPad, iPod, iPhone, etc.), Bonjour is Apple's implementation of zero-configuration networking (zeroconf). It provides mechanism to Publish, discover and resolve services on local network using multicast Dynamic Name System (DNS). Applications can publish a service that it wishes to provide. A service is identified by type, name and port. Type is usually the application protocol+transport with a leading underscore (e.g. _ftp._tcp). The Name is a human readable string. It is recommended to include the device (host) name in the name. The Port is the port used for communication. Service is published using standard DNS SRV and PTR records. Clients wishing to use the service can search/discover the service by type or resolve directly if both name and type are known. Note, other zeroconf implementations are also contemplated.

Publishing, Discovering and Resolving Peer-To-Peer Service includes, when started, the mobile application 20 on the manager device 400M should publish the system 10 peer-to-peer service. Name of service should be formed as <name>._ytrre._tcp.local., where <name> is the unique name given to the vendor's facility (e.g. beyond_coffee). Waiter apps would resolve the service and connect to master. Note: In cases there are multiple manager devices 400M, a specific manager device 400M can be configured to be master. The mobile application 20 that comes up first can be the master and other mobile applications 20 can connect to the master. If the master goes down, another manager device 400M can take over as master after negotiation.

Figure 30:
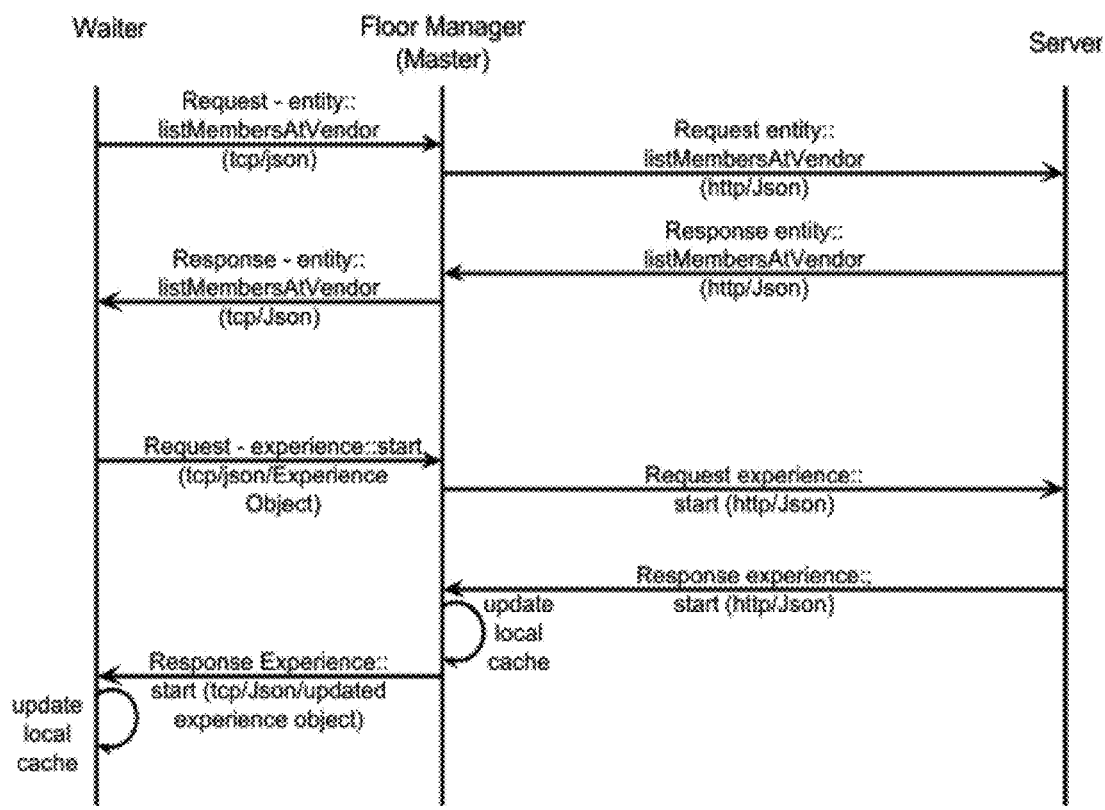
FIGS. 30-35 are communication flow diagrams in the exemplary site network of FIG. 29.
Figure 31:
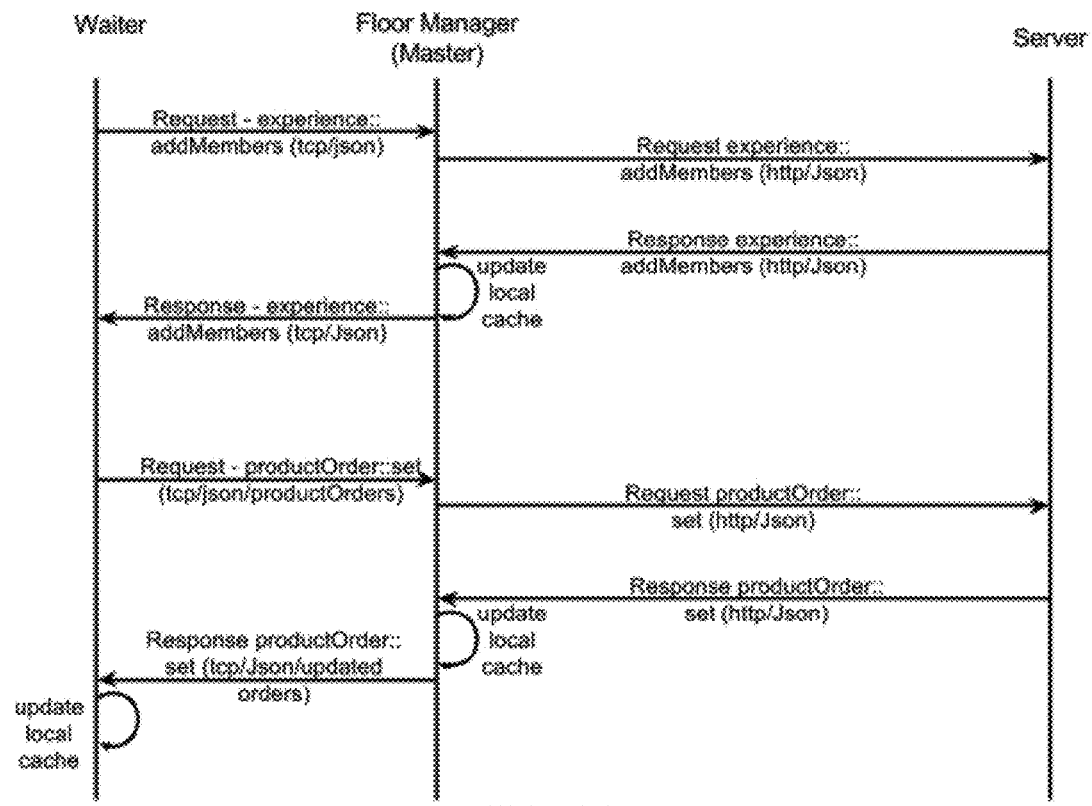
Figure 32:
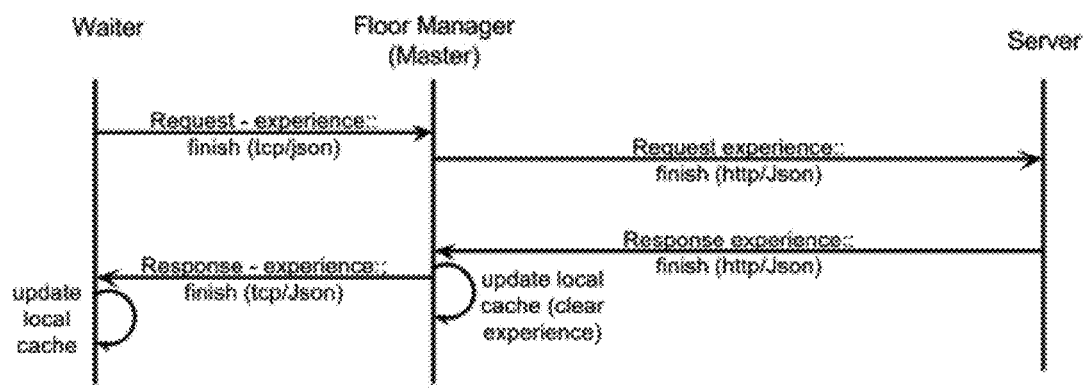
Figure 33:
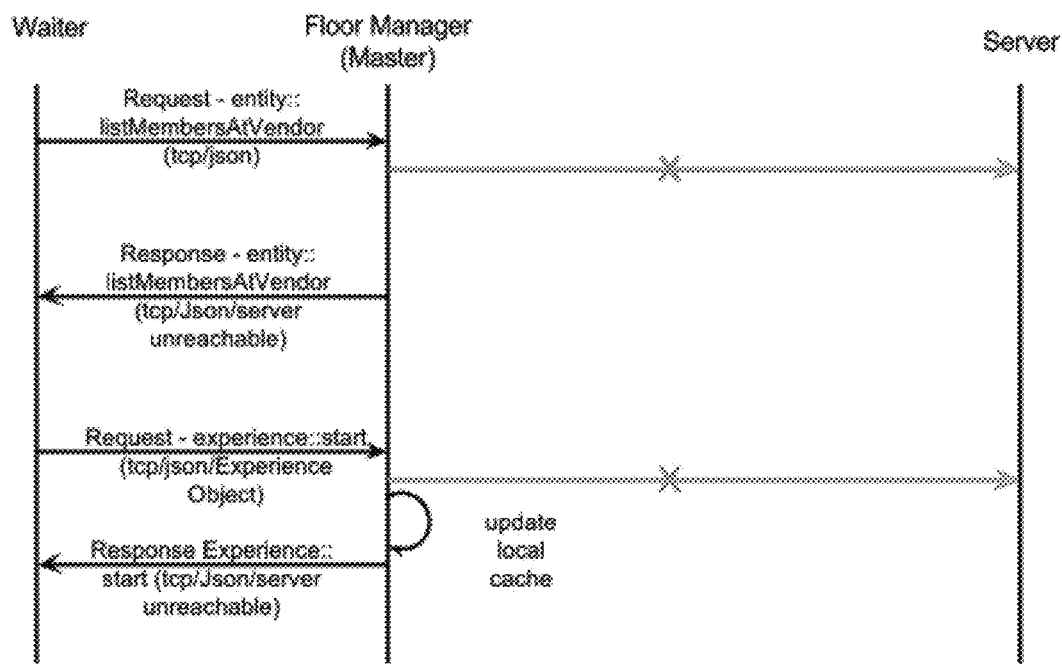
Figure 34:
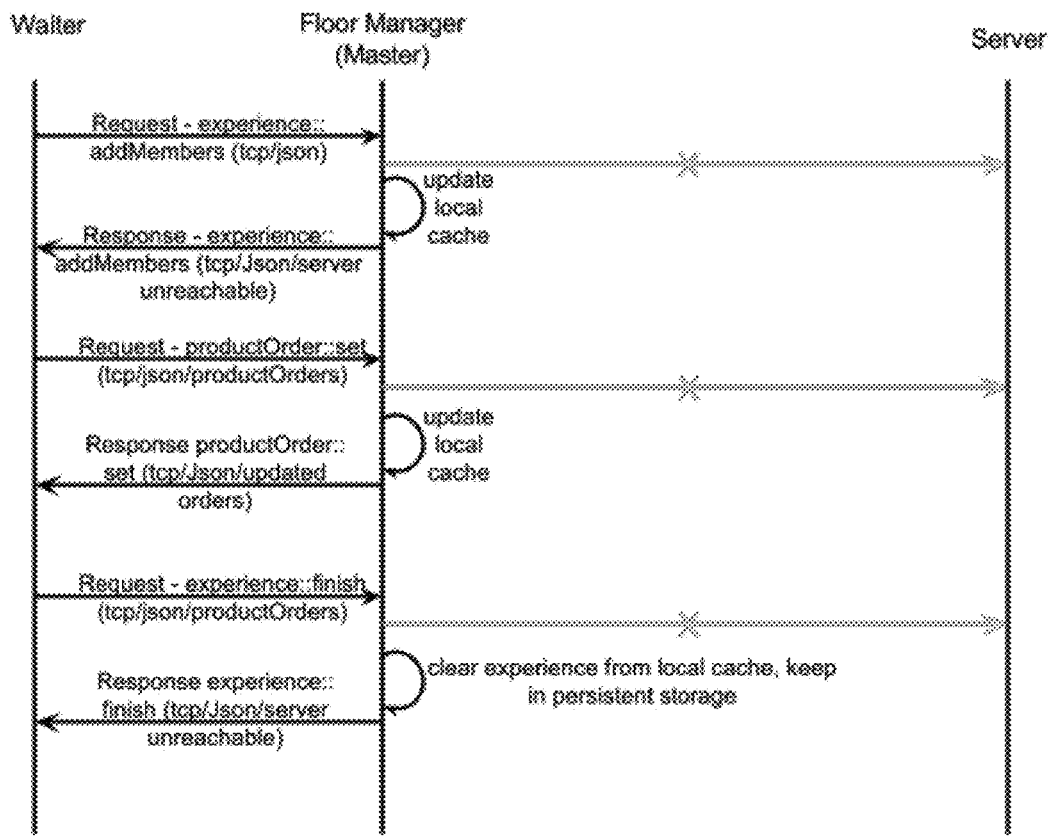
Figure 35:
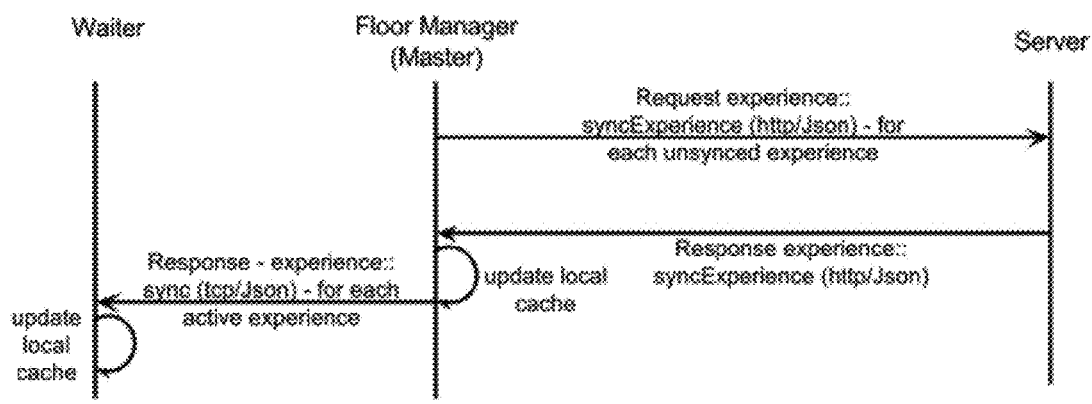

FIGS. 30-32 illustrate message flows between an employee device 400E, e.g., a waiter, and a manager device 400M, e.g., a floor manager, when Internet connectivity is available, e.g., to a server in the cloud 30, 34. FIG. 30 illustrates initiating a new experience by the employee device 400E, FIG. 31 illustrates updating the experience such as adding an order to the experience, and FIG. 32 illustrates finishing the experience. Note, the communication can be via TCP and JavaScript Object Notation (JSON) locally and HTTP/JSON to the cloud 30, 34. The floor manager can also updates its local cache while sending updates to the waiter. FIGS. 33-35 illustrate the same processes when the Internet is not reachable. Note, everything is cached at the manager device 400M and sent once connectivity is restored.

Two Perspective of the Experience

The experience object described herein can be modeled from two perspectives. One perspective is from the business side and one from the customer side. Both share most of the details but some details could be private to each side, and the parts that are common to either side act as a bridge between the two sides for engagement. This is the biggest reason why the improvements on customer experience will directly translate to customer benefit as their processes are being improved based upon the data that is shared. Note, an experience does not necessary need to be in store. It could be all online. For example, online delivery, reservation & purchases could have different types of experiences predefined. One experience could be related how to handle delays in delivery and other could be related to shoppers who shop late night. One example of highly personalized care is related to birth of a new child. For unique identification, a customer can be an ID. An ID could be personal like (name, member ID, phone number, email, etc.) or it could be anonymous, where the user is unknown but he/she could be identified as the same guest (customer 1 or customer 2) from the start to finish of an experience.

Business Perspective

With respect to the system 10, there are few major themes from the business perspective. First, a business can design unlimited experiences; today, because customer experiences are all manual, each business creates processes to handle only a few types of experience. Few common types of experiences that are handled are efficiency experience (this process describes how to avoid delays and how to react to delays etc.), large party experience (process to handle large party upsetting, etc.), etc. Since it is hard to train staff (especially because there is a high chance churn) about more than few key experiences. With the system 10, a business can design, implement, manage and share unlimited types of experiences that they could have never do it manual processes. For example, International patient experience in a hospital that could take into account every customer's personal preference of bed, food, housekeeping, doctor/nurse interactions accordingly. Or rainy day experience at a restaurant might include automatic hot soup as complimentary. The system 10 is the first of its kind that will enable the rich context (customers, staff, products, ambience, etc.) of each experience to be used a parameters and design different types of experience.

Second, the system 10 can also automatically learn about the different experiences that happen in a business. For example, if in a particular salon it always gets students as customers on Tuesdays then the system 10 can automatically suggest student specific packages. Third, when a business adds a new location, now it is extremely easy for the business to copy the customer experience processes from one location and replicate in another location. Fourth, for the first time, the system 10 enables businesses to measure performance and effectiveness of employees per experience type. Fifth, for the first time, the business can directly correlate all their numbers (sales, products sold, repeat sales, profits, losses) to types of experiences and metrics of each experience delivered. Hence for the first time the businesses are going to be customer experience centric in a measurable way where both business and customer can agree on the data point.

Sixth, current modes of soliciting feedback and suggestions are fraught with spam, intrusive and mostly do not work as very few people participate. With the system 10, each experience is stored as a memorable moment in full and rich context that non-intrusively invites customers to participate in feedback and suggestion process. Seventh, business relationships with the customer now be organized and analyzed based on experiences. Eighth, with respect to communities, businesses thrive when they identify key communities (corporates, schools, apartment buildings, Groups that like to try new things, etc.) to target. The system 10 enables this by directly correlating communities to certain types of experiences and their satisfaction with those experiences. Ninth, for promotions, now a business can define promotions per experience type rather than just bill amount (or other variation of a transaction generation). Promotions personalized to experiences have higher chance of generating more business. For example, today if someone has their food ordering/seating/checkout delayed, they would more than not likely come back to the business but with the system 10, the business can automatically offer a complimentary item during the experience or send a promotion for next visit with a personalized note from the manager on duty. The system 10 can handle customized promotions based any kind of rich context of an experience.

Customer Perspective

With respect to the system 10, there are few major themes from the customer perspective. For a Private and Personal Experience Journal, the system 10 enables customers to automatically create a history of experiences of different activity types (eating out, personal care at salon/spa, dentist visit, health (gym), etc.). This journal handles both experiences at businesses with the system 10 and at businesses which do not have the system 10. For businesses with the system 10, rich details of the experience are recorded. For businesses which do not have the system 10, context can be recorded based on what is available via mobile (sitting/walking/driving), public/paid APIs (Google maps/Yelp/Foursquare/OpenTable) on the type of place and business. With the experience journal entry, the system 10 can enable quick geo-reminders (e.g., remind me when I am passing by this place), invite friends for meeting sometime in future, share/start-new experience discussion.

The system 10 enables cloning customization; for the first time ever, users can clone, copy, discover and share customizations between other users. This provides new process of discovering customizations thru new social ranking scheme. The system 10 enables discovering experiences rather than businesses/products/services—experiences provide a new way of ranking businesses and products based on new parameters related the experience like how fast business lunches are delivered, how customized a birthday event is, how personalized is prenatal care, etc. The system 10 can include taste identity which builds a customer's taste profile based on the type of experiences rather than just where he/she visits and the products they he/she consumes. For example, a customer likes slow but fine dining places.

The system 10 can include community discovery were a trust ranking can be enabled that is based on the similarity of experiences that a group of users prefer. This enables the user to have higher confidence on the service. The system 10 can include personal control of experience workflows. For the first time, every business can expose some (or all) parts of their workflow in selective (and personalized) manner to customers. For example, Attendant can call the nurse on duty using a press of button on his/her mobile. A customer who just got checked-in can add all his/her friends who are running late to the experience in a restaurant . . . enabling the friends to order before they even arrive.

The system 10 includes handling and delivering reliable experiences using unreliable wireless networks and bouncing (moving) mobile devices. As any single point of failure of connectivity to Internet or wireless network could result into large disconnect in the data captured per experience, the system 10 has built an experience change journaling system that enables each mobile device to act as local experience journal server and push the changes to the cloud server post connectivity is returns with WIFI AP and/or internet. Here, 1) the client uses globally unique negative number for unknown IDs or server-assigned IDs; 2) For failed searches (i.e. unknown member, etc.), the field is filled in with a unique negative number and an additional field is set to assist the server in performing the failed search. For example: memberId: −1, _memberId_ClientSearch_: {control:entity, phone: 19785551234};

3) For each client supplied change in the change history (create, update, delete), each change is not a simple object: it is identified by the control and method, followed by attributes. {adminId: 1, rmiMsgId: 1, control: experience, method: create, attributes: {expId: −1, productOrders: { . . . The server will accept or reject the change, stopping at the first error. The complete response to the client will have a response per change, allowing the client to handle the first failed change (remove it or confirm it), then re-submit the remaining set of changes; 4) Each change can supply startTs and updateTs and other attributes which are normally only set by the server. For this sync operation, the server will bypass the normal start/update timestamp set function;

5) Detection of changes to objects which the client did not have complete knowledge of (e.g. updating a finalized product order which changes the charged amount). Objects (database rows) have an updateTs (epoch, 1 sec granularity), which the client must supply with each update. If it does not match the current object updateTs, the client is using an out-of-date object with stale data. The server, detecting the update with stale data, will return an error or rejection of update to the client if a special attribute "irrefutable=1" is not supplied. The client can either prompt the UI for action or confirmation or change to object, or retry the update with "irrefutable=1" appended. In this case the server ignores the out-of-date indication and applies the change (which is what happens today). The end result might require manager review, exp if a bill/charge changes. Any time an out-of-date object is changed, a notification is sent to the floor manager. This applies to online and offline/journal applied changes;

5.1) For product create, the client has to send the number of products associated with a experience/transaction. If the count disagrees with the server, the server rejects the product order and the client can either discard it as duplicate (entered by manager or other server) or re-sync the experience, transaction, and products ordered and resubmit the new product order; 5.2) New anonymous member added to the experience is handled similarly. The member count sent with create Experience Members must agree with server, else is rejected. The client resyncs the experience and discards the add or resubmits it. If the new member is duplicate, and not added with this change set, any products ordered by the member can be marked with memberId 0, meaning not associated with anyone. The client can re-assigned these products to a member; 5.3) After the first journal entry rejection, that entry and all subsequent entries are logged for later review. Not applied into the system. The failed and not processed entries are stored in a list associated with the experience;

6) Notifications are sent per app logic if the updateTs (set by client) is within a small amount of time relative to current. e.g. updateTs within 3 hours of current time, the experience may still be ongoing, notifications are sent. Otherwise notifications are suppressed; and 7) When a waiter/manager (anyone receiving notifications) goes offline as detected by presence (web socket for notifications), the server updates that entity state and informs a manager with notification if the condition lasts more than 1(N) minutes. If a product order occurs against a table or experience or transaction owned or managed by that waiter/manager the server can reject the change due to wrong ownership. The client prompts the waiter to confirm, and discards or resubmits the order with irrefutable=1.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A real-time experience management system, comprising:
    a real-time awareness system operating one or more servers in a cloud; and
    a workflow system operating on the one or more servers in the cloud;
    wherein the real-time awareness system is configured to manage real-time location, position, and map updates associated with a plurality of users at a site and to trigger policy-based events to the workflow system based on real-time updates;
    wherein the workflow system is configured to manage a workflow at the site associated with the plurality of users such that experiences by customers of the plurality of users are optimized by staff of the plurality of users;
    wherein each of the plurality of users comprises a mobile device interacting with the real-time awareness system and/or the workflow system and at least one user comprising a wearable device interacting with the real-time awareness system and/or workflow system for providing data and receiving updates; and
    wherein the policy-based events include modifying a visual representation of the experience on the map in real-time and are based on a policy configured for the site to provide data associated with the experience to a business managing the site.

2. The real-time experience management system of claim 1, wherein
    the real-time awareness system is configured to
    check in a user with an associated mobile device at the site via a wireless infrastructure, location tracking, and sensors at the site;
    communicate data associated with the user to the workflow system;
    receive personalization information about the user from the workflow system; and
    monitor and update an experience associated with the user at the site during a duration the user is at the site.

3. The real-time experience management system of claim 2, wherein
    the plurality of users are checked non-intrusively through a wireless signature provided by the associated mobile device to the wireless infrastructure.

4. The real-time experience management system of claim 2, wherein
    a mobile application is installed on the associated mobile device and the user opts in for data collection via a wireless signature provided by the associated mobile device.

5. The real-time experience management system of claim 2, wherein
    the workflow system is configured to update the experience by staff at the site through staff mobile devices and inputting associated data at various points in the experience.

6. The real-time experience management system of claim 2, wherein
    the workflow system is configured to provide a visualization of the site on a mobile device to determine a real-time status of experiences associated with the plurality of users.

7. The real-time experience management system of claim 2, wherein
the workflow system is configured to
define a plurality of different experiences for the plurality of users at the site, wherein the plurality of different experiences is greater than a number of manual experiences that staff at the site are trained to perform; and
guide the staff through any of the plurality of different experiences for the plurality of users.

8. The real-time experience management system of claim 2, wherein
the workflow system is configured to
analyze the data to determine different experiences occurring at the site for providing an opportunity to the plurality of users, to provide measurements of performance and effectiveness of employees on a per experience type basis, and to provide feedback from customers in a non-obtrusive manner.

9. The real-time experience management system of claim 2, wherein
the workflow system is configured to
group the plurality of users in one or more communities based on the data associated with the experience and data already stored in the cloud service.

10. The real-time experience management system of claim 2, wherein
the workflow system is configured to
determine a problem with the experience; and
provide a notification to provide corrective action to the problem.

11. The real-time experience management system of claim 2, wherein
the workflow system is configured to
create a private and personal experience journal for at least one of the plurality of users capturing history and context of a visit to the site by the plurality of users and visits to other sites; and
perform any of:
create a geo-fence based on the visit to the site;
clone, copy, discover, and/or share experiences in the private and personal experience journal;
receive notifications on new experience opportunities based on the private and personal experience journal;
define a taste identity of the plurality of users;
discover a community for the plurality of users; and
perform personal control of experience workflows.

12. The real-time experience management system of claim 2, wherein
the real-time awareness system is configured to
capture data associated with the experience from a perspective of customers and from a perspective of staff at the site;
segment private data of the data associated with the customer and the business; and
share common data of the data with both the customer and the business.

13. The real-time experience management system of claim 2, wherein
the real-time awareness system is configured to
identify the user based on a unique identifier; and
provide as much detail about the user as configured by the user.

14. The real-time experience management system of claim 2, wherein
the site comprises one of a restaurant or fast food, a store, and a hotel and, wherein the experience comprises one of dining at the restaurant or fast food, shopping at the store, and staying at the hotel.

15. The real-time experience management system of claim 2, wherein
the site comprises a health care facility and the experience comprises treatment at the health care facility.

16. The real-time experience management system of claim 2, wherein
the site comprises a salon/spa facility and the experience comprises service at the salon/spa facility.

17. The real-time experience management system of claim 2, wherein
the real-time awareness system is configured to
communicate data associated with the user to the workflow system through a staff device that is communicatively coupled to a master device at the site, wherein the master device communicates the data to the workflow system and caches the data locally.

18. The real-time experience management system of claim 2, wherein
a plurality of mobile devices associated with staff are operated at the site;
wherein one of the plurality of mobile devices is designated as a master communicating with all other of the plurality of mobile devices; and
wherein zero-configuration networking is utilized between the master and the all other of the plurality of mobile devices.

* * * * *